(12) United States Patent
Meager

(10) Patent No.: US 10,179,508 B2
(45) Date of Patent: Jan. 15, 2019

(54) LOW GRAVITY ALL-SURFACE VEHICLE

(71) Applicant: PAHA DESIGNS, LLC, Felt, ID (US)

(72) Inventor: Benjamin Meager, Felt, ID (US)

(73) Assignee: PAHA DESIGNS, LLC, Felt, ID (US)

( * ) Notice: Subject to any disclaimer, the term of this patent is extended or adjusted under 35 U.S.C. 154(b) by 0 days.

(21) Appl. No.: 15/639,664

(22) Filed: Jun. 30, 2017

(65) Prior Publication Data
US 2017/0305261 A1    Oct. 26, 2017

Related U.S. Application Data

(63) Continuation-in-part of application No. 15/272,721, filed on Sep. 22, 2016, which is a continuation-in-part
(Continued)

(51) Int. Cl.
*B60K 1/02* (2006.01)
*B60K 1/04* (2006.01)
(Continued)

(52) U.S. Cl.
CPC .......... *B60K 7/0007* (2013.01); *A61G 1/0275* (2013.01); *A61G 5/061* (2013.01); *A61G 5/063* (2013.01); *A63H 17/262* (2013.01); *A63H 29/22* (2013.01); *B60B 35/004* (2013.01); *B60F 3/0007* (2013.01); *B60F 3/0038* (2013.01); *B60K 1/02* (2013.01); *B60K 1/04* (2013.01); *B60K 7/00* (2013.01); *B60K 17/046* (2013.01);
(Continued)

(58) Field of Classification Search
CPC .......... B62M 7/12; A63H 17/004; B60K 1/00; B60K 1/02; B60K 1/04; B60K 17/043; B60K 7/00; B60K 7/0007; B60K 2007/0038; B60K 2007/0092; B60K 2001/045; B62D 61/06; B62D 61/08; B60L 2220/44; B60L 2220/46; B62B 5/004; B62B 5/0043
USPC ........................................ 180/211, 21, 65.51
See application file for complete search history.

(56) References Cited

U.S. PATENT DOCUMENTS 1,357,571 A    11/1920    Knepper
1,905,345 A    4/1933    Dandini
(Continued)

FOREIGN PATENT DOCUMENTS

CN    203496596    3/2014
WO    WO 01/28796    4/2001
(Continued)

OTHER PUBLICATIONS

"Servomotor," Wikipedia, last modified Dec. 2015, 5 pages [retrieved Jan. 21, 2016 from: en.wikipedia.org/wiki/Servomotor.
(Continued)

*Primary Examiner* — Keith J Frisby
(74) *Attorney, Agent, or Firm* — Sheridan Ross P.C.

(57) ABSTRACT

Vehicles are disclosed which have a lower center of gravity than existing all-terrain, amphibious, and unmanned ground vehicles due to the location of propulsion units and other vehicle components inside the wheels of the vehicle. The vehicles can climb over large obstacles yet are also able to corner at high speeds. The vehicles can be configured for direct manual operation or operation by remote control, and can also be configured for a wide variety of missions.

27 Claims, 67 Drawing Sheets

Related U.S. Application Data of application No. 14/674,764, filed on Mar. 31, 2015, now Pat. No. 9,457,647.

(60) Provisional application No. 61/973,075, filed on Mar. 31, 2014.

(51) Int. Cl.

| | |
|---|---|
| *B60K 7/00* | (2006.01) |
| *B60K 17/356* | (2006.01) |
| *B62D 61/08* | (2006.01) |
| *B60B 35/00* | (2006.01) |
| *B60F 3/00* | (2006.01) |
| *A61G 1/02* | (2006.01) |
| *A61G 5/06* | (2006.01) |
| *A63H 29/22* | (2006.01) |
| *A63H 17/26* | (2006.01) |
| *B60P 3/00* | (2006.01) |
| *B60K 17/04* | (2006.01) |
| *B62D 61/02* | (2006.01) |
| *B62D 61/06* | (2006.01) |
| *B62D 63/02* | (2006.01) |
| *A63H 17/00* | (2006.01) |

(52) U.S. Cl.
CPC .............. *B60K 17/356* (2013.01); *B60P 3/00* (2013.01); *B62D 61/02* (2013.01); *B62D 61/06* (2013.01); *B62D 61/08* (2013.01); *B62D 63/02* (2013.01); *A63H 17/004* (2013.01); *B60K 2001/045* (2013.01); *B60K 2007/003* (2013.01); *B60K 2007/0038* (2013.01); *B60K 2007/0053* (2013.01); *B60K 2007/0061* (2013.01); *B60K 2007/0092* (2013.01); *B60L 2220/44* (2013.01); *B60Y 2200/24* (2013.01); *B60Y 2200/42* (2013.01); *B60Y 2200/48* (2013.01)

(56) References Cited

U.S. PATENT DOCUMENTS

| | | | |
|---|---|---|---|
| 1,915,886 | A | 6/1933 | Gutierrez |
| 3,016,967 | A | 1/1962 | Rehfeld |
| 3,661,212 | A | 5/1972 | Johnson |
| 3,667,156 | A | 6/1972 | Tomiyama et al. |
| 3,905,323 | A | 9/1975 | Kacere |
| 4,102,542 | A | 7/1978 | Pirre, Jr. et al. |
| 4,501,569 | A | 2/1985 | Clark, Jr. et al. |
| 4,726,800 | A | 2/1988 | Kobayashi |
| 6,302,494 | B1 | 10/2001 | DiMarco et al. |
| 6,328,123 | B1 | 12/2001 | Niemann et al. |
| 7,494,398 | B2 | 2/2009 | Laurienzo |
| 8,807,254 | B2 | 8/2014 | Manus |
| 9,457,647 | B2 | 10/2016 | Meager |
| 2002/0011368 | A1 | 1/2002 | Van Den Berg |
| 2003/0010551 | A1 | 1/2003 | Shirazawa |
| 2003/0213630 | A1 | 11/2003 | Pyntikov et al. |
| 2004/0092206 | A1 | 5/2004 | Lynders et al. |
| 2005/0023052 | A1 | 2/2005 | Beck et al. |
| 2012/0302390 | A1 | 11/2012 | Lemire-Elmore et al. |
| 2013/0049498 | A1 | 2/2013 | Boughtwood |
| 2013/0153311 | A1 | 6/2013 | Huntzinger |
| 2017/0008580 | A1 | 1/2017 | Meager |
| 2017/0158270 | A1 | 6/2017 | Meager |
| 2018/0022208 | A1* | 1/2018 | Calleija ................ B60K 7/0007 |

FOREIGN PATENT DOCUMENTS

| | | |
|---|---|---|
| WO | WO 2010/077300 | 7/2010 |
| WO | WO 2016/119022 | 8/2016 |

OTHER PUBLICATIONS

International Search Report and Written Opinion for International (PCT) Patent Application No. PCT/US15/23557, dated Jul. 13, 2015 12 pages.

International Preliminary Report on Patentability for International (PCT) Patent Application No. PCT/US2015/023557, dated Oct. 13, 2016 9 pages.

Official Action for U.S. Appl. No. 14/674,764, dated Feb. 4, 2016, 6 pages.

Notice of Allowance for U.S. Appl. No. 14/674,764, dated Jun. 7, 2016, 8 pages.

Extended Search Report for European Patent Application No. 15773659.6, dated Dec. 1, 2017 7 pages.

Official Action for U.S. Appl. No. 15/272,721, dated Jan. 19, 2018 7 pages Restriction Requirement.

Official Action for U.S. Appl. No. 15/436,502, dated Jan. 19, 2018 7 pages Restriction Requirement.

Official Action for U.S. Appl. No. 15/272,721, dated May 18, 2018 10 pages.

Official Action for U.S. Appl. No. 15/436,502, dated Apr. 2, 2018 6 pages.

Notice of Allowance for U.S. Appl. No. 15/436,502, dated May 9, 2018 5 pages.

International Search Report and Written Opinion for International (PCT) Patent Application No. PCT/SU2018/039398, dated Aug. 30, 2018 13 pages.

Official Action for U.S. Appl. No. 15/272,721, dated Oct. 9, 2018 10 pages.

* cited by examiner

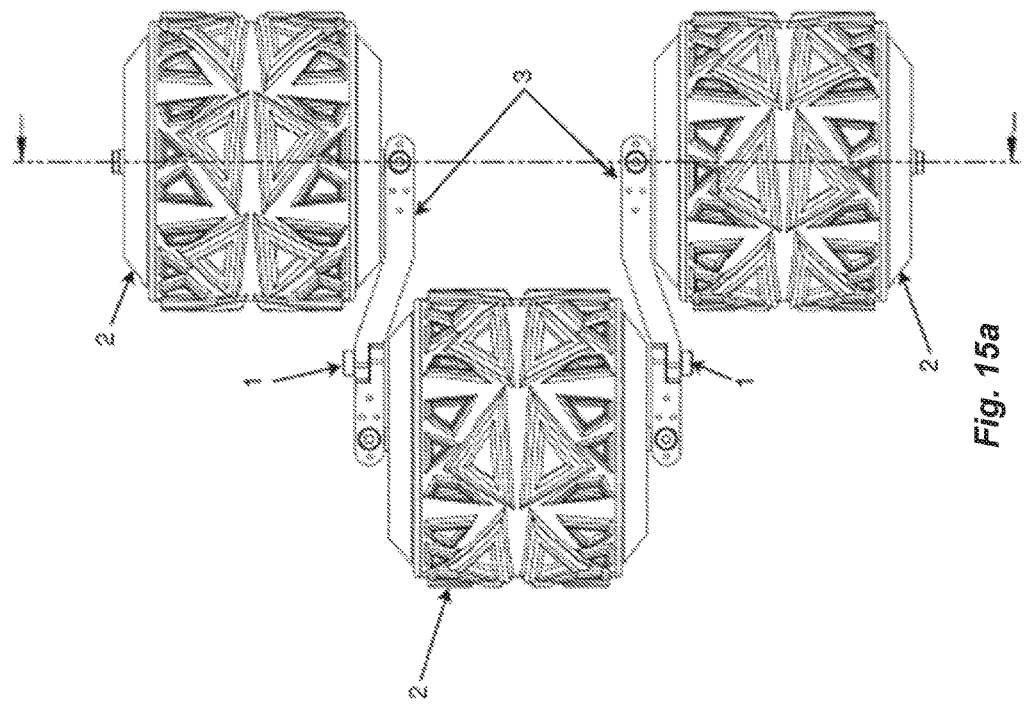
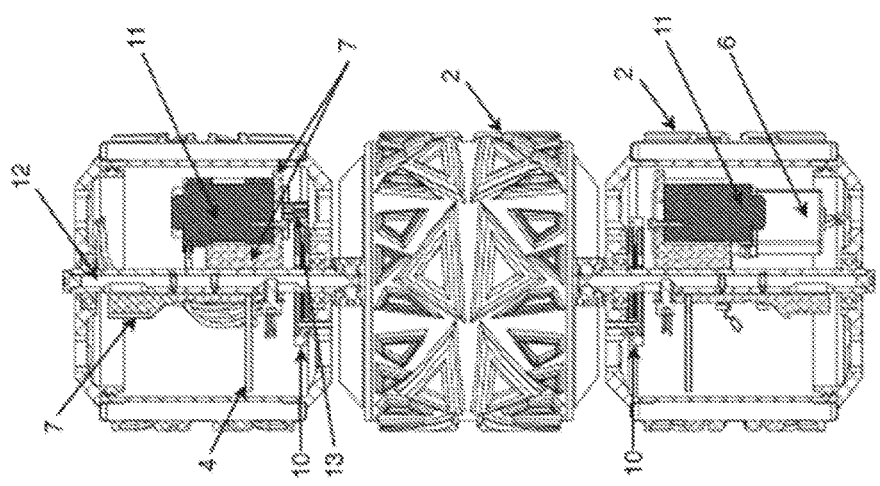
Fig. 15a
Fig. 15b

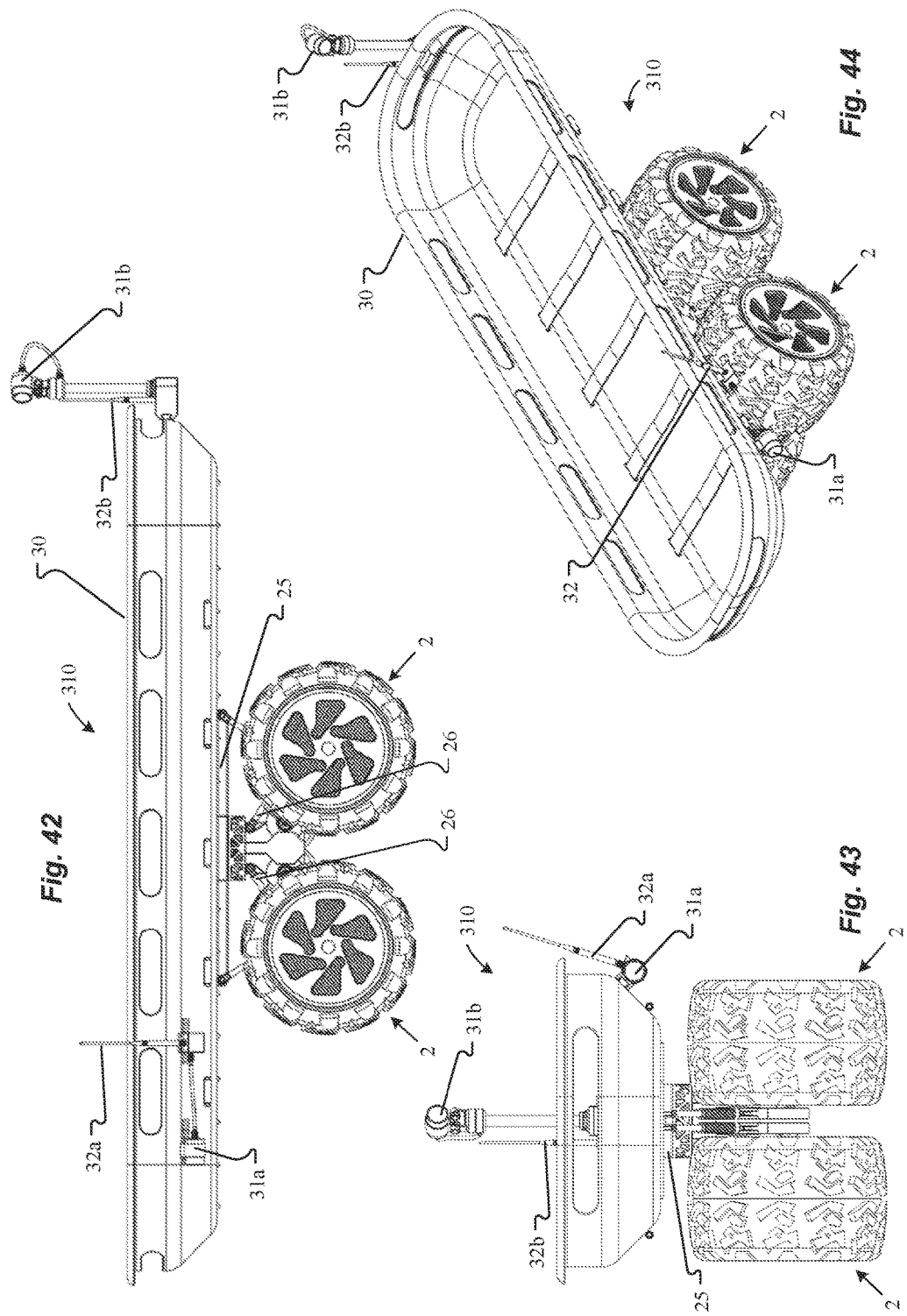

LOW GRAVITY ALL-SURFACE VEHICLE

CROSS-REFERENCE TO RELATED APPLICATIONS

The present application claims the benefit of U.S. patent application Ser. No. 15/272,721, filed Sep. 22, 2016, which claims the benefit of U.S. patent application Ser. No. 14/674,764, filed Mar. 31, 2015, now U.S. Pat. No. 9,457,647, which claims the benefit of U.S. Provisional Patent Application No. 61/973,075 filed on Mar. 31, 2014, all of which are incorporated herein by reference in their entirety.

FIELD

The present disclosure relates generally to the field of ground and amphibious vehicles. More specifically, it relates to lowering the center of gravity of ground and amphibious vehicles, regardless of whether they are remotely operated, computer controlled or direct driven vehicles.

BACKGROUND

Known surface vehicles are useful and valuable to this day, but are limited in their use due to their inability to corner and travel at high speeds. As an example, a High Mobility Multipurpose Wheeled Vehicle commonly known as the Humvee, or a high clearance demonstration vehicle such as the Monster Truck, can climb over very large objects. However, both vehicles have the undesired tendency to flip over when cornering too quickly or when climbing an object that is too steep. This undesired effect is primarily caused by having the majority of each vehicle's weight, and therefore its center of gravity, well above the wheels. In contrast, an advanced race car, such as a Formula One race car, has its center of gravity close to the ground. As a result, it has the ability to corner at very high speeds. The body of a Formula One race car, however, is also very close to the ground. This prevents it from climbing over objects of even the smallest size, making it a ground vehicle that is ideal for high speed cornering, but not acceptable for climbing over objects as required by all-terrain vehicles.

The solution for combining both of these benefits is utilized in vehicles disclosed herein to great effect. Embodiments of the vehicles disclosed herein are capable of both cornering at high speeds and climbing large objects. The vehicles have this capability due to a dramatically lower center of gravity relative to traditional vehicles and in some cases, because they utilize very large wheels.

Prior art vehicles have been created with a low center of gravity and a single large wheel, but the use of only one wheel in these designs has created yet another dramatic limitation. When attempting to accelerate at high speeds or climb large objects, these single-wheel vehicles are susceptible to the motorized portion of their interior spinning off-axis, thus preventing the vehicle from operating at all. With a vehicle that has only one wheel, the axis or axle of the vehicle is not fixed on a plane. Gravity and weight alone keep the power unit from free-spinning inside the wheel. Due to this limitation, over-accelerating the vehicle can allow the insides of the vehicle to spin off-axis, such that the wheel and vehicle remain stationary while the insides of the vehicle spin. Embodiments of vehicles disclosed herein solve this problem by using more than one wheel to keep the axis and axles in-plane, thus allowing for rapid acceleration, high speed cornering and the ability to climb large objects.

SUMMARY

Embodiments of vehicles disclosed herein are designed for moving and cornering at high speeds as well as being able to climb large objects. Such vehicles also have the unique ability to prevent high centering, a problem common to most vehicles, including all-terrain vehicles. In some embodiments, the vehicles can move across the top of water like a boat (amphibious vehicle). As disclosed herein, these benefits are accomplished by moving the majority of the vehicle weight (engines, motors, batteries, cooling systems, electronics, etc.) below the level of the axle and even by moving some—or in some embodiments, almost all—vehicle components into the inside of the wheels themselves. By using more than one wheel, where the wheels do not all share the same axis, embodiments of the vehicles disclosed herein are capable of more rapid acceleration than was achieved by prior art vehicles using motors placed inside a single wheel.

Though embodiments of the vehicles disclosed herein are very difficult to flip over due to their low center of gravity and high clearance, the vehicles do not have a top or a bottom, or a front or a back. This makes the vehicles capable of flipping over and continuing on their path. It also allows for increased maneuverability, due to the fact that the controls can be reversed. By simply adjusting the individual speeds of the motors or engines in each wheel (like a tank), embodiments of the vehicles disclosed herein are capable of steering without the need for additional external moving parts. This allows the vehicles disclosed herein to be robust.

The present disclosure has benefits for all types of vehicles. Embodiments of the vehicles disclosed herein are suitable for a wide variety of applications, including but not limited to: full size tanks for military action, robots capable of climbing stairs at high speeds, amphibious remotely operated vehicles (ROVs) capable of high speed water and land operations, remote control toys, unmanned vehicles that are capable of carrying large supplies and weapons to a battlefield, and even off-road race vehicles.

In accordance with at least one embodiment, a vehicle is provided that generally comprises:

a frame comprising a plurality of axles having a plurality of axes;

a plurality of wheels, each wheel rotatably connected to an axle and defining an inner volume; and a plurality of frame mounts, each frame mount positioned within the inner volume of a wheel and connected to an axle, each frame mount further having a portion extending below the axis of the axle, which portion supports a propulsion unit drivingly coupled to the wheel, an energy source, and a control unit;

wherein the center of gravity of the vehicle is below the plurality of axes.

In some embodiments, each portion of the frame of the vehicle between two axles includes a pivot.

In some embodiments, the propulsion unit is at least one of a motor and an engine, the energy source is at least one of a battery and a fuel tank, and the control unit is at least one of an electronic speed control and a throttle.

In some embodiments, the vehicle also comprises a receiver configured to receive signals from a transmitter and to send corresponding signals to at least one of the control units.

In some embodiments, the vehicle is configured to change direction by at least one of varying the speed of a propulsion unit and changing the length of a linear actuator.

In some embodiments, the vehicle further comprises at least one of a waterproof material configured to prevent water from entering the inner volume of at least one of the plurality of wheels and features on the outer circumference of at least one of the plurality of wheels that enhance the propulsion of the vehicle on water.

In some embodiments, the vehicle further comprises a seat located within the inner volume of at least one of the plurality of wheels and configured to support a person below the axle to which the wheel is connected.

In accordance with at least another embodiment, a reconfigurable vehicle system is provided that generally comprises:

a plurality of self-contained wheels each rotatably connected to an axle, each wheel comprising:
  a substantially cylindrical inner volume;
  a mount connected to the axle and positioned within the inner volume, each mount having a portion extending below the axle that supports a propulsion unit drivingly coupled to the wheel, an energy source, and a control unit;
wherein the axles of the plurality of self-contained wheels are detachably engageable to a frame.

In some embodiments, the reconfigurable vehicle system further comprises a semi-permeable membrane configured to prevent liquid from entering the inner volume.

In some embodiments, each mount of the reconfigurable vehicle system mount further supports a receiver adapted to receive signals from a transmitter and to send corresponding signals to the control unit.

In some embodiments, the reconfigurable vehicle system further comprises at least one of a frame adapted to maintain the plurality of self-contained wheels in substantial linear alignment and a frame adapted to maintain two of the plurality of self-contained in wheels in substantial axial alignment.

In some embodiments, the center of gravity of each self-contained wheel of the reconfigurable vehicle system is lower than the axle of each self-contained wheel.

In some embodiments, each mount of the reconfigurable vehicle system is selectively rotatable around the axle to which it is connected.

In some embodiments, the reconfigurable vehicle system further comprises a servo configured to partially rotate each mount around the axle to which it is connected.

In accordance with at least another embodiment, a vehicle system is provided that generally comprises:

a frame comprising a plurality of structural members and at least one joint, each structural member connecting to an axle that is rotatably connected to a wheel;
  a propulsion device for driving the wheel;
  an energy source; and
  a control unit;
wherein the propulsion device, energy source, and control unit are suspended from the axle and positioned inside the wheel.

In some embodiments, the frame of the vehicle system holds two wheels along a single first axis and a third wheel along a second axis substantially parallel to the first axis. Further, in some embodiments the first axis is separated from the second axis by less than the average outermost diameter of the wheels.

In some embodiments, the frame of the vehicle system holds at least two wheels in linear alignment.

In some embodiments, the vehicle system further comprises a linear actuator configured to move two axles relative to each other.

In some embodiments, the vehicle system further comprises a seat suspended from at least one axle and adapted to support a person below the axle to which the seat is attached.

In accordance with another embodiment of the present disclosure, a vehicle comprises a frame and a plurality of self-contained motorized wheels, each wheel defining an inner volume and comprising an axle extending through the inner volume and having one end positioned outside of the inner volume, the one end attached to the frame; a propulsion unit supported within the inner volume by the axle and drivingly coupled to the wheel; and a frame mount positioned within the inner volume and connected to the axle, the frame mount having a portion extending below an axis of the axle, which portion supports a control unit and an energy source for powering the propulsion unit and the control unit. The center of gravity of the vehicle is below the axis of the axle thereof. A mounting bar may be attached to the frame, and at least one suspension element may be attached to the frame. The at least one suspension element may be operable to raise and lower the mounting bar. A sensor may be mounted on the frame of the vehicle.

A stretcher may be attached to the mounting bar. A first camera may be mounted to a forward portion of the vehicle and positioned to capture imagery of an area in front of the vehicle, and a second camera mounted above the stretcher and positioned to capture imagery of the stretcher.

Alternatively, a cargo rack may be attached to the mounting bar. A first camera may be mounted to a forward portion of the vehicle and positioned to capture imagery of an area in front of the vehicle, and a second camera may be mounted above the cargo rack and positioned to capture imagery of the cargo rack.

According to another embodiment of the present disclosure, a vehicle comprises a frame having a fore end and an aft end and defining an axis; a first cylindrical housing attached in a center portion thereof to the fore end of the frame and a second cylindrical housing attached in a center portion thereof to the aft end of the frame, the first and second cylindrical housings each defining an internal volume and having parallel axes that are perpendicular to the axis of the frame; a bearing mounted around a circumference of each cylindrical housing on each side of the frame; a wheel mounted on each bearing; and a drive plate connected to a drive socket and at least one wheel, and configured to transmit rotational force from the drive socket to the wheel. The internal volume of the first cylindrical housing comprises an energy source; a propulsion unit drivingly couple to the drive socket, which extends through at least one end of the first cylindrical housing; and a control unit.

Each cylindrical housing may comprise an access panel. The internal volume of the second cylindrical housing may comprise a second energy source; a second propulsion unit drivingly coupled to a second drive socket extending through at least one end of the second cylindrical housing; and a second control unit. A drive socket may extend through each end of each cylindrical housing. Each of the first and second cylindrical housings may be pivotably attached to the frame.

According to still another embodiment of the present disclosure, a self-contained motorized wheel comprises an axle extending through an inner volume of the self-contained wheel and having one end positioned outside of the inner volume; a propulsion unit drivingly coupled to the wheel; and a frame mount positioned within the inner volume and connected to the axle, the frame mount having a portion extending below an axis of the axle, which portion supports a control unit, a receiver, and a plurality of energy sources for powering the propulsion unit, control unit, and the receiver. The receiver receives wireless signals for controlling propulsion unit via the control unit, and the center of gravity of the wheel is below an axis of rotation of the wheel.

The propulsion unit may be a hub motor mounted around the axle. Alternatively, the propulsion unit may be a motor mounted above the axle. The plurality of energy sources may be a plurality of batteries, and the plurality of batteries may have more mass than the propulsion unit. The one end of the axle may be attached to a frame.

BRIEF DESCRIPTION OF THE DRAWINGS

The present disclosure is described in conjunction with the appended figures, which are not necessarily drawn to scale:

FIGS. 15a-b depict a section view of the embodiment of FIG. 1;
FIG. 42 is a side view of another embodiment of the present disclosure;
FIG. 43 is a front view of the embodiment of FIG. 42;
FIG. 44 is an isometric view of the embodiment of FIG. 42.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. Various changes may be made in the function and arrangement of elements without departing from the spirit and scope of the appended claims.

Various examples are provided throughout the following disclosure. The disclosure of examples is in all cases intended to be non-limiting, including specifically when examples are identified with the terms or phrases identifying what follows to be an example, including the terms of phrases "for example," "as one example," "such as," "by way of example," and "e.g." In other words, the disclosure of one or more examples is not intended to limit the present disclosure to embodiments conforming to the disclosed example(s).

Embodiments of vehicles disclosed herein typically (but not necessarily) comprise one or more of four primary features: multiple wheels with centrally located axles, the majority of the vehicle's weight located below the level of the axles with substantial portions inside the wheels, a simple frame to join the axles (and configured, in some embodiments, to support one or more vehicle components such as a vehicle battery), and joints that allow the axles to pivot independently from each other.

Figure 1:
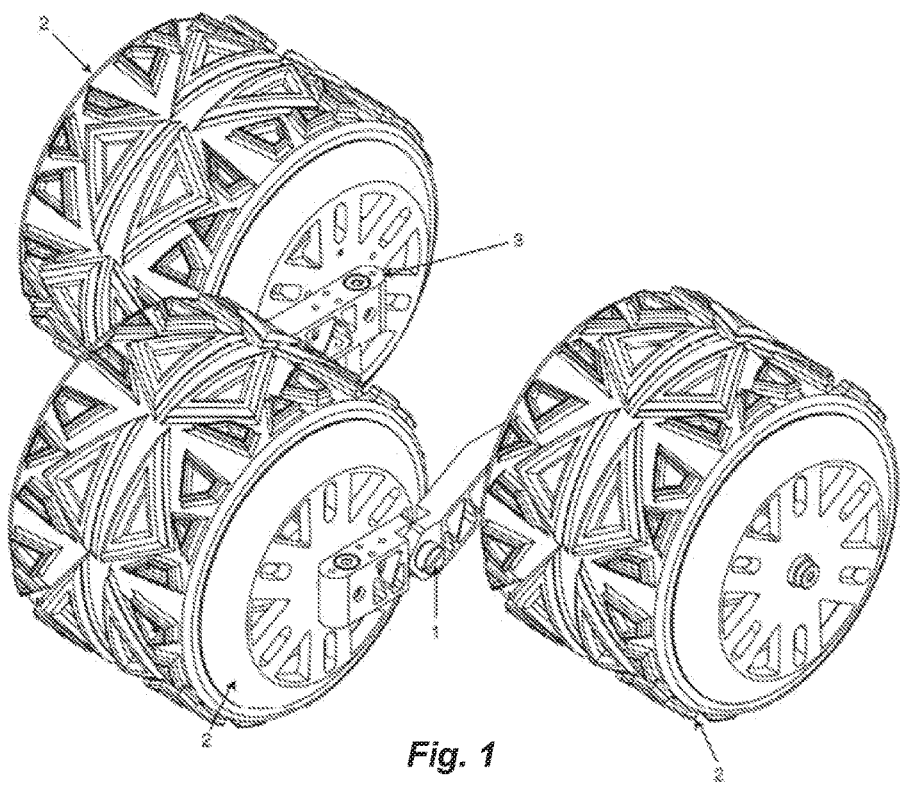
FIG. 1 is an isometric view of an embodiment of the present disclosure.

FIG. 1 shows an isometric view of the outside of a three-wheel embodiment of the present disclosure. The wheels 2 in FIG. 1 are considerably larger than the frame 3 of the vehicle. Wheels 2 are shown to be identical in size, but in some embodiments wheels 2 do not all have the same size. Most prior art vehicles require a large frame to house the motor, batteries, suspension, steering and everything else needed to operate the vehicle. This embodiment houses these vital components inside the wheels 2. In this three-wheel variation, the frame 3 has a pivot 1 that allows portions of the frame to move up and down independently. In this case, the pivot 1 allows the two outer wheels 2 to move up and down without influencing the center wheel 2 or each other.

Figure 2:
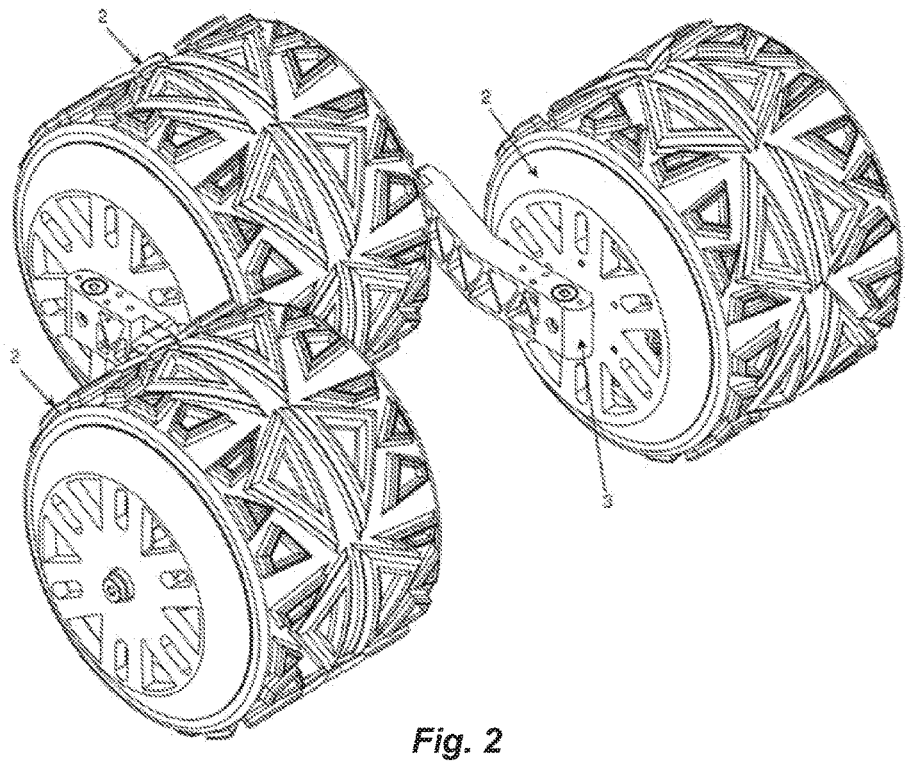
FIG. 2 is another isometric view of the embodiment of FIG. 1.

FIG. 2 is another isometric view depicting the other side of the vehicle of FIG. 1. As with most embodiments of the present disclosure, this vehicle does not have a front or a back, allowing the vehicle to run at full speed in both directions by simply reversing the electronic controls on the transmitter. The wheels 2 are connected at their axles by a simple frame 3 with two pivots or hinges 1.

Figure 3:
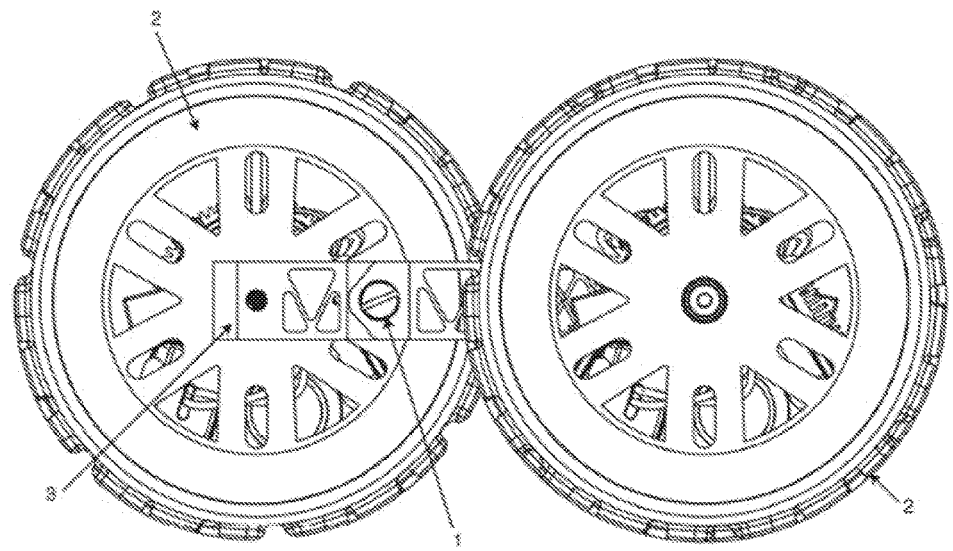
FIG. 3 is a side view of the embodiment of FIG. 1.

FIG. 3 is a side view of the outside of the same three-wheel embodiment of FIG. 1, and makes one of the main advantages of the depicted embodiment readily apparent. Specifically, this embodiment is incredibly difficult to high-center (i.e. where the ground contacts the frame undesirably). Because vehicle components that, in prior art vehicles, are typically attached to the vehicle frame outside of the wheels have been relocated inside the wheels 2, embodiments of the present disclosure utilize only a minimal frame 3 interconnect the wheels 2. With such a minimal frame 3, high-centering is very unlikely. Indeed, in the embodiment of FIG. 3, the side and center wheels 2 are close enough in distance that it is almost impossible for any type of terrain to contact the frame 3.

In embodiments, the frame 3 can be any object or collection of objects capable of supporting two or more wheels 2. For example, the frame 3 can comprise a stick, a shipping container, a PODS® container (PODS® is a registered trademark of PODS Enterprises, Inc.), or any other object or collection of objects without departing from the scope of the present disclosure. The wheels 2 may be directly attached to the frame 3, or may be attached to the frame 3 through modified frame mounts 7. As another alternative, the wheels 2 may be attached to an adapter, which is in turn attached to the frame 3.

Figure 4:
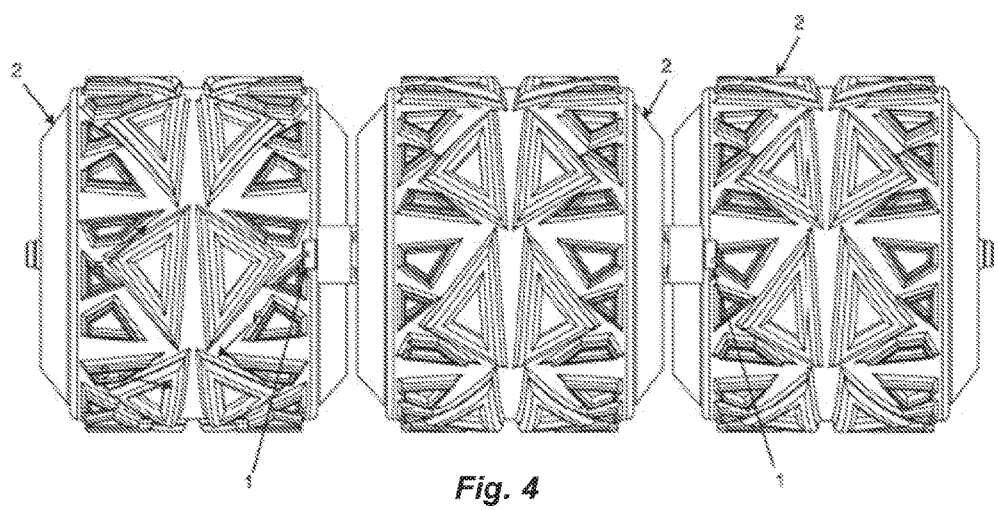
FIG. 4 is a back view of the embodiment of FIG. 1.

As shown in the front view in FIG. 4, this three-wheel embodiment has incredible traction due to the majority of the vehicle's width being covered in tire tread. This embodiment therefore has considerably more surface traction than other prior art vehicles of its same size.

Figure 5:
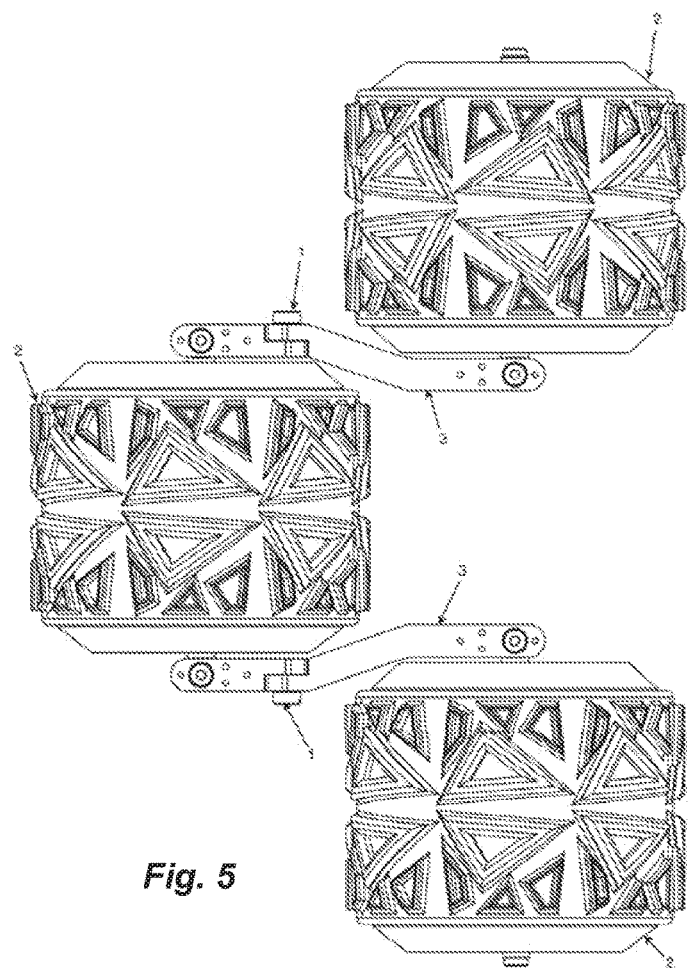
FIG. 5 is a top view of the embodiment of FIG. 1.
Figure 6:
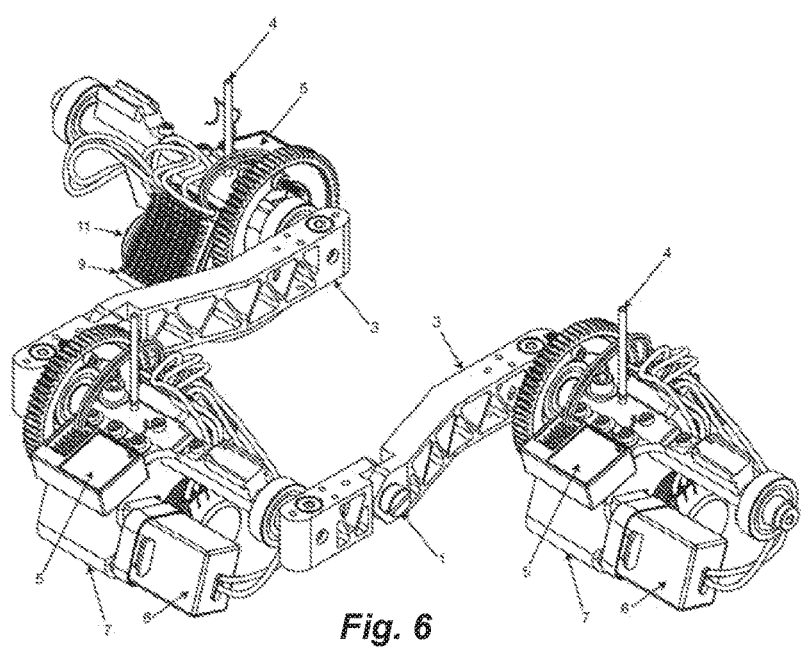
FIG. 6 is an isometric view of the embodiment of FIG. 1 with the wheels removed.
Figure 7:
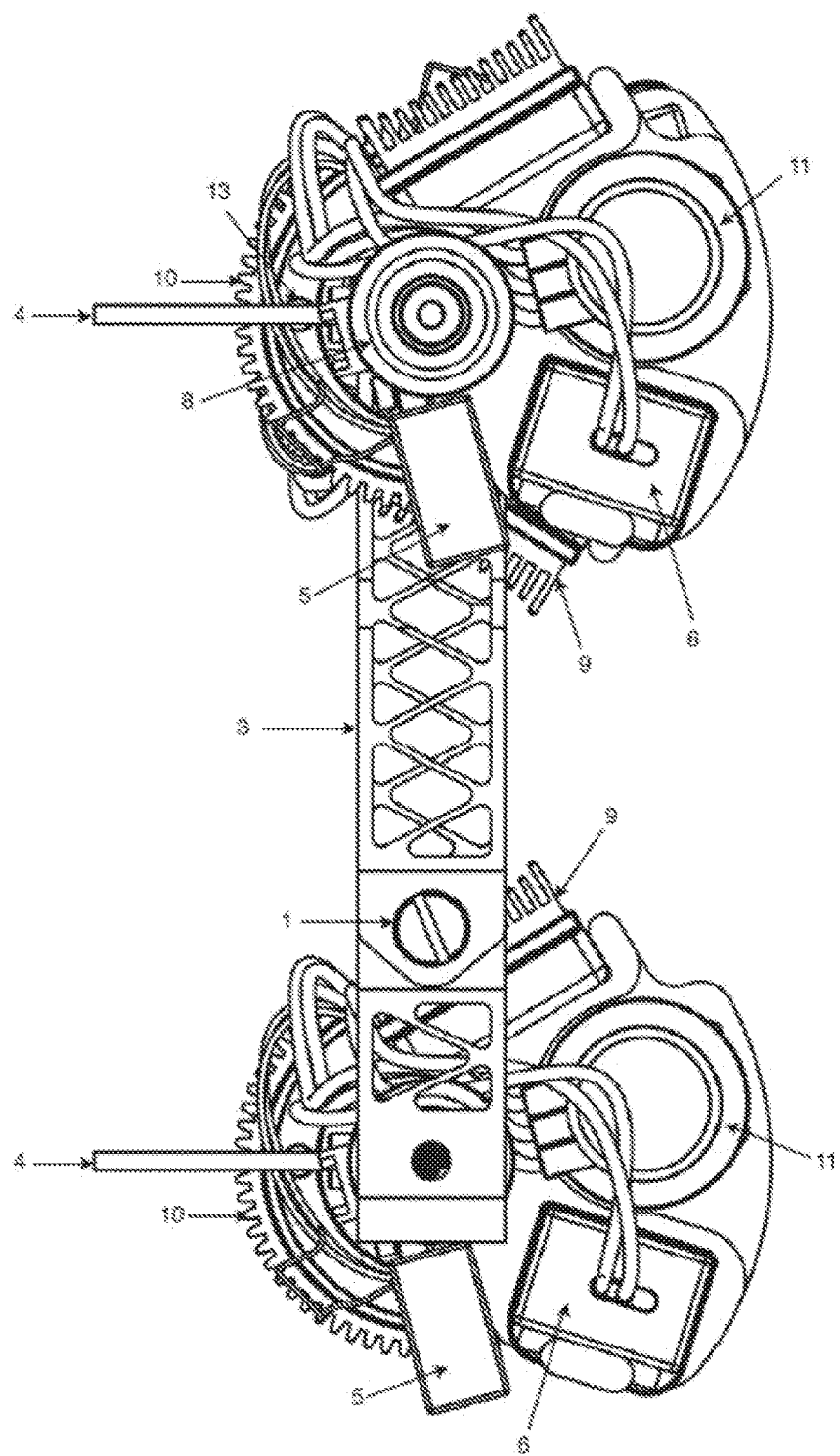
FIG. 7 is an end view of the embodiment of FIG. 1 with the wheels removed.
Figure 8:
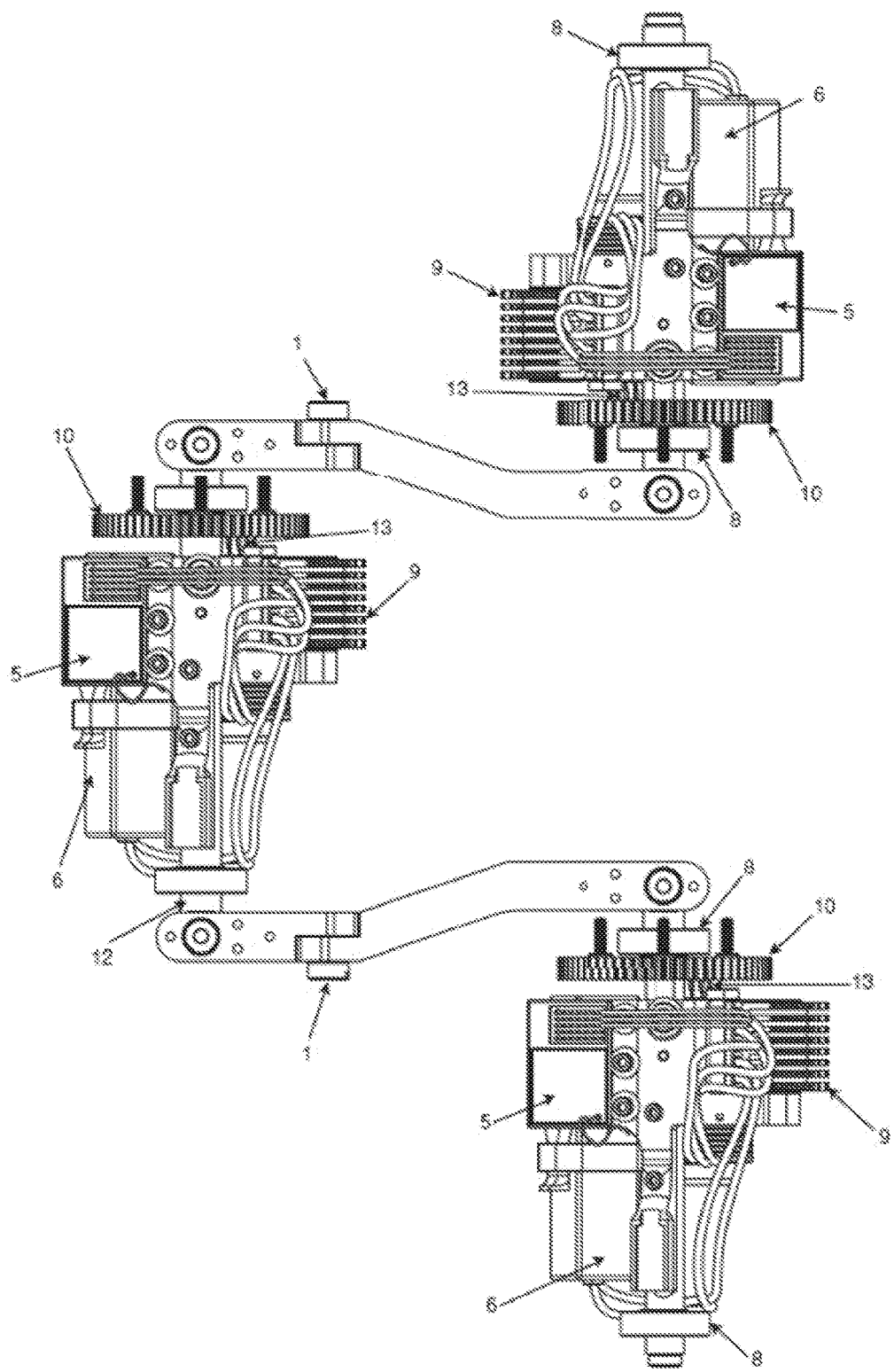
FIG. 8 is a top view of the embodiment of FIG. 1 with the wheels removed.
Figure 9:
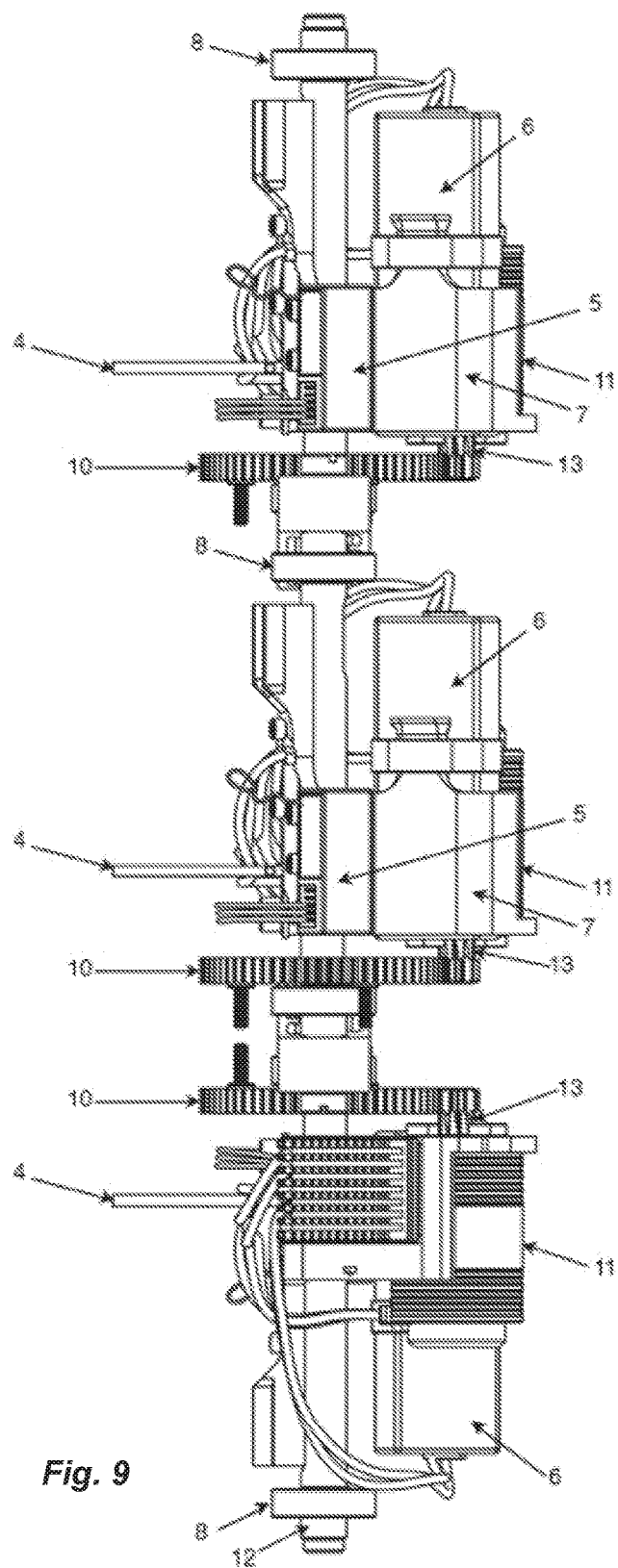
FIG. 9 is a back view of the embodiment of FIG. 1 with the wheels removed.
Figure 10:
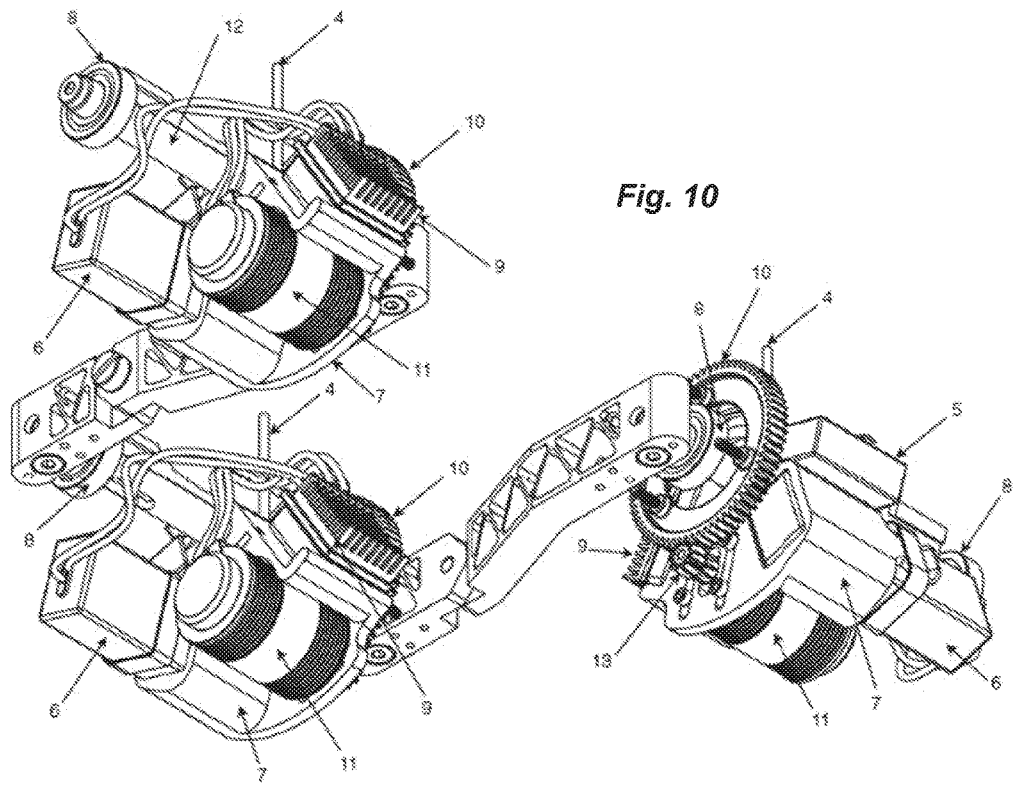
FIG. 10 is a bottom view of the embodiment of FIG. 1 with the wheels removed.

The top view of the three-wheel embodiment displayed in FIG. 5 allows for a clear view of the frame 2 and pivots 1, and also depicts how the small frame 3 allows each wheel 2 to move up and down independently.

FIGS. 6-10 show the wheels and tires 2 removed from view to allow a look into the inside of this embodiment. As discussed previously, this three-wheel embodiment is designed as a remotely operated vehicle (ROV), but this configuration is only an option and is not meant to limit the scope of the invention. FIGS. 6-10 show the main components needed to operate this ROV embodiment, with the exception of the transmitter and the wheels or tires 2. The battery 6 is connected to the motor control or ESC 9. The motor control 9 is connected to both the receiver 5 and the motor 11. The receiver 5 accepts the signal from the transmitter (not shown) and sends that information to the engine/motor control 9 which tells the motor 11 how to operate. These electronics are only an option and are not meant to limit the scope of the invention. Although the present embodiment is described as having a motor 11, a battery 6, and a motor control 9, other embodiments may utilize an engine, a fuel tank, and a throttle.

Also shown in FIGS. 6-10, the frame 3 links the three axles 12 into one unit which is able to pivot on either side by use of the frame pivots 1. Frame mounts 7 hold the electronics to each axle 12. The frame mounts 7 hang the majority of the components below the center point of each axle 12, allowing the vehicle to have an extremely low center of gravity. FIGS. 6-10 also show a small antennae tube 4 that allows the antennae to be positioned towards the top of the vehicle for better reception. Two bearings 8 on each axle 12 allow the wheels 2 to rotate around the axles 12. The motor 11 has a small pinion gear 13 (best viewed in FIG. 8) that drives the spur gear 10. The spur gears 10 are directly attached to the wheels 2. Since the wheels 2 are free to rotate on the axles 12 due to the use of bearings 8, the motor 11 rotates the pinion 13, which drives the spur gear 10, allowing the motor 11 to rotate the wheels 2 and drive the vehicle. The use of a transmission or gearbox is also possible (not shown), but is not necessary to operate the vehicle. For directional turning of this embodiment, the two side motors 11 vary their speed, allowing the vehicle to spin and turn without the need for forward movement like most prior art vehicles. This style of turning a vehicle is similar to the turning of a tank or a skid-steer. Steering in this way is only an option and is not meant to limit the scope of the invention.

Figure 11:
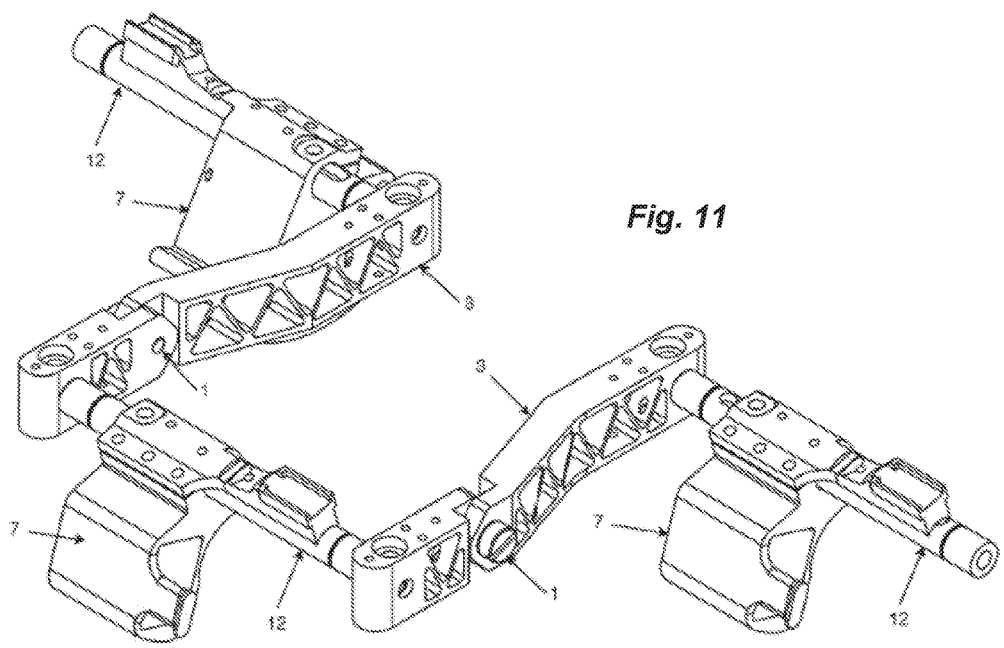
FIG. 11 is an isometric view of the embodiment of FIG. 1 with the frame & mount only.
Figure 12:
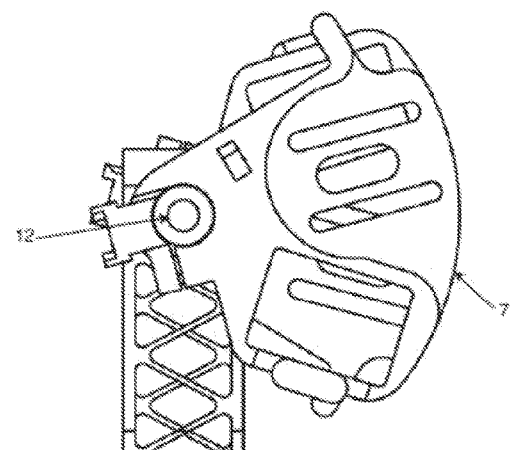
FIG. 12 is a side view the embodiment of FIG. 1 with the frame & mount only.

FIGS. 11-12 show the drive components removed from the three-wheel embodiment of FIG. 1. The frame 3 is shown, together with the axles 12. Also shown are the frame mounts 7. The reason the frame mounts are shown and discussed as separate from the frame 3 is that the frame mounts 7 can be additionally driven (not shown) around the axles to adjust the center of gravity of the vehicle. If the frame mounts 7 were to have an additional motor or servo allowing them to rotate on the axle, then it is possible to simply flip the insides of the vehicle with a button, switch, or other selection device on the transmitter. This configuration (not shown) would allow the center of gravity to reverse itself if the vehicle were to be flipped upside-down, creating a vehicle that not only has no front or back, but also no top or bottom. Flipping the vehicle upside down would not affect the function of the vehicle in any meaningful way. The user would simply press a button, flip a switch, or otherwise cause the transmitter to send an appropriate command to the receiver 5, which would then cause the insides of the vehicle to internally relocate (for example, by rotating around the axle) to restore the low center of gravity. It is also possible to flip the internal components by using gravity alone and a simple locking feature, activated by a sensor that detects that the vehicle has flipped over or by a remote switch, to keep the internal components in the proper location. Alternatively, a solenoid or linear actuator can be used to operate the internal flipping feature (not shown). A combination of these methods can also be employed to lower the center of gravity if the vehicle is flipped upside down. It is important to note that without this internal flipping feature (not shown), the vehicle will still function properly after being flipped upside down, except that the center of gravity will be higher than normal for the vehicle.

Figure 13:
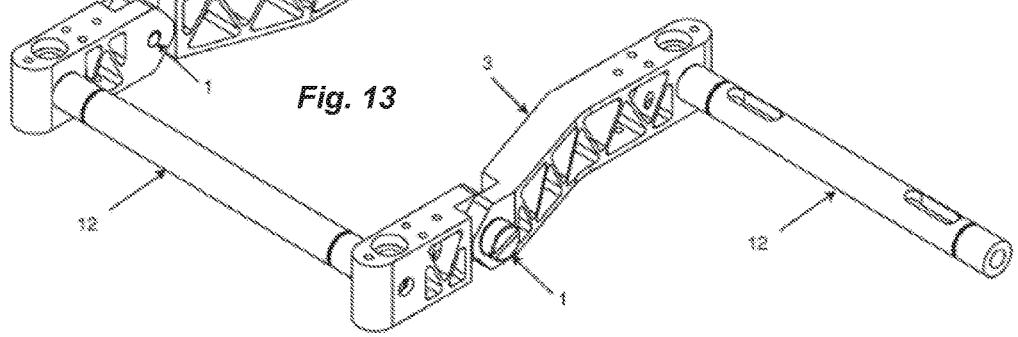
FIG. 13 is an isometric view of the embodiment of FIG. 1 with the frame only.
Figure 14:
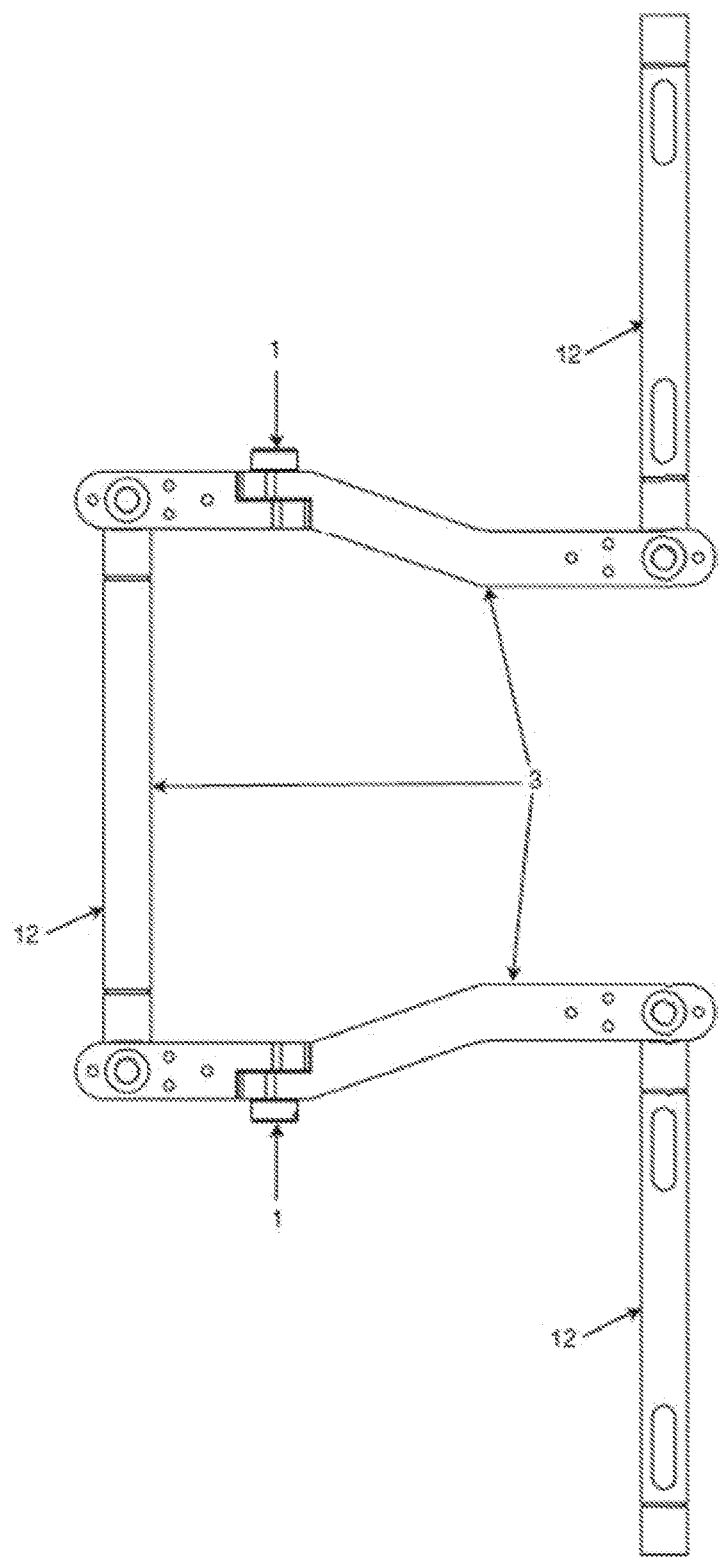
FIG. 14 is a top view of the embodiment of FIG. 1 with the frame only.

FIGS. 13-14 show the three-wheel embodiment of FIG. 1 with the frame mounts 7 removed from view. FIGS. 13-14 represent the entire frame of this embodiment, including the axles 12 and the frame pivots 1. These views allow for a better understanding of the difference between the frames of embodiments of the present disclosure and the frames of prior art vehicles. It is also important to note that frame pivots 1 are only an option and are not meant to limit the scope of the invention.

Figure 16A:
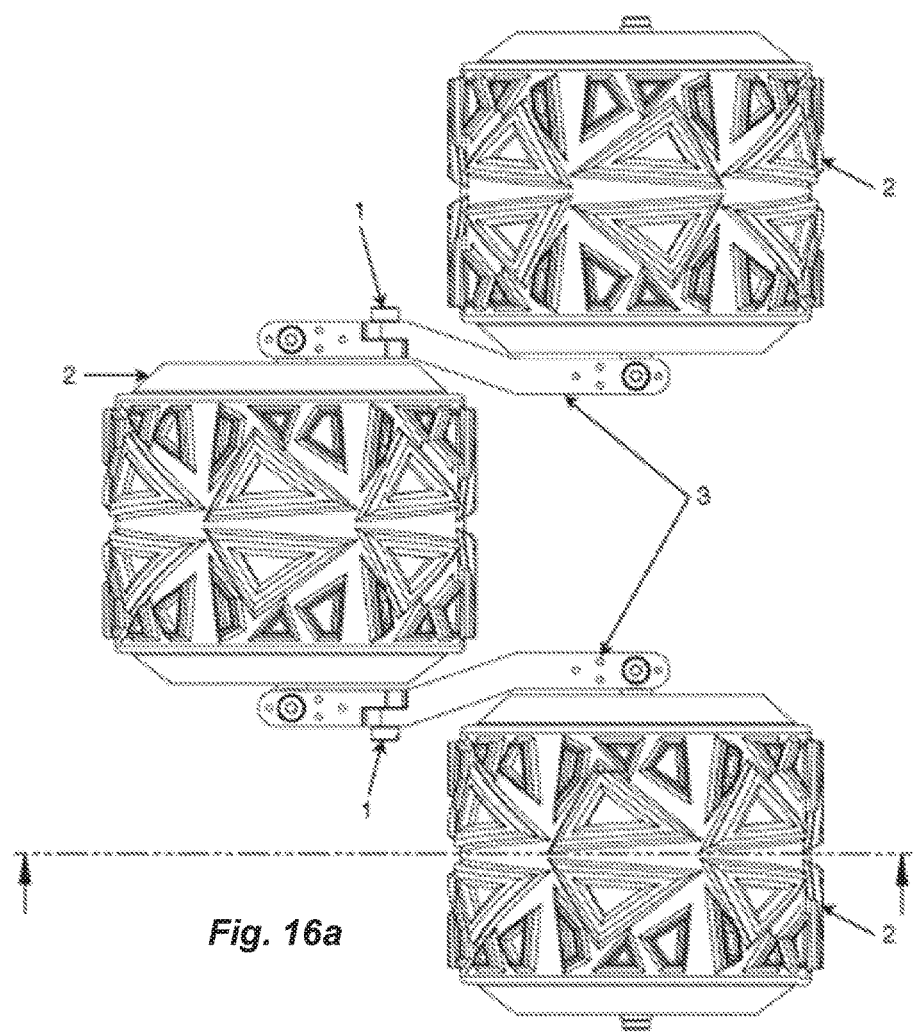
FIGS. 16a-b depict another section view of the embodiment of FIG. 1.
Figure 16B:
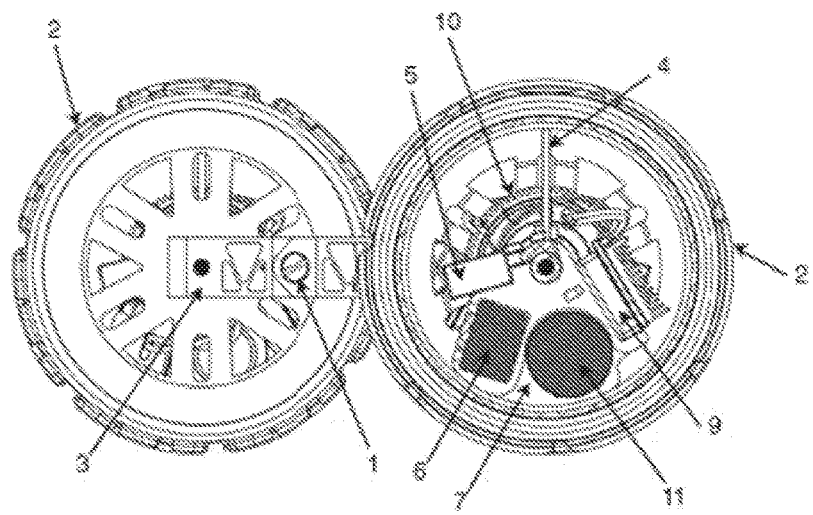

The sectional views in FIGS. 15-16 better show the weight distribution (center of gravity) of embodiments of the present disclosure. As discussed previously, the bulk of the vehicle's weight and components are located below the height of the axle 12 and inside the wheels 2. This allows for the center of gravity to be extremely low as compared to prior art vehicles. FIG. 16 shows this best. The two heaviest single components in typical embodiments of the present disclosure are the motor 11 and the battery 6, which are extremely low to the ground. When such embodiments encounter an object or an obstruction, the large wheels 2 will allow the motor 11 and battery 6 to maintain their low position, but still drive over the object. Also, it should be appreciated that either the right side or the left side of FIG. 15*b* may correspond to the bottom of the vehicle. In some embodiments, the right side of the vehicle corresponds to the bottom of the vehicle so that the motor(s) 11 and battery 6 are positioned beneath the axles 12 of the wheels 2, thereby maintaining a low center of gravity for the vehicle.

Figure 17:
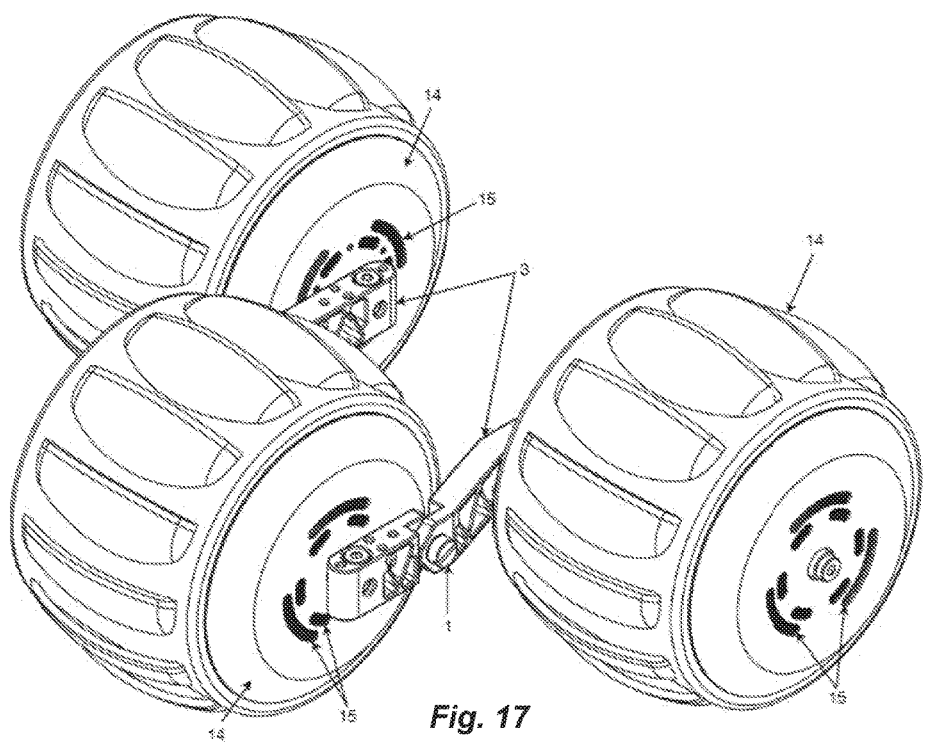
FIG. 17 is an isometric view of an embodiment of the present disclosure.
Figure 18A:
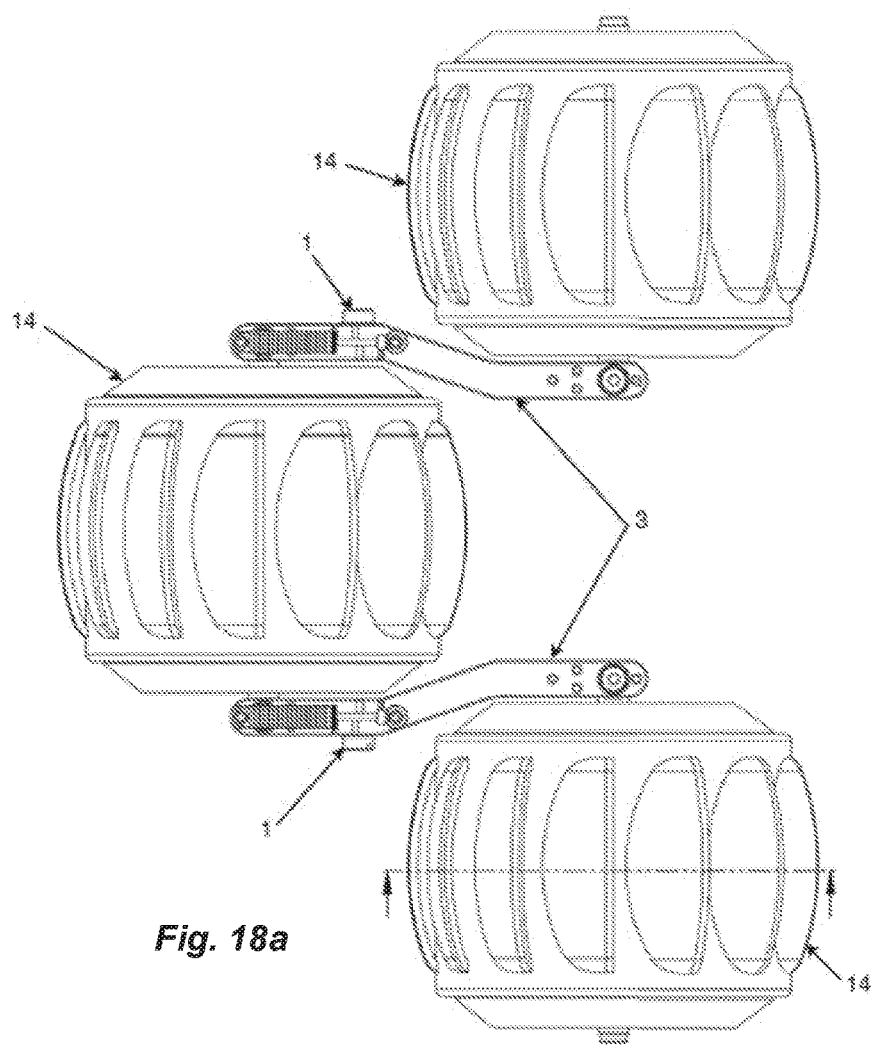
FIGS. 18a-b depict a section view of the embodiment of FIG. 17.
Figure 18B:
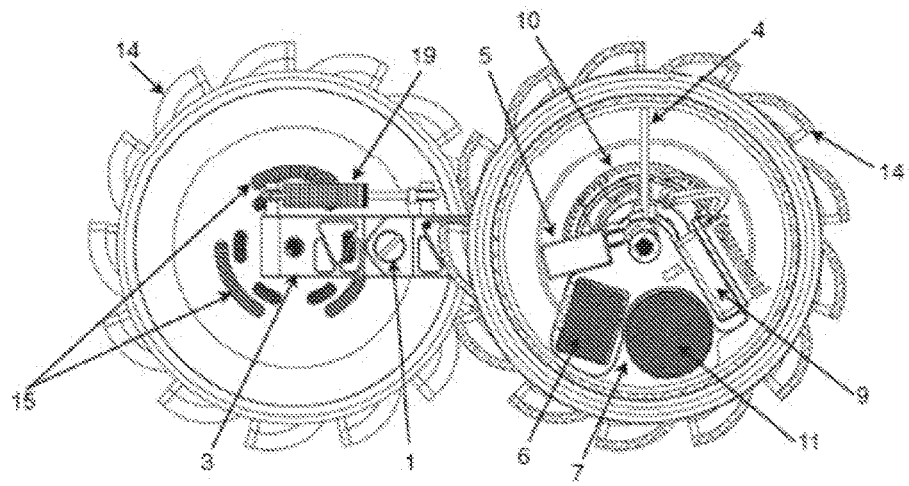

FIGS. 17-18 show a three-wheel embodiment similar to the embodiment of FIG. 1 but that uses waterproof wheels 2 that prevent water or liquid from entering the inside of the wheels 2. With the correct weight to air-cavity distribution (buoyancy), this embodiment is able to both float and propel itself on water. The amphibious embodiment is identical to the previously described embodiment of FIGS. 1-16 with the exception of adding a waterproof seal to the interior of the wheels and, optionally, changing the tires 14 to a more scooped design, allowing for better propulsion on the water. The steering of the amphibious embodiment is accomplished in the same manner as the previously described embodiment, i.e. slowing one side of the vehicle and speeding up the other.

All embodiments of the present disclosure can be used on either land or water (given an acceptable weight to air-cavity distribution (buoyancy)) by simply sealing the wheels. This sealing may be accomplished with a semi-permeable membrane 15 that is permeable to air but impermeable to water. Use of such material allows the motors 11 and other internal mechanisms to be air cooled while preventing liquid from entering the wheels 2. This semi-permeable membrane 15 is only an option and not meant to limit the scope of the invention. Alternative ways to cool the internal mechanisms in each wheel 2 include using liquid cooling or air conditioning, creating a cooling effect for the motors 11, batteries 6, and other internal components while still allowing the wheels 2 to be sealed for amphibious driving.

FIG. 18 additionally displays the use of an external shock absorber 19. Unlike prior art vehicles, embodiments of the present disclosure do not require the use of shock absorbers to allow the wheels to move independently of each other or to move at all. Prior art vehicles use shocks and springs to allow the wheels to move up and down over bumps and dips notwithstanding the weight of the vehicle. Embodiments of the present disclosure have the majority of their weight in the wheels 2 themselves, allowing for a completely different way of looking at the use of shock absorbers and springs 19. In this variation, the shock absorber 19, placed on its side, does not have any vehicle weight riding on it when the wheel is not riding over a bump or a dip. Unlike prior art vehicles, embodiments of the present disclosure employ a two-way shock absorber 19, i.e. a shock absorber having two opposing springs. One spring applies force when the wheel 2 moves upward in relation to the other wheels 2. The other spring applies force when the wheel 2 moves downward in relation to the other wheels 2. The absorber portion of the shock can remain the same, applying resistance and slowing movement in either direction. A horizontally placed shock and spring setup 19 with two-way springs is only an option and is not meant to limit the scope of the invention.

Shocks and springs may be used in many configurations on embodiments of the present disclosure, including in configurations that may not be possible on prior art vehicles. Shock absorbers 19 can be applied to all embodiments of the present disclosure, but are not required. The use of internal shock absorbers within the wheels 2 can also be used (not shown) to improve the safety of the components or people within the wheels 2.

Figure 19:
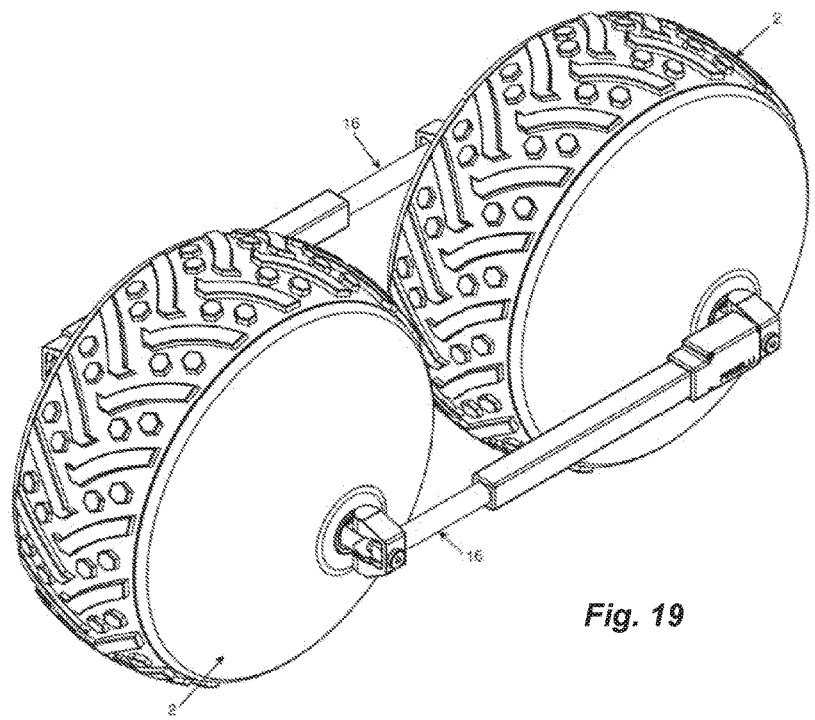
FIG. 19 is a side view of an embodiment of the present disclosure.
Figure 20A:
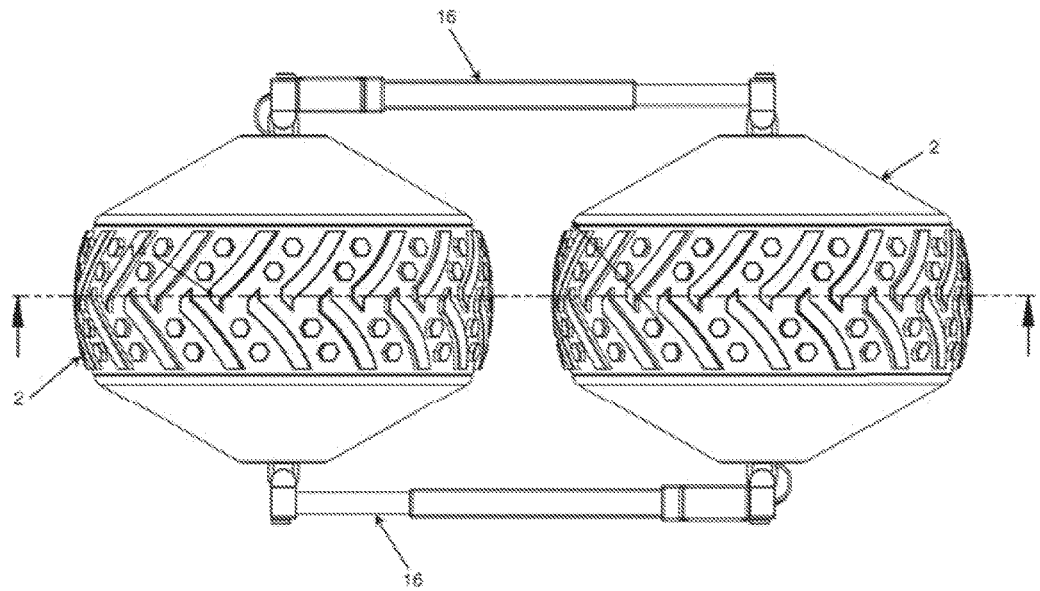
FIGS. 20a-b depict a section view of the embodiment of FIG. 19.
Figure 20B:
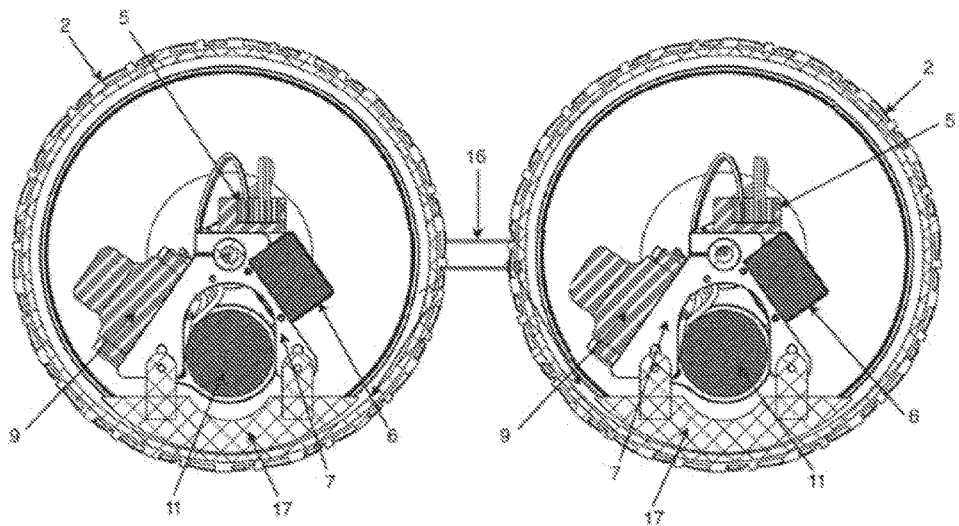
Figure 21:
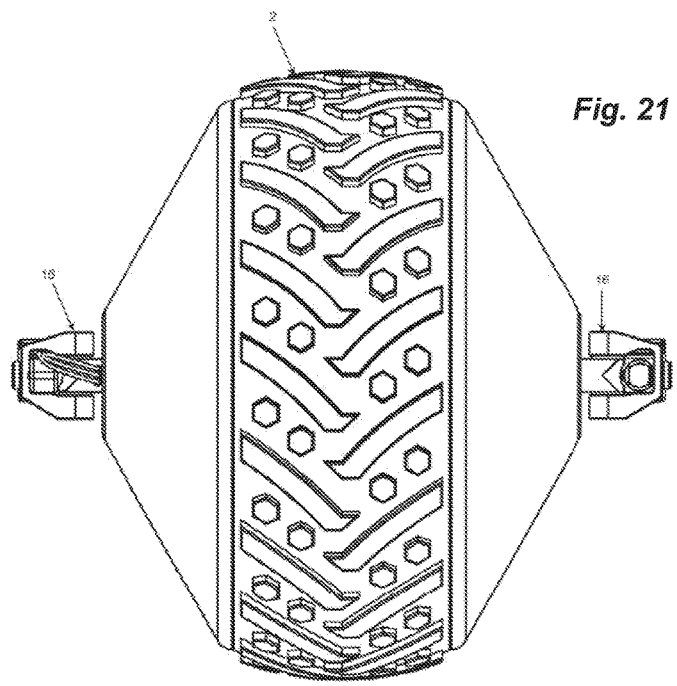
FIG. 21 is a front view of the embodiment of FIG. 19.

FIGS. 19-27 show other embodiments of the present disclosure, including embodiments with different wheel configurations. FIGS. 19 through 21 present a two-wheel embodiment that, like all embodiments of the present disclosure, has a lower center of gravity than typical prior art vehicles. This lower center of gravity allows the two-wheel embodiment to remain upright while not moving, i.e. it will not fall over as would, for example, a motorcycle. The sectional view in FIG. 20 shows the majority of components located below the axles and inside the wheels 2. FIG. 20 also shows the use of an optional weight 17 that further lowers the center of gravity. This optional weight 17 can also be utilized with other embodiments of the present disclosure, but is only an option and is not meant to limit the scope of the invention.

As mentioned earlier in the document, steering by adjusting the speed of one or more motors 11 is only an option. As one non-limiting example, steering in various embodiments of the present disclosure can also be accomplished by use of a typical steering rack (i.e. a rack and pinion) as used on the majority of prior art vehicles. Components of a rack and pinion system, if used, would likely need to be installed outside of the wheels 2. Linear actuators 16 provide another one of the many options for steering embodiments of the present disclosure. By extending one linear actuator 16 but not the other, the wheels 2 can be turned relative to each other, thus providing directional control to the vehicle.

Linear actuators 16 can also be used to adjust the overall wheel base length, thus creating additional benefits. Due to the simplicity of the frames 3 of embodiments of the present disclosure, the length of the frames 3 can easily be adjusted, even during operation, with the use of linear actuators 16. Adjusting wheel base can have many advantages, including but not limited to improving the vehicle's ability to climb stairs by lengthening the frame length, improving the vehicle's high speed performance by reducing the frame length, and allowing a vehicle stuck in mud or ruts to simply push out of the mud or ruts by lengthening the wheel base.

Figure 22A:
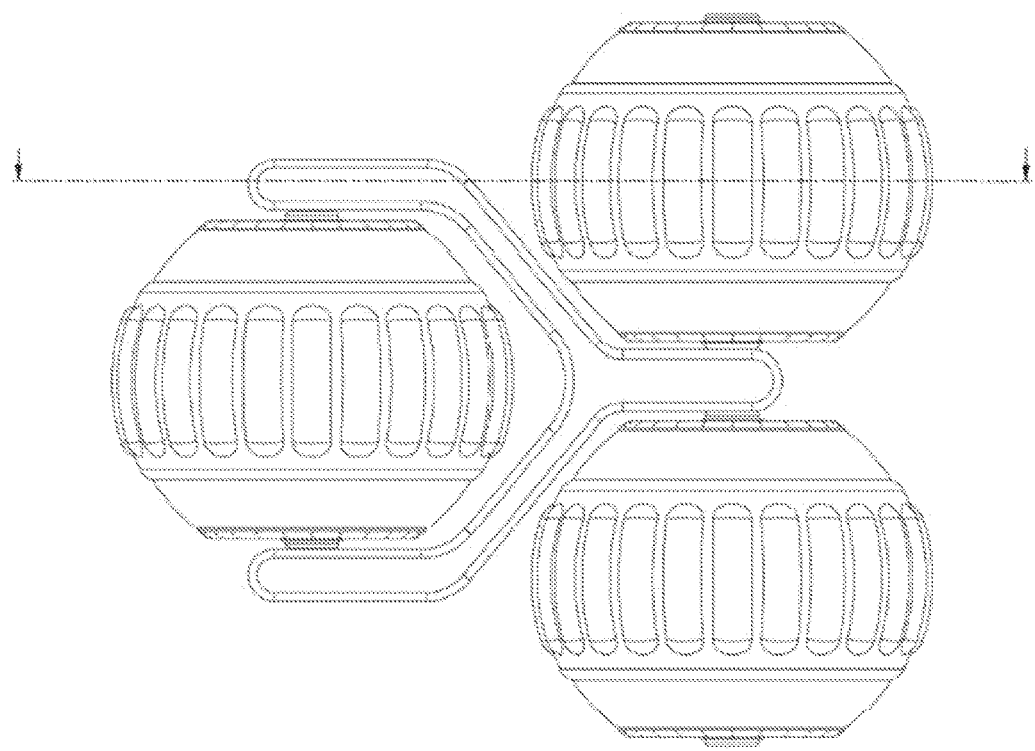
FIGS. 22a-b depict a section view of another embodiment of the present disclosure.
Figure 22B:
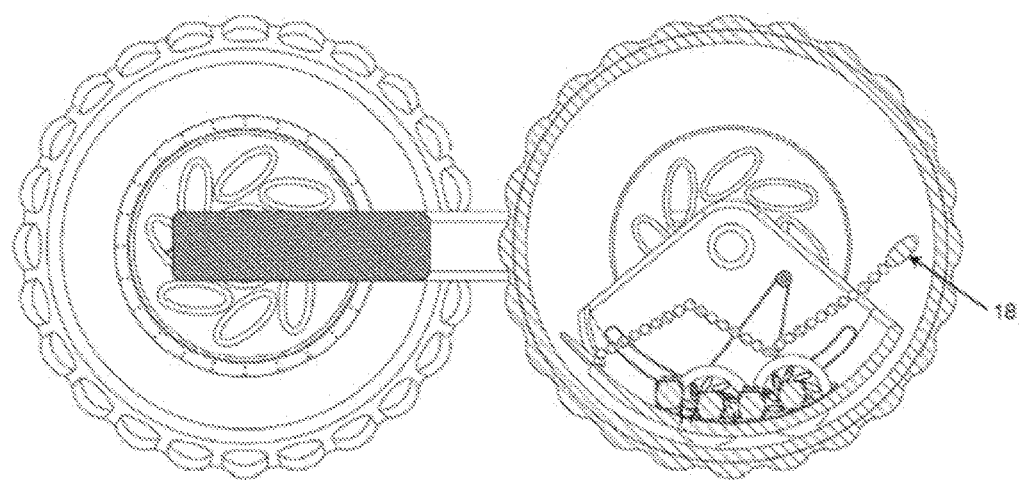
Figure 24:
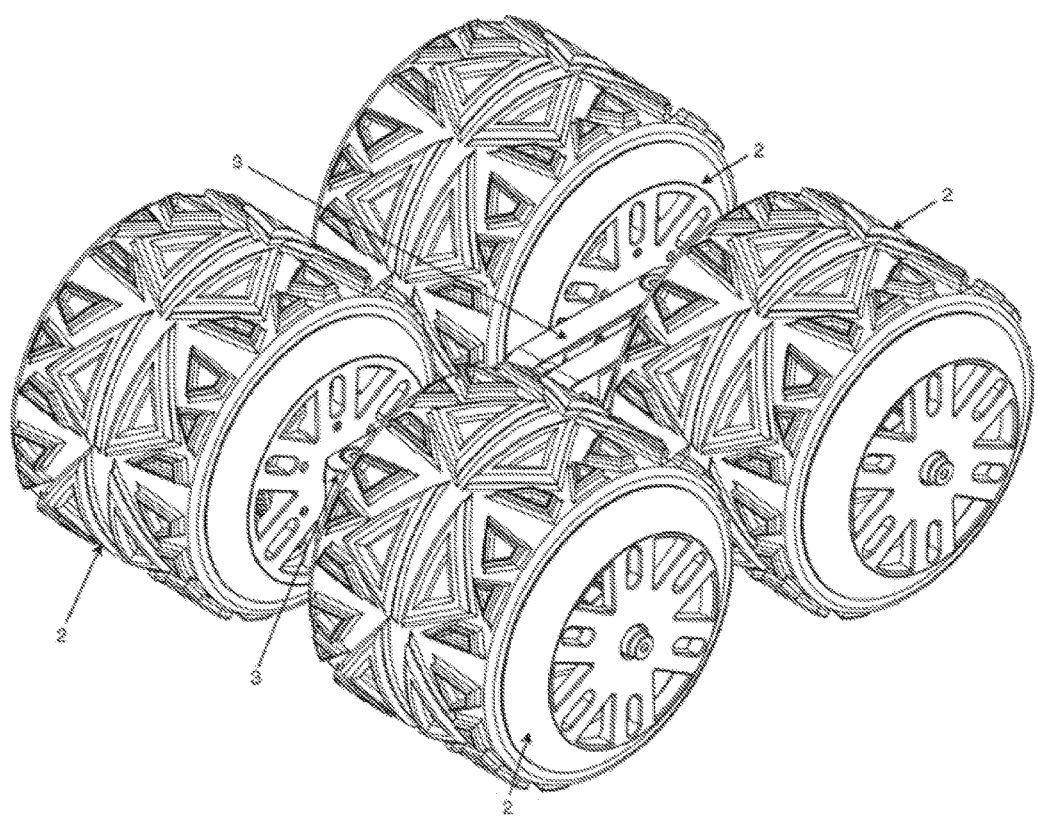
FIG. 24 is an isometric view of another embodiment of the present disclosure.
Figure 25:
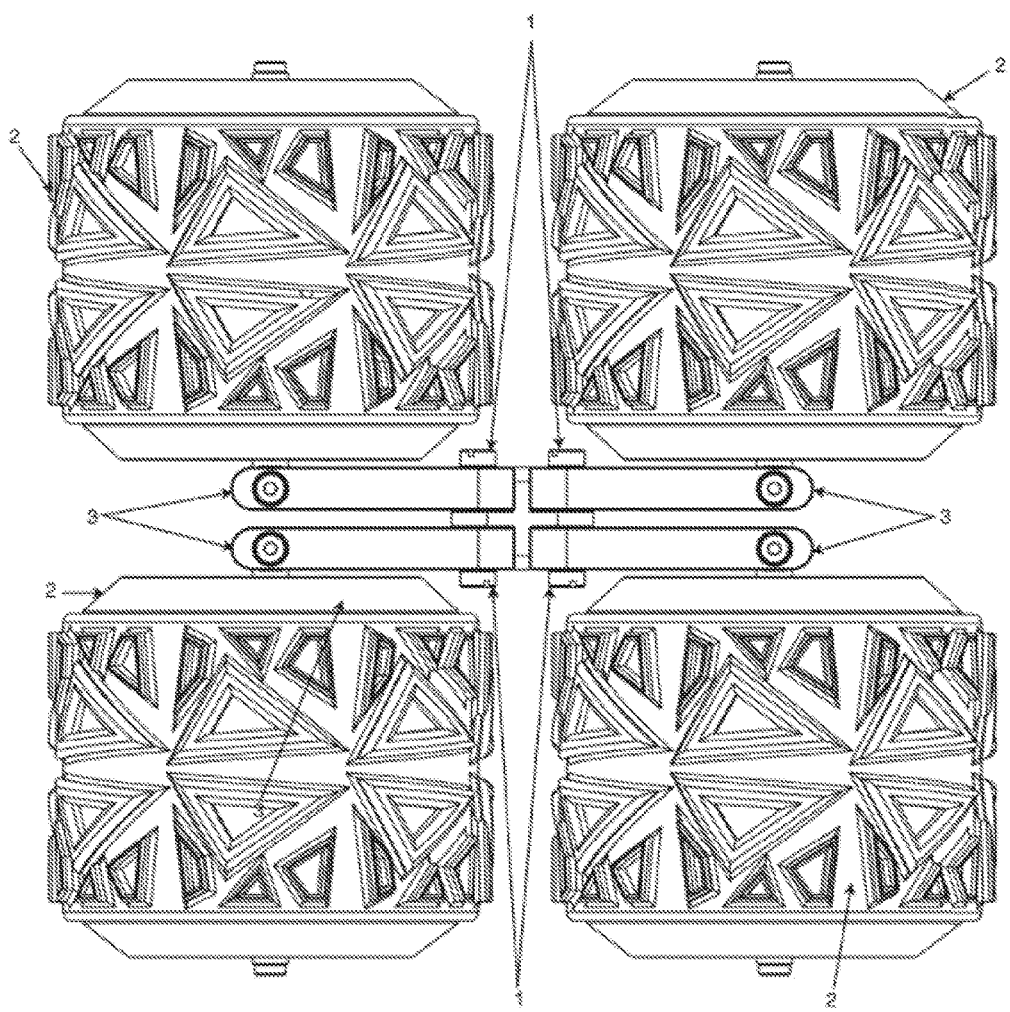
FIG. 25 is a top view of the embodiment of FIG. 24.
Figure 26:
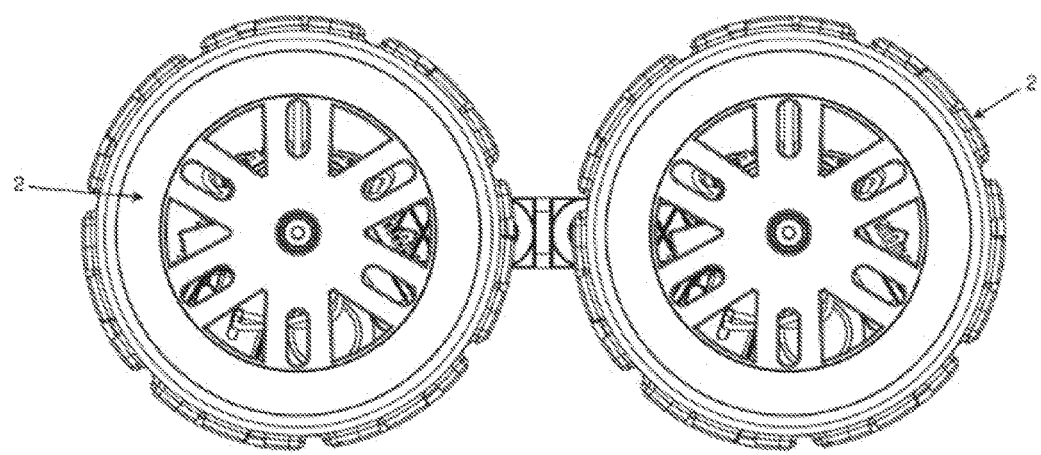
FIG. 26 is a side view of the embodiment of FIG. 24.
Figure 27:
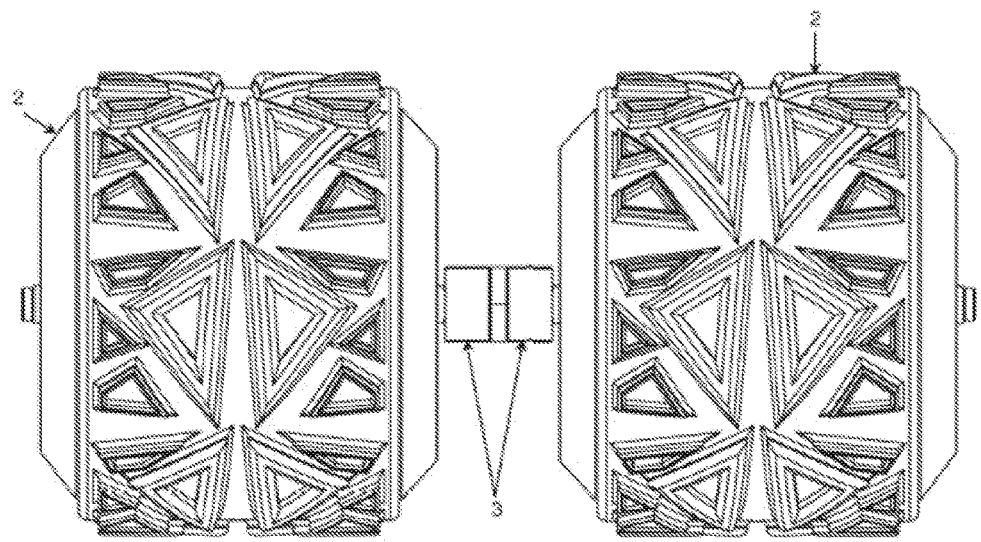
FIG. 27 is a back view of the embodiment of FIG. 24.
Figure 28A:
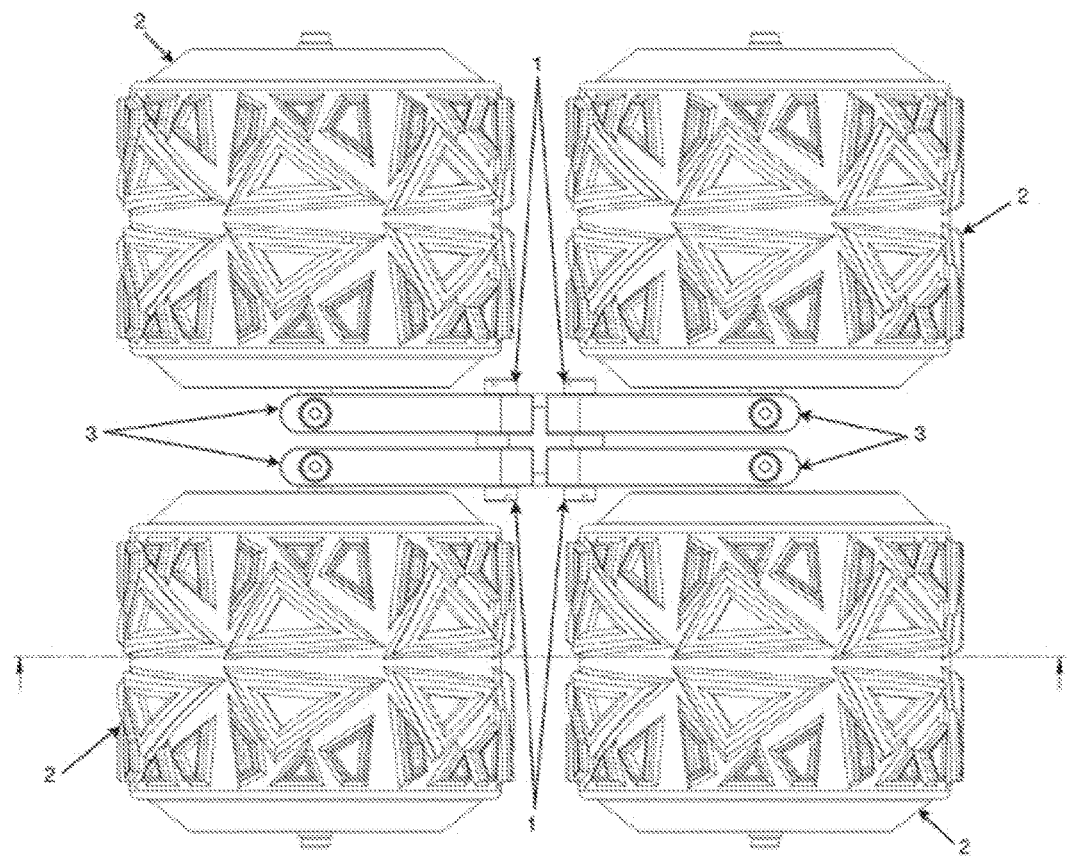
FIGS. 28a-b depict a section view of the embodiment of FIG. 24.
Figure 28B:
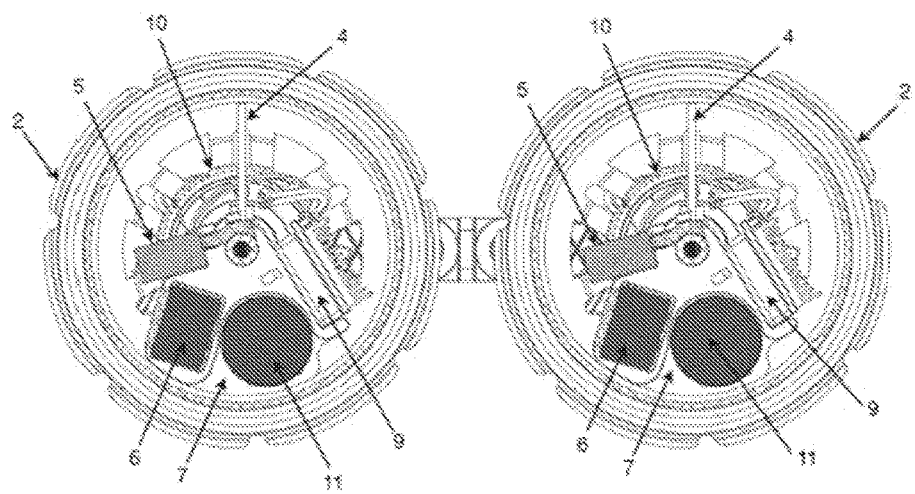
Figure 29:
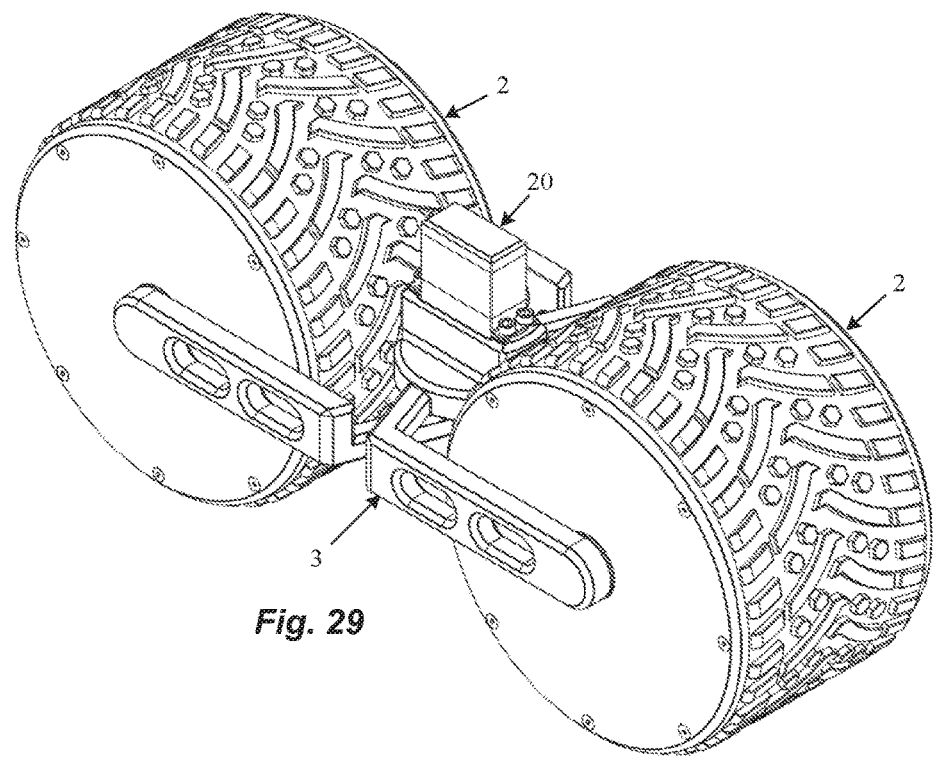
FIG. 29 is an isometric view of another embodiment of the present disclosure.
Figure 30:
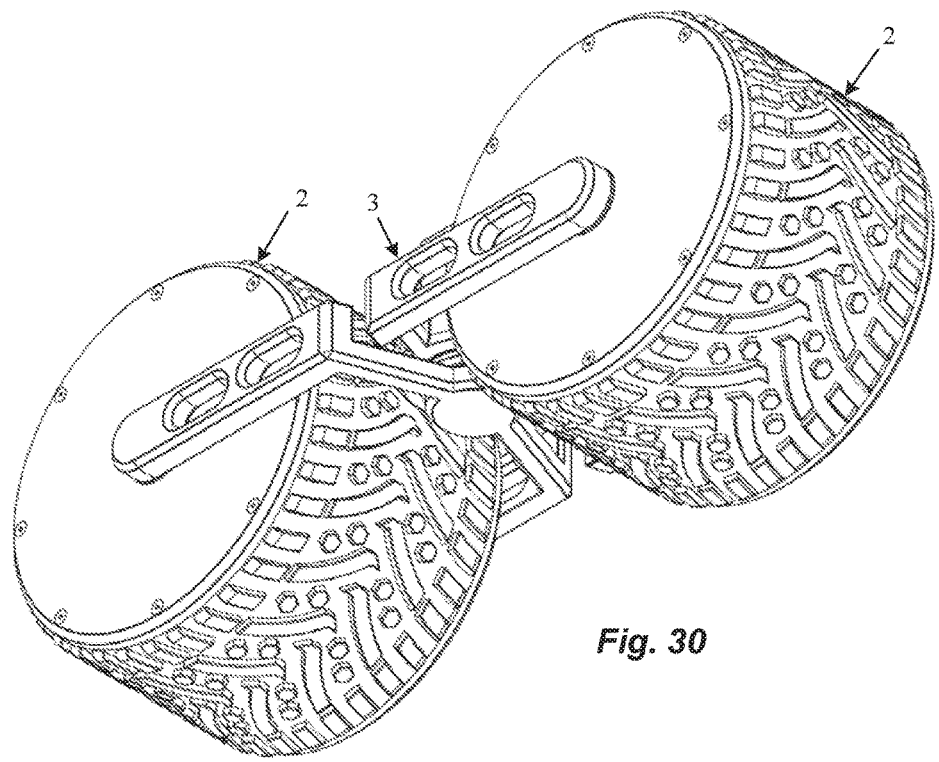
FIG. 30 is another isometric view of the embodiment of FIG. 29.
Figure 33:
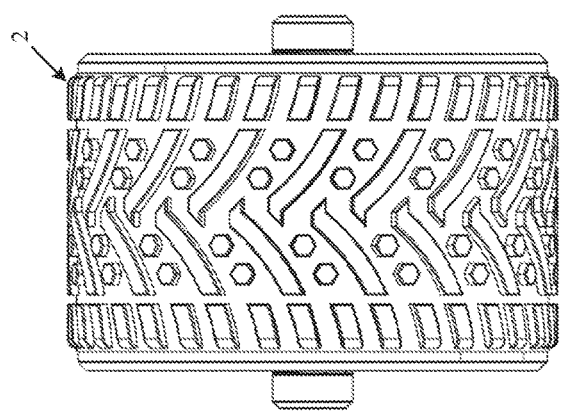
FIG. 33 is a front view of the embodiment of FIG. 29.
Figure 32:
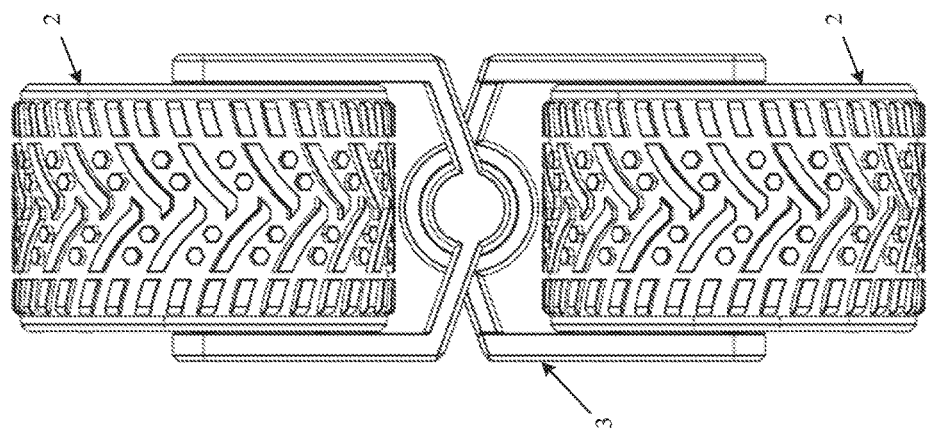
FIG. 32 is a bottom view of the embodiment of FIG. 29.
Figure 31:
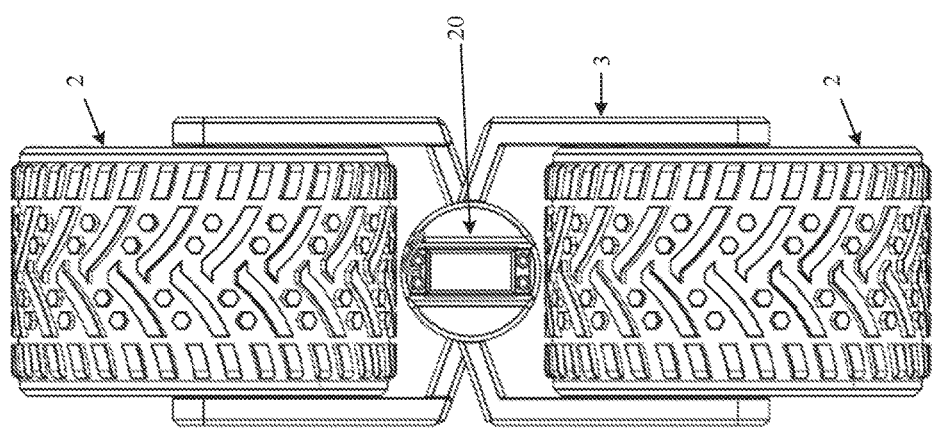
FIG. 31 is a top view of the embodiment of FIG. 29.
Figure 34:
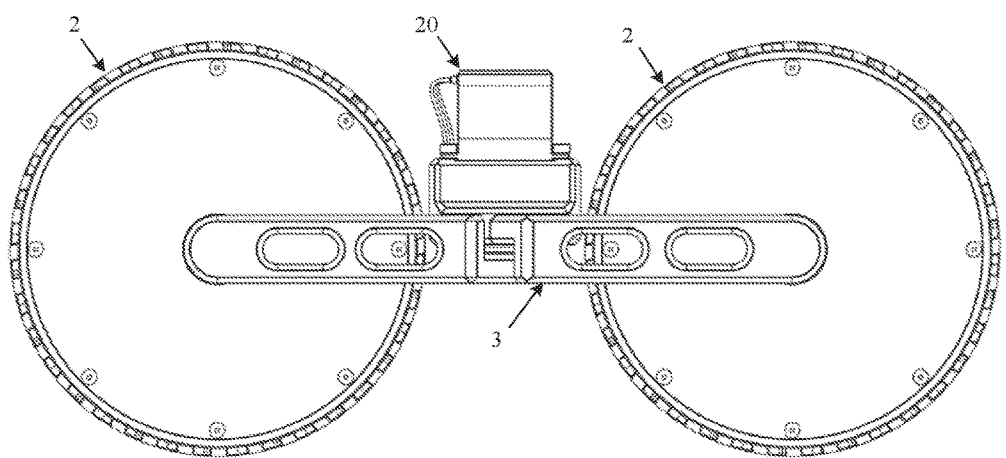
FIG. 34 is a side view of the embodiment of FIG. 29.
Figure 35:
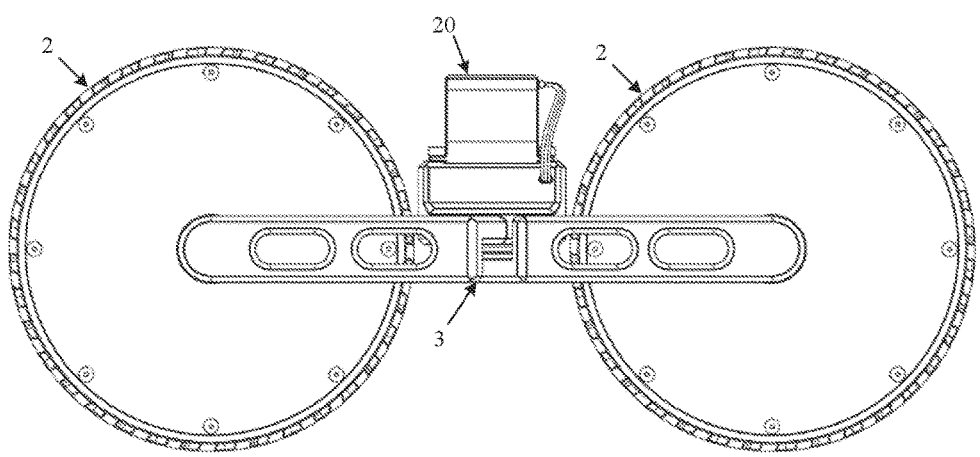
FIG. 35 is another side view of the embodiment of FIG. 29.
Figure 36:
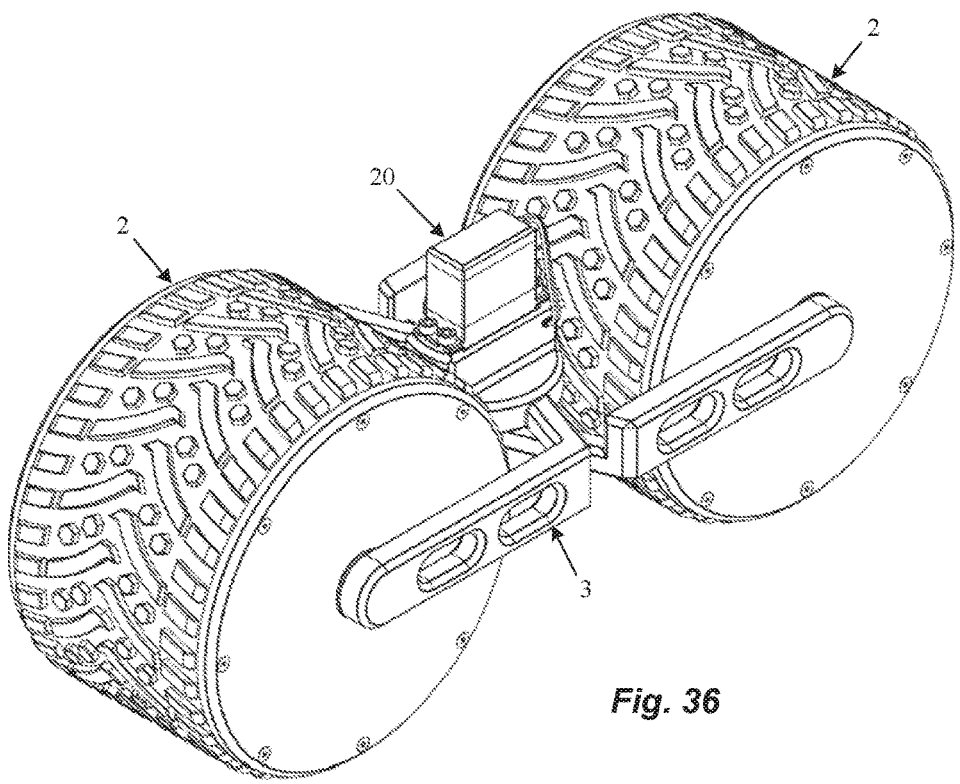
FIG. 36 is another isometric view of the embodiment of FIG. 29.
Figure 37:
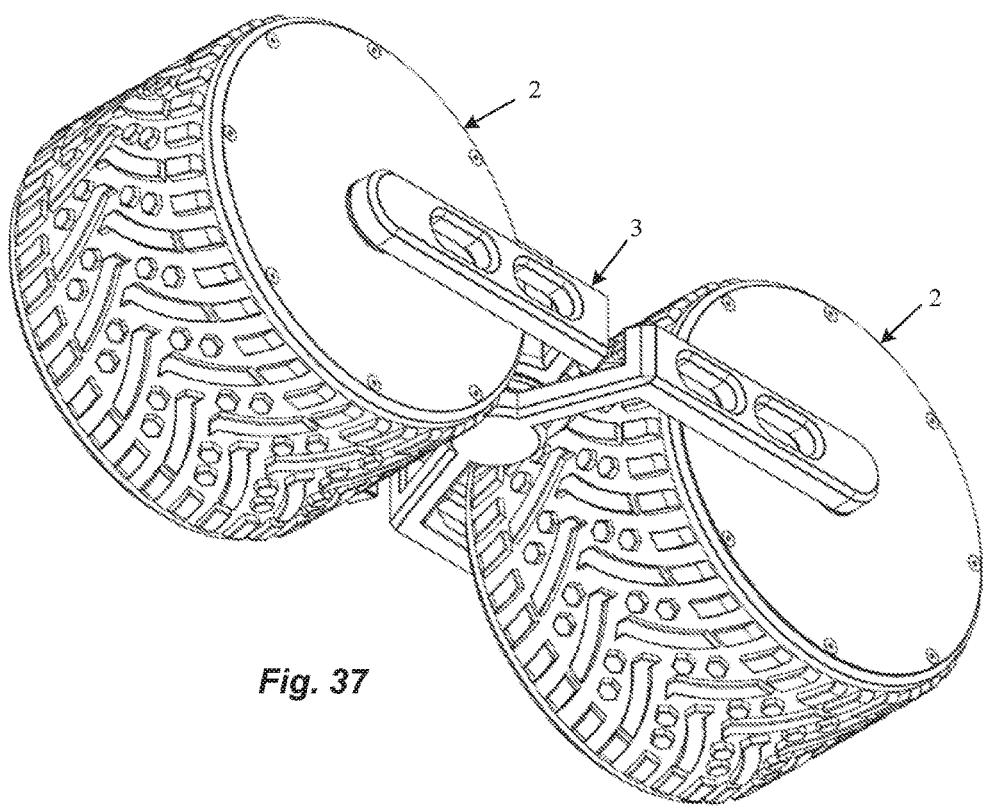
FIG. 37 is another isometric view of the embodiment of FIG. 29.
Figure 38:
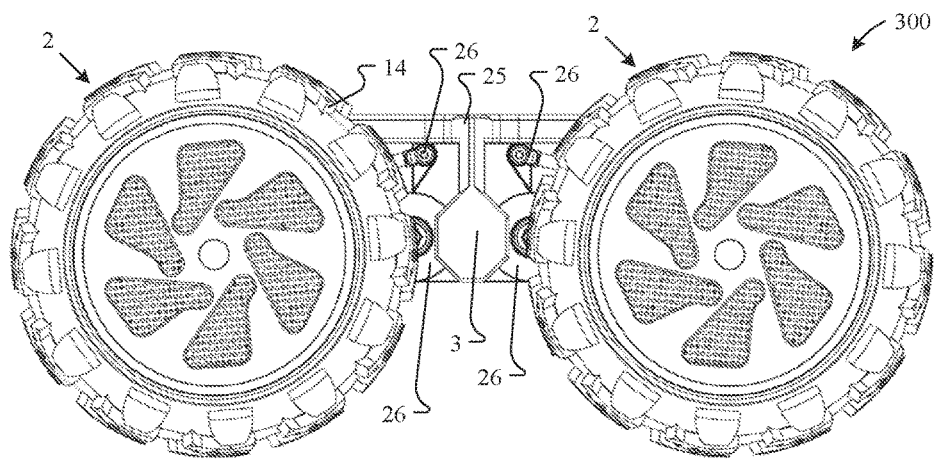
FIG. 38 is a side view of another embodiment of the present disclosure.
Figure 39:
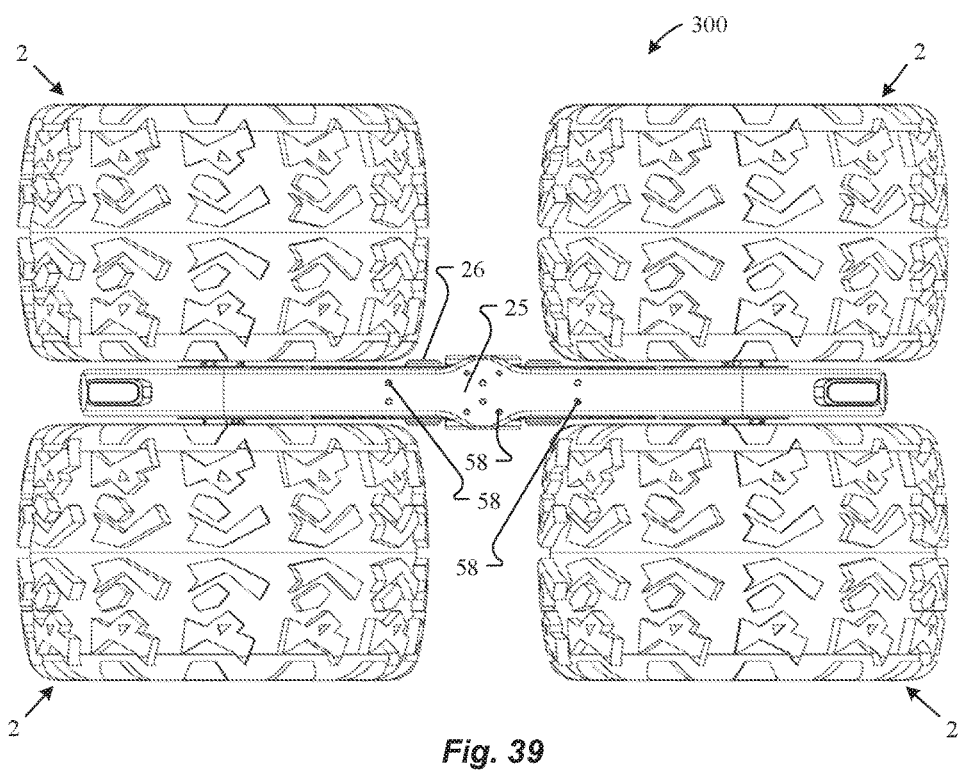
FIG. 39 is a top view of the embodiment of FIG. 38.
Figure 40:
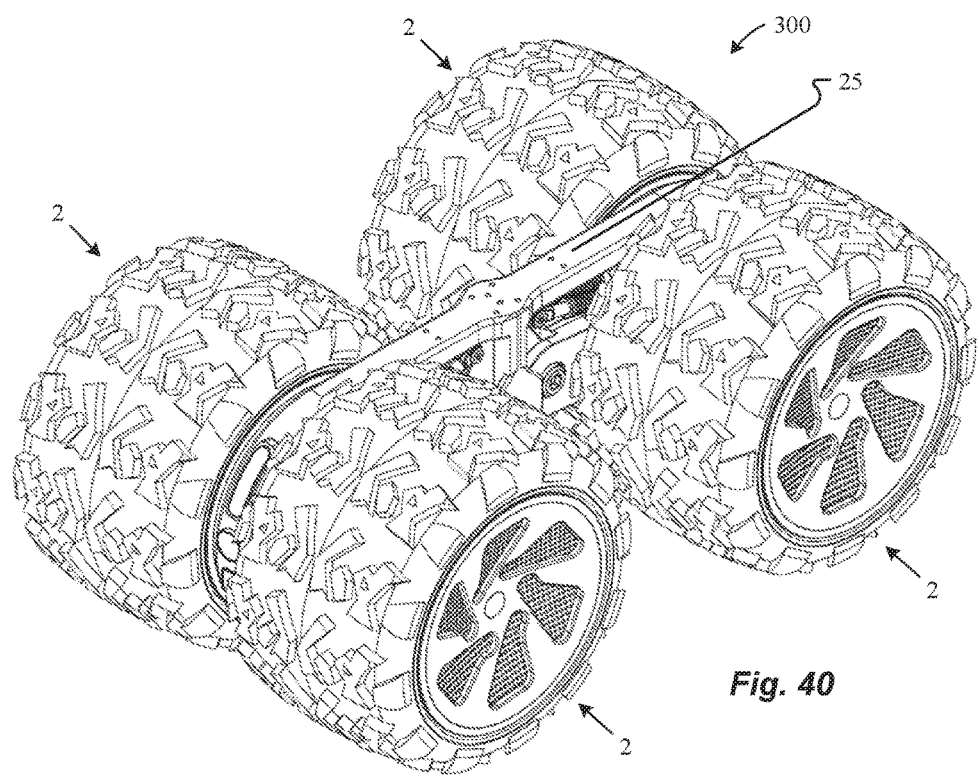
FIG. 40 is an isometric view of the embodiment of FIG. 38.
Figure 41:
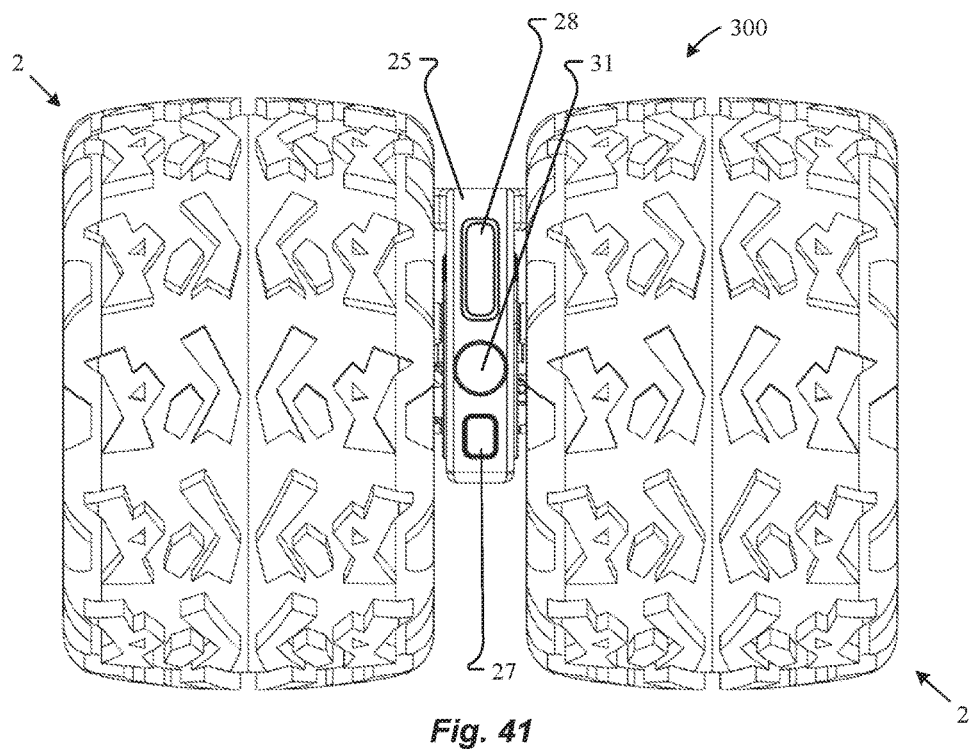
FIG. 41 is a front view of the embodiment of FIG. 38.

FIGS. 22*a-b* present an embodiment of the present disclosure that is built to move people. Although depicted only in connection with this three-wheel embodiment, any embodiment of the present disclosure can be adapted to carry one or more persons. The chair 18 shown in FIG. 22*b* allows a person to drive the vehicle from within the wheel 2 itself, which further lowers the vehicle's center of gravity. As persons of ordinary skill in the art will recognize, equipment specific to the remote operation of a vehicle is not required in embodiments of the present disclosure adapted to be control by a person within the vehicle. Some embodiments, however, include equipment for both remote operation and direct control, thus allowing the vehicle to be used in different ways to meet the requirements of a particular purpose or mission.

Figure 23:
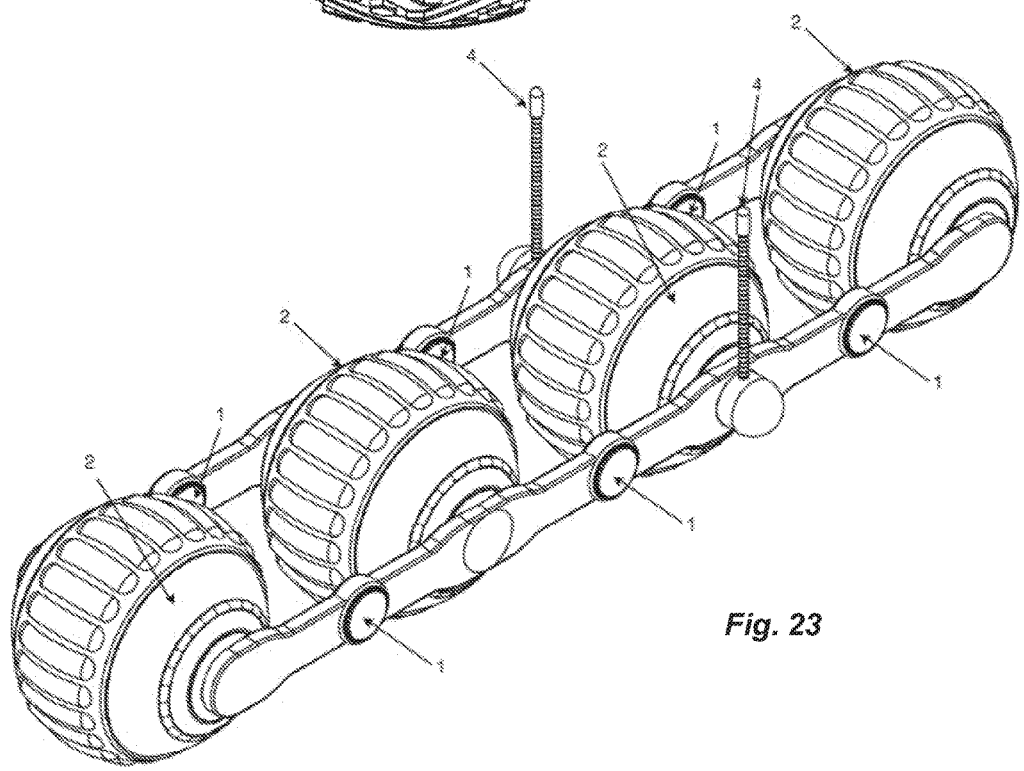
FIG. 23 is an isometric view of another embodiment of the present disclosure.

FIG. 23 presents another embodiment that, similar to the two-wheel variation shown in FIGS. 19-21, has linearly aligned wheels 2. In other words, the wheels 2 are in line with each other, as are the wheels of a motorcycle. This embodiment differs from the embodiment depicted in FIGS. 19-21 in that it employs four wheels 2. Hinged joints 1 on the frame 3 between each wheel 2 allow each wheel 2 to move up and down with varying terrain. This embodiment, as with other embodiments, is not limited to the number of wheels shown.

FIGS. 24-28 display another important embodiment of the present disclosure, which has four wheels 2 in an arrangement similar to that of a typical car. Directional control of this embodiment is provided by independently adjusting the speed of the left-side and right-side wheels 2, similar to the way a tank directionally steers. This steering option is, once again, only an option and is not meant to limit the scope of the invention. The embodiment shown in FIGS. 24-28 has four (optional) separate hinge points 1, allowing all four wheels 2 to move up and down independently from each other. As best seen in FIG. 28b, in this embodiment, as in other embodiments described herein, as much of the vehicle's weight as possible is located inside the wheels 2 and below the axles 12. The four-wheel embodiment provides advantages and disadvantages over the three-wheel embodiment of FIG. 1. One disadvantage is the lack of a center wheel 2 for use as a pivot for steering. The four-wheel embodiment can still turn quickly, but not as easily and with more friction than the three-wheel embodiment of FIG. 1. One advantage is that the additional wheel provides a balanced front and back, resulting in a vehicle without a front end or back end. This, in turn, allows the four-wheel embodiment to have the same driving characteristics in both forward and reverse. Another advantage of the four-wheel embodiment relative to the three-wheel embodiment is that the fourth wheel 2 provides additional traction, i.e. for climbing steep terrain. Additionally, in some embodiments, the wheels can be offset from one another. In particular, the left wheels (e.g., left two, three, four, or more wheels) can be slightly offset relative to the right wheels such that the center of rotation of one wheel does not coincide with a center of rotation of another wheel. Then, for example, when the vehicle encounters a challenging obstacle, only one wheel of the vehicle encounters the challenging obstacle at a time. As with other embodiments depicted herein, the side-by-side arrangement of the wheels 2 depicted in FIGS. 24-28 is not limited to four-wheel embodiments of the present disclosure. An embodiment having, for example, six or eight wheels 2 can also utilize a side-by-side wheel arrangement while providing greater traction and/or buoyancy for various applications.

FIGS. 29-37 depict yet another embodiment of the present disclosure, having two wheels 2. The frame 3 of this embodiment comprises two components, each connected to a wheel 2 and pivotally connected to each other. A motor or servo 20 is attached to the frame 3 and configured to rotate the components of frame 3 relative to each other, thus providing directional control to the vehicle. In some embodiments, the motor or servo 20 may be equipped with its own receiver and control system, while in other embodiments the motor or servo 20 may be in wired communication (i.e. through one or both components of frame 3) with a receiver and control system with one or both wheels 2. The frame 3 and/or motor or servo 20 may also be equipped with a damper system to prevent unwanted rotation of the components of frame 3 around the pivot point. Although this pivoting frame 3 is shown in connection with a two-wheeled vehicle, a pivoting frame may also be used in vehicles having more than two wheels.

Embodiments of the present disclosure may utilize wheel tilting or leaning suspension systems. The suspension system may be tuned to provide even wheel lean, or it may be controlled automatically or manually. Additionally, the suspension may be configured to provide proper wheel lean regardless of whether the vehicle is moving forward or backward.

It is important to note that the present disclosure describes a platform for a vehicle structure that lowers the center of gravity, allowing for improved climbing of obstacles and improved cornering capability. The platform is not limited to the size or type of motors (or engines) used, the electronics displayed in this document, the configuration of the electronics, or the vehicle propulsion methods. Nor does the platform limit the amount or type of additional sensors or electronics that may be used together with the vehicle structure described herein. As one non-limiting example, a people mover embodiment of the present disclosure may employ cameras with monitors to allow the driver to operate the vehicle from within one of the wheels 2. As another non-limiting example, remote cameras, or weapons systems not shown in this document, may be added to embodiments of the present disclosure. Even mechanical arms and sensors (i.e. for bomb disposal or other hazardous operations) may be included in embodiments of the present disclosure, as described in greater detail below.

Embodiments of the present disclosure have many applications, some of which are discussed above. As another non-limiting example, each soldier in a small group could carry a single wheel 2 and/or a portable frame 3 (or portable elements to construct a frame 3). The wheels 2 could be combined on or off the battlefield with the frame 3 in various configurations to create a variety of functional vehicles for use as the need arises. Because the majority of the drive components are contained within the wheels 2, such that each wheel is self-powered, it is possible to use a single set of a plurality of wheels 2 to create a variety of different embodiments of the present disclosure to perform various functions, all from the same set. By incorporating quick-attach features for the axles 12 of each wheel (even tool-less quick-attach features), the wheels 2 may be easily moved into different configurations on a variety of frames 3, as need to accomplish various applications. For example, three wheels 2 could be configured into a small UGV (unmanned ground vehicle) for scouting ahead, while using another three self-powered wheels 2 to carry extra weight like ammunition. Then, when the need arises, all six wheels 2 from both vehicles could be attached to two backpack frames to create a motorized stretcher for an injured soldier. This same motorized stretcher could become a high speed platform to move a sniper into position, while staying extremely low to the ground to avoid detection. As another example, an embodiment of the present disclosure could be used to move a heavy weapon into place, then the wheels 2 could be removed from the vehicle and reconfigured as needed for use on the battlefield as an ROV or to move additional heavy weapons into place without the need to create an entire vehicle structure for each weapon platform.

As yet another example, in some embodiments of the present disclosure the frame 3 and/or another component of the vehicle is equipped with magnets sufficiently strong to support the weight of the vehicle. In such embodiments, the vehicle can travel vertically or upside down over metal surfaces, with the magnets providing sufficient attractive force to the surface to overcome the force of gravity. Such embodiments could also, for example, be adapted for travel over water as previously described herein, and could then climb up the hull of a ship for emergency response, reconnaissance, surveillance, or other purposes. These are but a few of the many options for embodiments of the present disclosure and are not meant to limit the scope of the disclosure. Indeed, vehicle platforms described herein may be combined with numerous technologies to fulfill a wide variety of purposes or missions.

In various embodiments according to the present disclosure, one or more vehicle components such as the battery 6 can be mounted below the level of the wheel axles 12, but outside of the wheels 2 on the frame 3. Such an arrangement frees up space in the wheel interior for a larger motor 11, more storage, or other purposes. The battery 6 (or other frame-mounted component(s)) may be slung below the frame 3 on a mount. The mount may be fixed, or it may be rotatable around the frame 3 such that if and when the vehicle flips over, the force of gravity causes the frame-mounted component to either remain in position underneath, or to rotate back underneath, the frame 3. The same flipping mechanisms and methods described above with respect to components mounted on or around the axles 12 may also be used for components mounted on or around the frame 3.

In amphibious embodiments of the present disclosure, vehicle components that are waterproof or that can easily be waterproofed may be mounted on the frame 3, while space inside the wheels 2 may be utilized for vehicle components that are not waterproof and cannot easily be waterproofed.

In still other embodiments, each wheel 2 on a vehicle according to the present disclosure includes a motor 11 (mounted inside the wheel 2 and below the wheel axle 12, as described above). Depending on the purpose for which the vehicle will be used, placement of a motor 11 in each wheel 2 can be advantageous, for example, for reducing the size of each motor (e.g. to maximize interior wheel space), increasing the overall power of the vehicle (e.g. to maximize speed or carrying capacity), and/or improving the controllability of the vehicle (e.g. to enhance vehicle handling).

A series of additional embodiments of the present disclosure, some implementing one or more of the concepts discussed above, will now be described.

FIGS. 38-41 depict a vehicle 300 according to an embodiment of the present disclosure, the vehicle 300 comprising four wheels 2 mounted to a frame 3. Depending on the overall dimensions of the vehicle and the loads that it may be expected to carry, the frame 3 may be made of a stiff plastic, of a composite material such as fiberglass or carbon-fiber, of wood, or of metal. The frame 3 comprises suspension elements 26 as well as a mounting bar 25, to which a variety of tools, devices, or implements may be attached. Example tools, devices, or implements include, without limitation, a stretcher, a cargo carrier, a robotic arm, and a weapon or weapons system. The mounting bar 27 may comprise a plurality of attach points 58 to facilitate the rapid attachment and detachment of a given tool, device, or implement to or from the mounting bar 25. The vehicle 300 is thus highly versatile and quickly adaptable for different purposes by simply changing the tool, device, or implement that is attached to the mounting bar 25.

Also provided on the frame 3 of the vehicle 300 are one or more sensors 27, one or more lights 28, and one or more cameras 31. The cameras 31 may be used to provide images or a video feed of the terrain and any obstacles in front of the vehicle 300 to an operator thereof. The light 28 may be used for the purpose of providing light needed for the proper operation of the cameras 31 and/or sensors 27. For example, if the vehicle 300 is utilized at night or in a dark environment, the light 28 may provide lighting necessary to allow the cameras 31 to obtain a properly exposed image or video feed.

Images or video feeds obtained by the cameras 31, and data obtained by the sensors 27, may be transmitted to a control station, where an operator of the vehicle 300 may use the transmitted images, video feeds, and/or data to guide the vehicle 300. When the control station and the operator are located within one of the wheels 2, the data from the cameras 31 and the sensors 27 may be transmitted via a wired connection (e.g. through the frame 3) or a wireless connection to the control station. When the control station and the operator are located remotely, the images and/or video feeds from the cameras 31 and data from the sensors 27 may be transmitted via a wireless connection.

Each camera 31 may be a still camera or a video camera. The cameras 31 may further be configured to capture and record images or video feeds in the visible light spectrum or in the infrared spectrum. The cameras 31, which are preferably although not necessarily digital cameras, may be coupled to a processor configured to enhance or otherwise process captured images or video feeds. The cameras 31 may also be in communication with a computer readable memory, in which images or video feeds captured by the cameras 31 may be stored. In some embodiments, the cameras 31 may be mounted in a fixed position, while in other embodiments, the cameras 31 may be attached or affixed to a movable mount or platform that can adjust the direction and angle in which the cameras 31 point based on signals received from an operator. For example, a movable mount may utilize motors or servos that respond to received signals by turning one or more gears to move the camera mount relative to one or more axes or planes.

The sensors 27 may comprise one or more of, for example, a microphone, a temperature sensor, an infrared sensor, an ultraviolet sensor, a proximity sensor, and an optical spectrometer. The sensors 27 may utilize one or more of a laser, a radar, and a sonar. The sensors 27 may be controllable by an operator of the vehicle 300, or they may operate automatically. In some embodiments, the operation of one or more of the sensors 27 may be automatic, but operation of the sensors 27 may also be dependent on whether the vehicle 300 is powered on or off, whether the vehicle 300 is stopped or in motion, and/or the speed of the vehicle 300. Although the cameras 31, the sensors 27, and the light 28 are depicted on the vehicle 300 depicted in FIGS. 38-41, other embodiments of a vehicle like the vehicle 300 with a mounting bar 25 may not have one or more of the cameras 31, the sensors 27, and/or the light 28.

With reference now to FIGS. 42-44, a vehicle 310 according to some embodiments of the present disclosure may comprise a basket stretcher 30 mounted to a mounting bar 25 of a vehicle similar or identical to the vehicle 300. The basket stretcher may be configured with attachment points that match the attachment points 58 of the mounting bar 25, so as to facilitate the rapid attachment and detachment of the basket stretcher 30 to the mounting bar 25. To ensure the basket stretcher 30 has adequate clearance above the wheels 2 of the vehicle 310, the mounting bar 25 may be adjustable from a lowered position as depicted in FIGS. 38-41 to a raised position by adjusting the suspension elements 26 as depicted in FIGS. 42-44.

Camera 31*a* may be mounted to one side of the basket stretcher 30 near one end thereof, and used to capture images or a video feed useful for operating the vehicle 310 remotely (e.g. by providing an operator with an image or video feed of what is in the path of the vehicle 310). The camera 31*a* may be in communication with an antenna 32a, which may be used to receive commands from an operator (e.g. via a control station) regarding operation of the camera and/or of a mount to which the camera is connected, and may also be used to transmit data from the camera to an operator (e.g. to the operator's control station).

Camera 31b may be mounted sufficiently above the basket stretcher 30 to allow visual monitoring of a patient being transported by the basket stretcher 31b. For example, an operator of the vehicle 310 may monitor the patient from a control station, or a physician or other health care provider—who may be stationed at the control station or remotely from the control station—may monitor the patient. The camera 31b may be in communication with an antenna 32b, which may have the same or similar functionality as the antenna 31a. However, the antenna 32b may, but need not, transmit data from the camera 32b to the same or to a different place as the antenna 32a.

Figure 45:
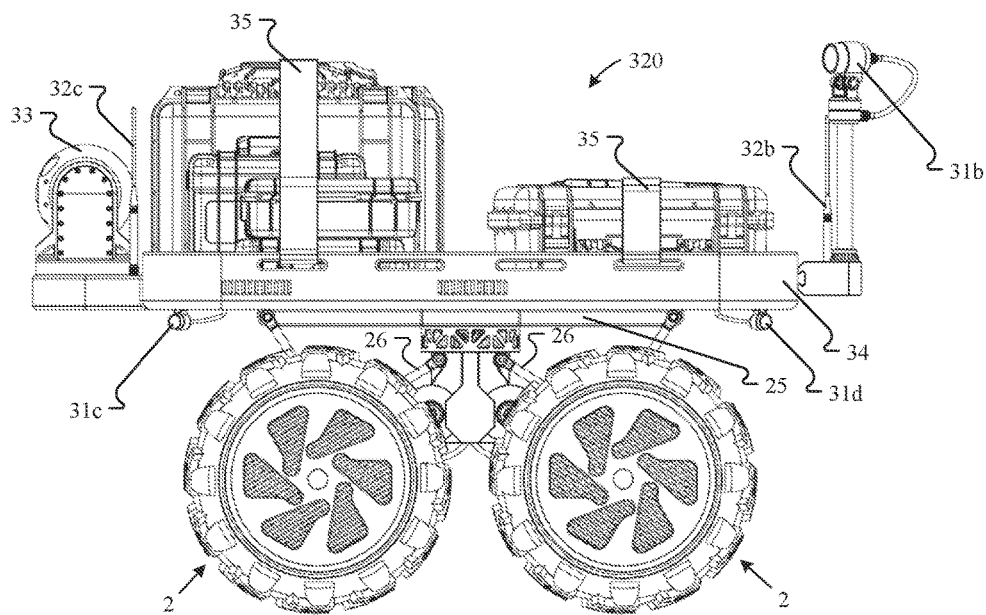
FIG. 45 is a side view of another embodiment of the present disclosure.
Figures 46, 47:
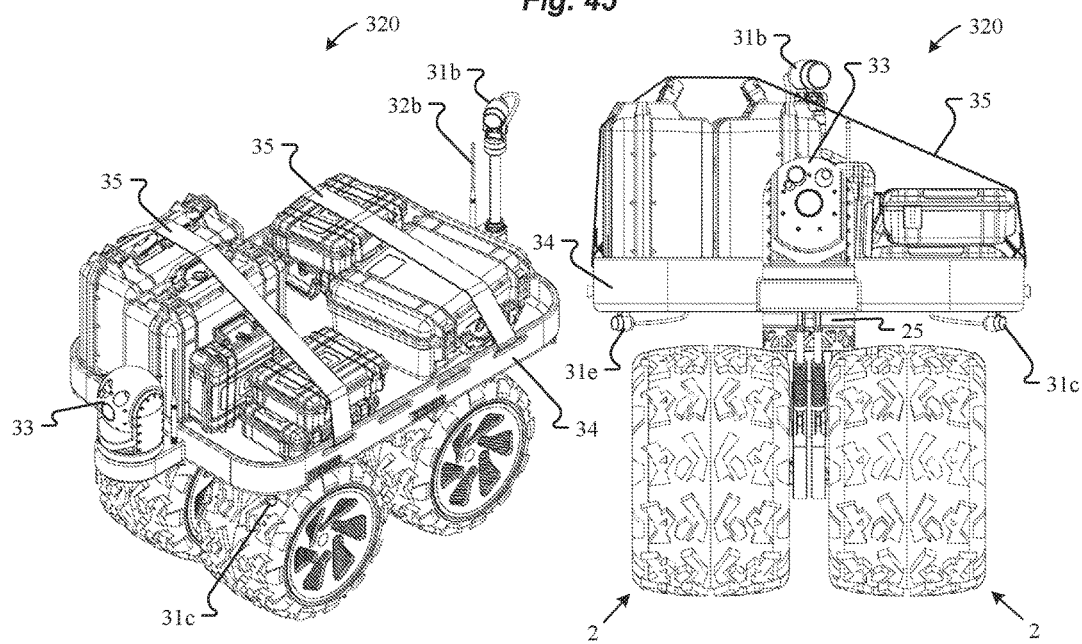
FIG. 46 is an isometric view of the embodiment of FIG. 45.
FIG. 47 is a front view of the embodiment of FIG. 45.

FIGS. 45-47 depict another vehicle 320 according to embodiments of the present disclosure. The vehicle 320 may be the same as or similar to the vehicles 300 and 310, but with a cargo rack 34 mounted to the mounting bar 25. As with the stretcher 30, the cargo rack 34 may comprise a plurality of attachment points that match the attachment points 58 on the mounting bar 25, to facilitate the rapid attachment and detachment of the cargo rack 34 to the mounting bar 25. The cargo rack 34 may comprise one or more straps 35 for securing cargo to the rack 34. A camera 31b may be mounted sufficiently above the cargo rack 34 to allow visual monitoring of the cargo on the cargo rack 34, and a plurality of cameras 31c, 31d, and 31e may be mounted around the perimeter of the cargo rack 34 so as to allow visual monitoring of the area surrounding the vehicle 320. Such visual monitoring may be useful, for example, for security purposes (e.g. to prevent theft of cargo on the cargo rack 34) and for safety purposes (e.g. to ensure that the vehicle 320 is not operated in, or is carefully operated when in, close proximity to people, other vehicles, or the like). The cameras 31c, 31d, 31e may also be useful for allowing an operator of the vehicle 320 to see along the path of movement of the vehicle 320, regardless of whether the vehicle moves forward or backward.

Also included on the vehicle 320 is a sensor turret 33. The sensor turret 33 comprises a plurality of sensors and/or cameras, and is rotatably mounted so as to allow the sensor turret 33 to point in any one of a plurality of directions, whether automatically or as directed by the operator of the vehicle 320. For example, the sensor turret 33 may be configured to automatically and continuously scan a predetermined area, or to automatically and continuously scan in a predetermined pattern (which may be, for example, an area or pattern selected by the operator, or an area or patterned programmed into the vehicle 320 or the sensor turret 33 upon manufacture thereof). The sensor turret may be useful for facilitating safe operation of the vehicle (e.g. by sensing obstacles and/or detecting potential collisions and adjusting the speed or direction of the vehicle 320 so as to avoid the obstacles and/or potential collisions), or for monitoring of the environment of the vehicle 320 (including the geographic environment, the human environment, the electromagnetic environment, the aerial environment, or any other environment in or near which the vehicle 320 operates). In some embodiments, one or more instruments, tools, or even weapons may be included in the sensor turret, including, for example, a GPS receiver, a microphone and/or speaker, or a laser for cutting through material or for destroying enemy objects.

Figure 48:
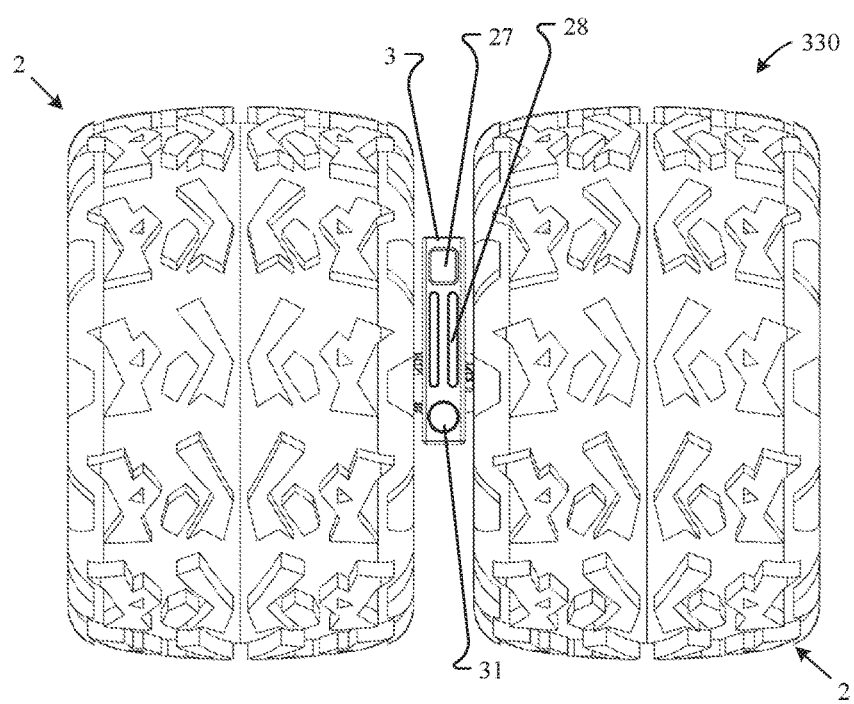
FIG. 48 is a front view of another embodiment of the present disclosure.
Figure 49:
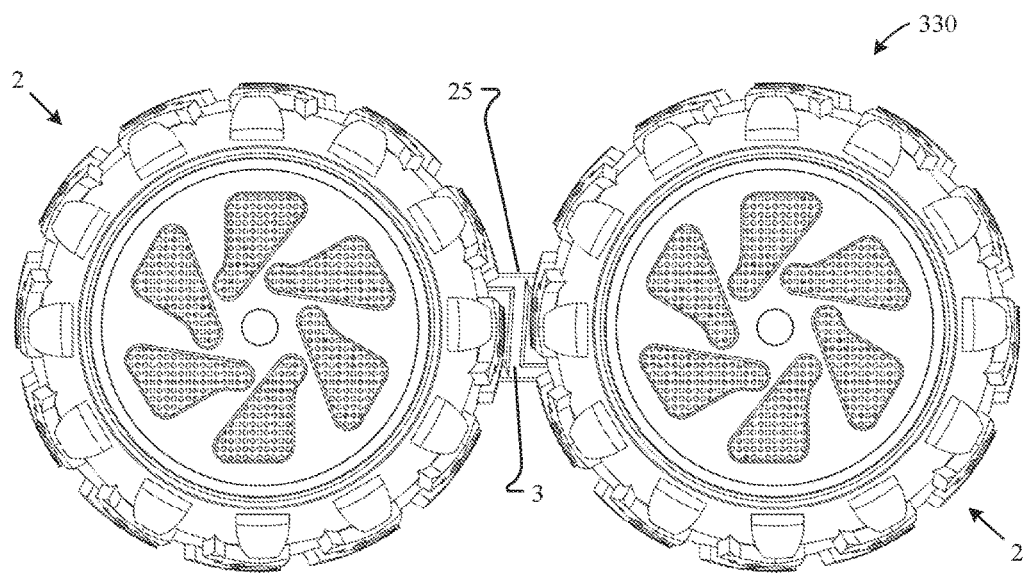
FIG. 49 is a side view of the embodiment of FIG. 48.

Referring now to FIGS. 48-49, a vehicle 330 according to some embodiments of the present disclosure may comprise a frame 3 with a mounting bar 25 and four wheels 2, but may omit the suspension elements 26 of the vehicle 300. As with the vehicle 300, the vehicle 330 may comprise one or more cameras 31, one or more sensors 27, and one or more lights 28 mounted to the frame 3 or the mounting bar 25.

Figure 50:
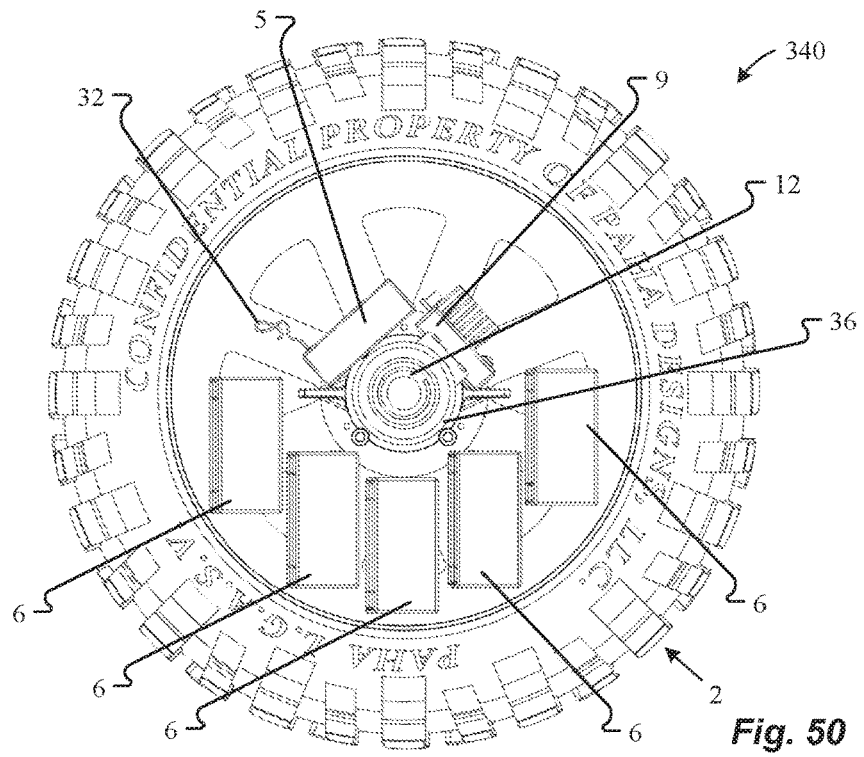
FIG. 50 is a side view of another embodiment of the present disclosure.
Figure 51:
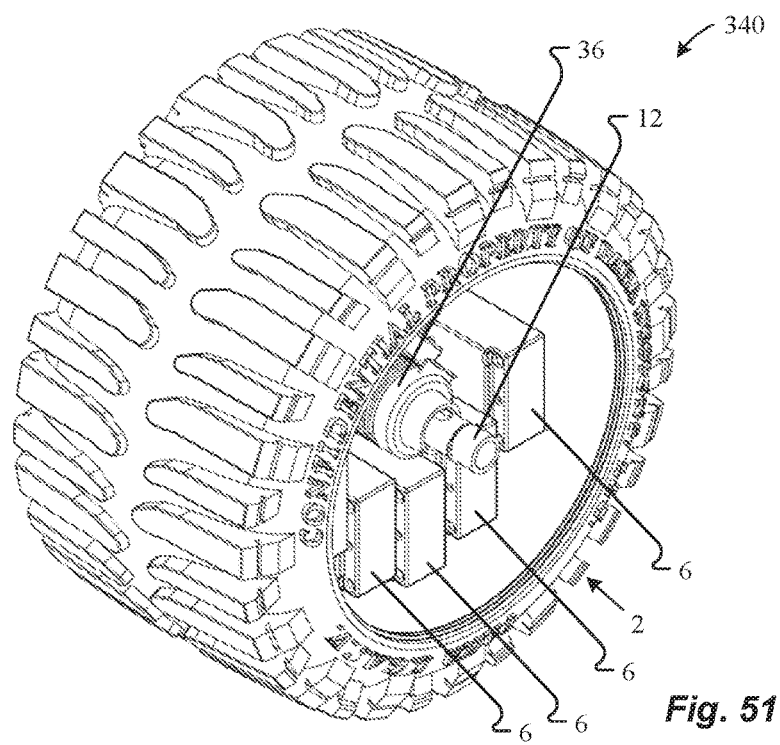
FIG. 51 is an isometric view of the embodiment of FIG. 50.

FIGS. 50-51 depict a vehicle 340 comprising a single wheel 2 comprising a hub motor 32 that is attached directly to the wheel 2 along the axle 12 of the wheel 2. The hub motor 32 is lighter than the five batteries 6 positioned generally below the hub motor 32, thus ensuring that the center of gravity of the wheel 2 remains below the axis of rotation of the wheel 2. The vehicle 340 also comprises a receiver 5 and a motor control 9. The embodiment of FIGS. 50-51 may be used as a stand-alone vehicle 340, as depicted, or a plurality of such embodiments may be utilized on a multi-wheeled vehicle such as the vehicle 300, or a vehicle comprising a plurality of wheels 2 that are not aligned at the axle.

Figure 52:
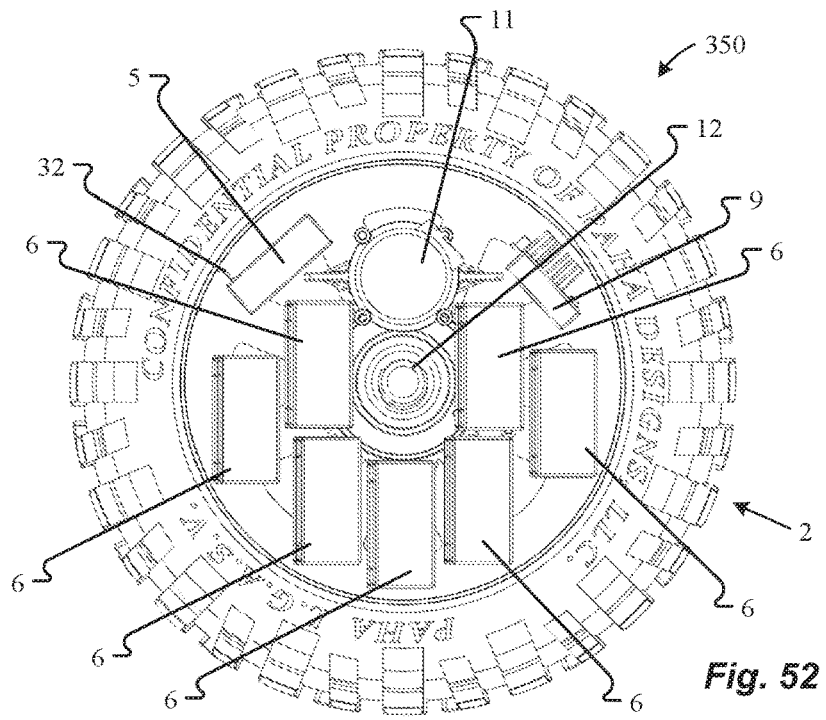
FIG. 52 is a side view of another embodiment of the present disclosure.
Figure 53:
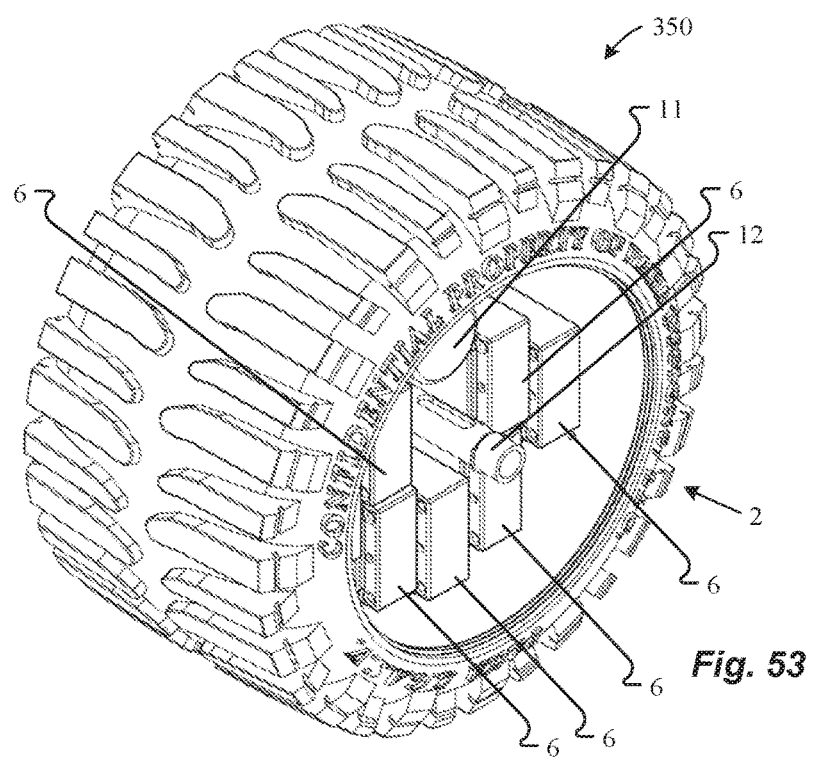
FIG. 53 is an isometric view of the embodiment of FIG. 52.

FIGS. 52-53 depict another self-contained vehicle 350 comprising a single wheel 2. The vehicle 350 comprises a motor 11 with an off-axis mount point, allowing more batteries 6 to fit within the wheel 2. Preferably, but not mandatorily, the motor 11 is mounted above the axle 12 of the wheel 2 of the vehicle 350, thus allowing batteries 6—which, in embodiments, are heavier (i.e. have more mass) than the motor 11—to be positioned as low as possible within the wheel 2, and therefore contributing to the low center of gravity of the vehicle 350. The motor 11 may be operably connected to a spur gear 10, a belt, or a chain for transmitting force to and driving the wheel 2. The motor 11 may be controlled by a motor control or electronic speed control 9, and may receive control signals via a receiver 5. The embodiment of FIGS. 52-53 may be used as a stand-alone vehicle 350, as depicted, or a plurality of such embodiments may be utilized on a multi-wheeled vehicle, including on a multi-wheeled vehicle in which a plurality of wheels are not aligned at the axle.

Figure 54:
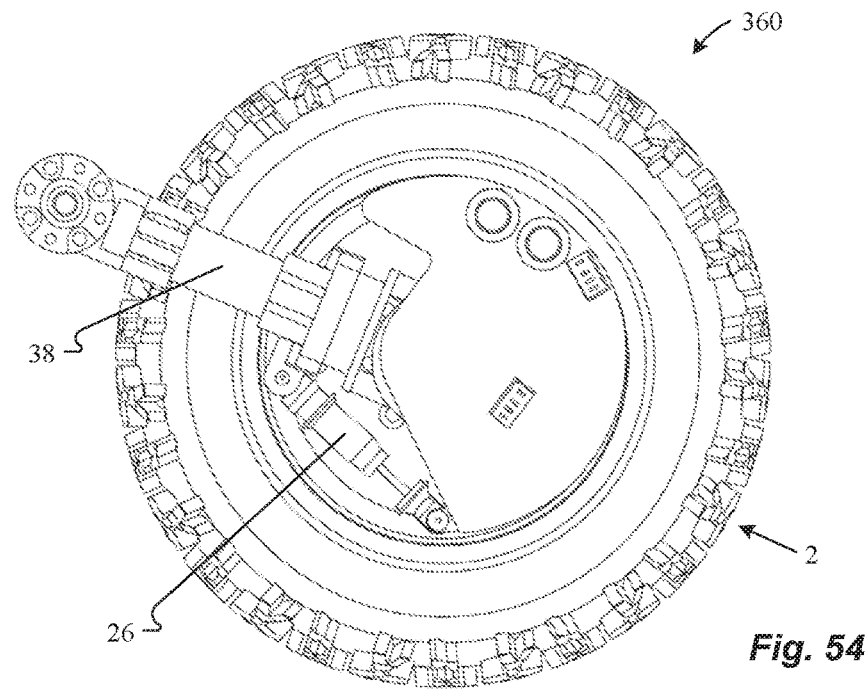
FIG. 54 is a side view of another embodiment of the present disclosure.
Figure 55:
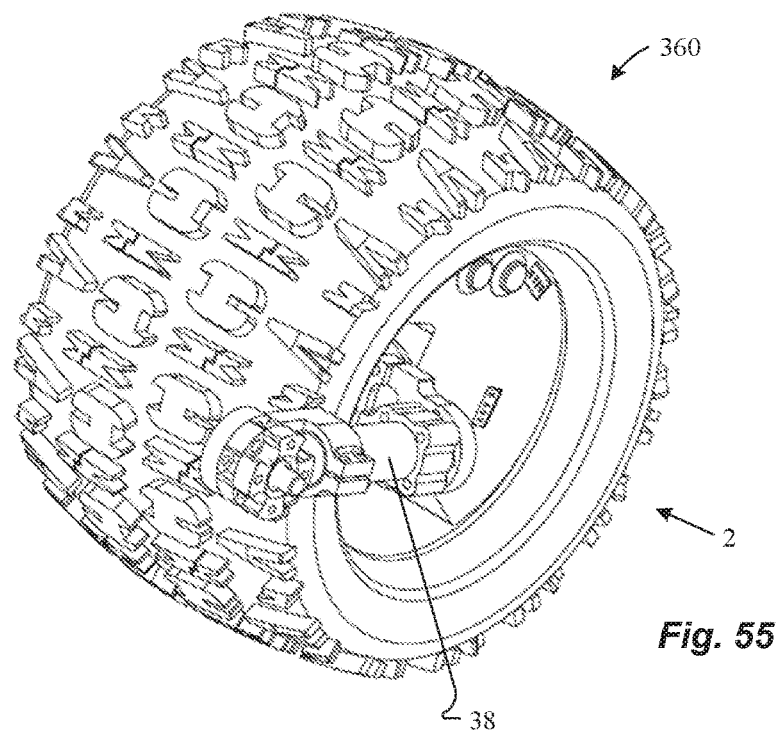
FIG. 55 is an isometric view of the embodiment of FIG. 54.

Vehicle 360 depicted in FIGS. 54-55 comprises internal suspension provided by suspension element 26. Although not visible in FIGS. 54-55, the vehicle 360 may comprise a motor such as the motor 11 within the wheel 2, which may be mounted off-axis. The drive train arm 38 may be configured to transmit force either from such a motor within the wheel 2 to an accessory used in conjunction with the wheel 2 (as in the embodiment of FIGS. 85-86, discussed below), or from an external motor into the wheel 2 for the purpose of driving the wheel 2 (e.g. when the wheel 2 is not equipped with its own motor 11). The embodiment of FIGS. 54-55 may be used as a stand-alone vehicle 360, as depicted, or a plurality of such embodiments may be utilized on a multi-wheeled vehicle, including on a multi-wheeled vehicle in which a plurality of wheels are not aligned at the axle.

Figure 56:
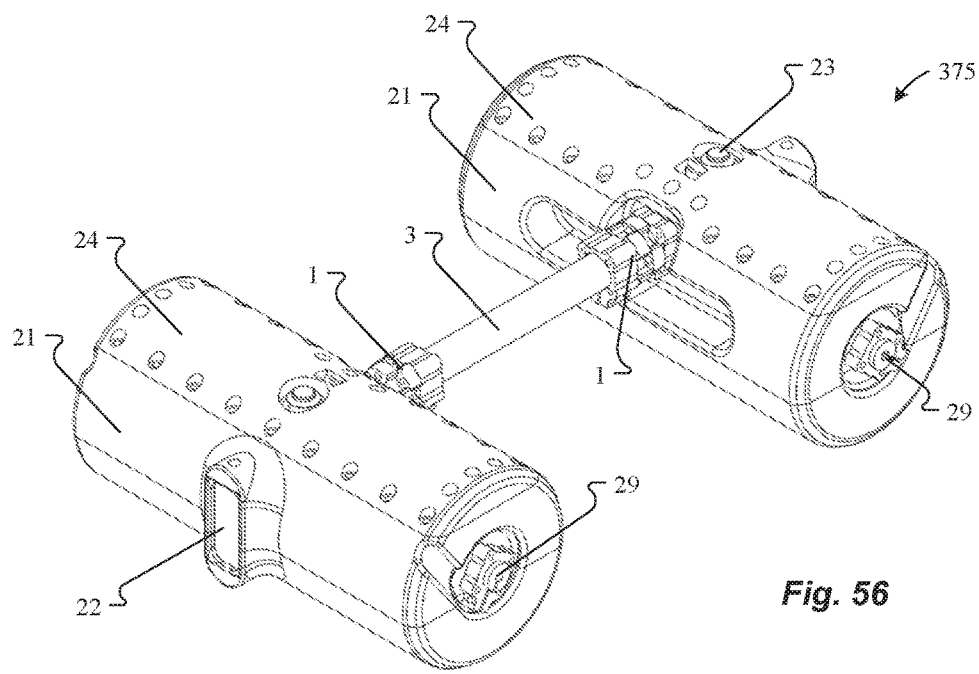
FIG. 56 is an isometric view of another embodiment of the present disclosure with the tires removed.
Figure 57:
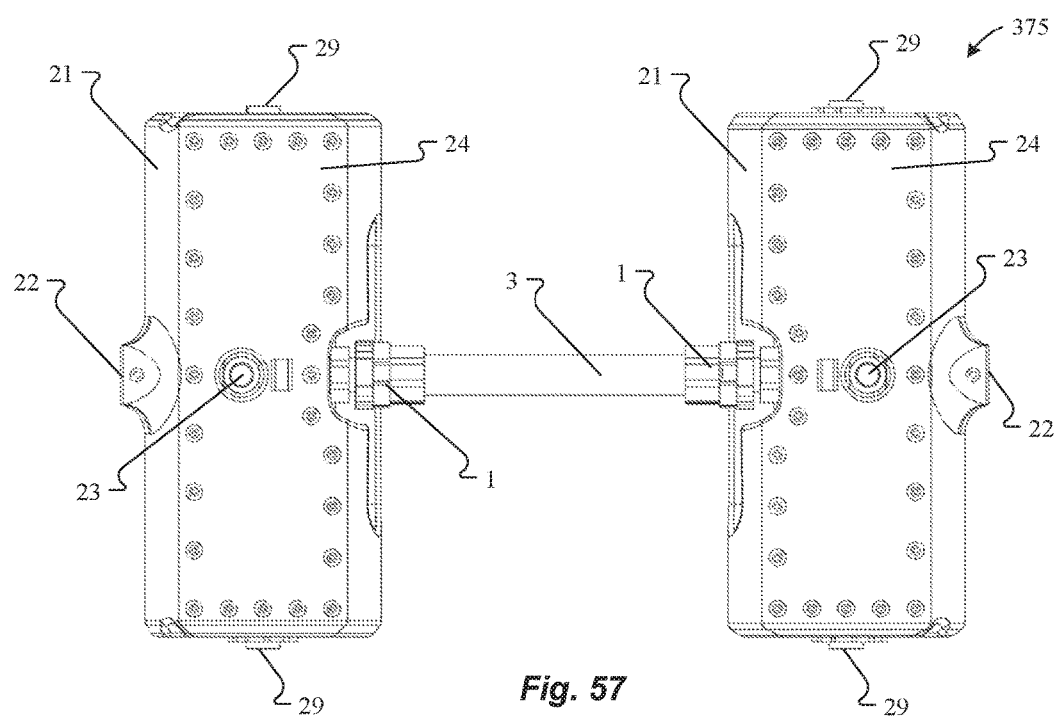
FIG. 57 is a top view of the embodiment of FIG. 56 with the tires removed.
Figure 58:
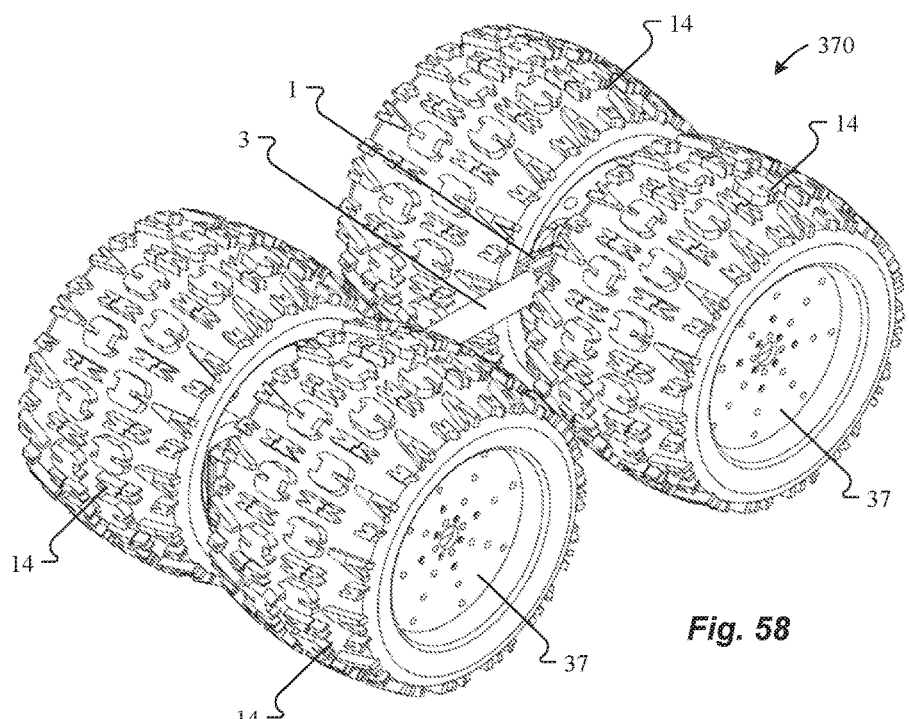
FIG. 58 is an isometric view of the embodiment of FIG. 56 with the tires shown.
Figure 59:
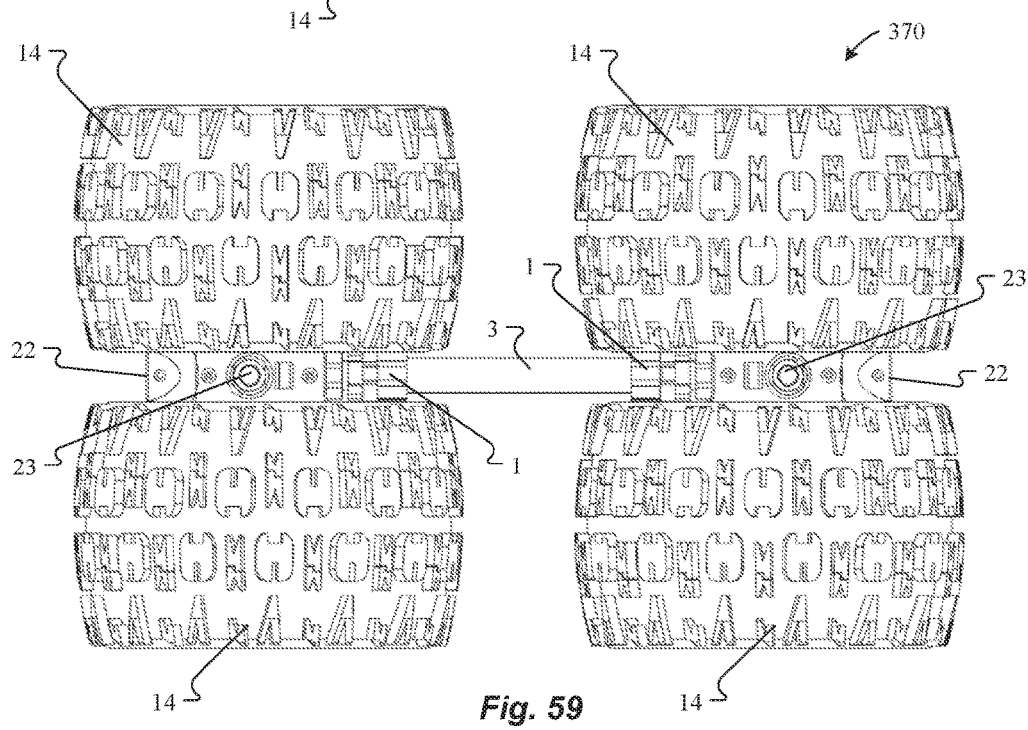
FIG. 59 is a top view of the embodiment of FIG. 56 with the tires shown.
Figure 60:
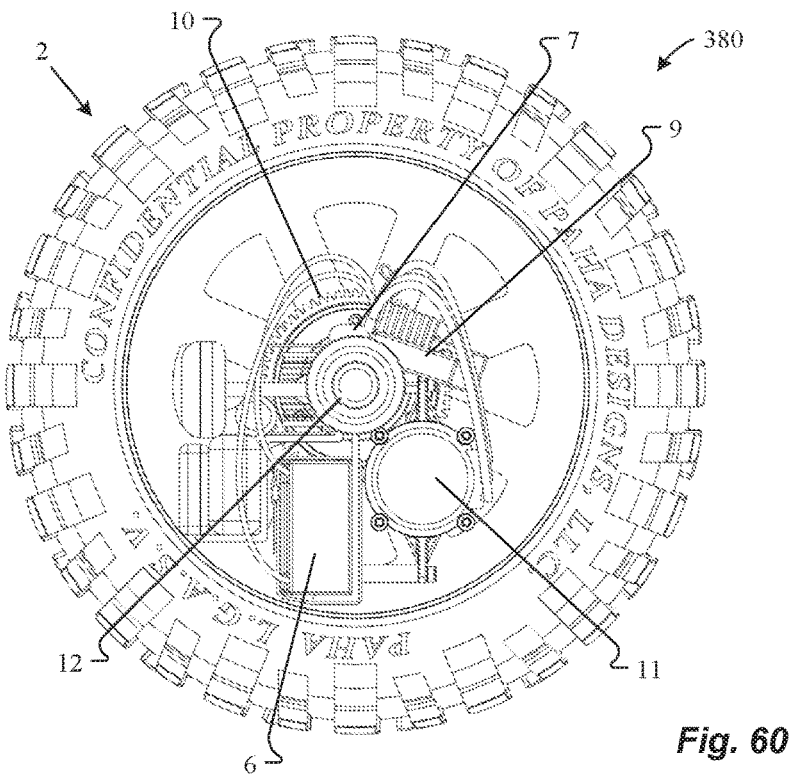
FIG. 60 is a side view of another embodiment of the present disclosure.
Figure 61:
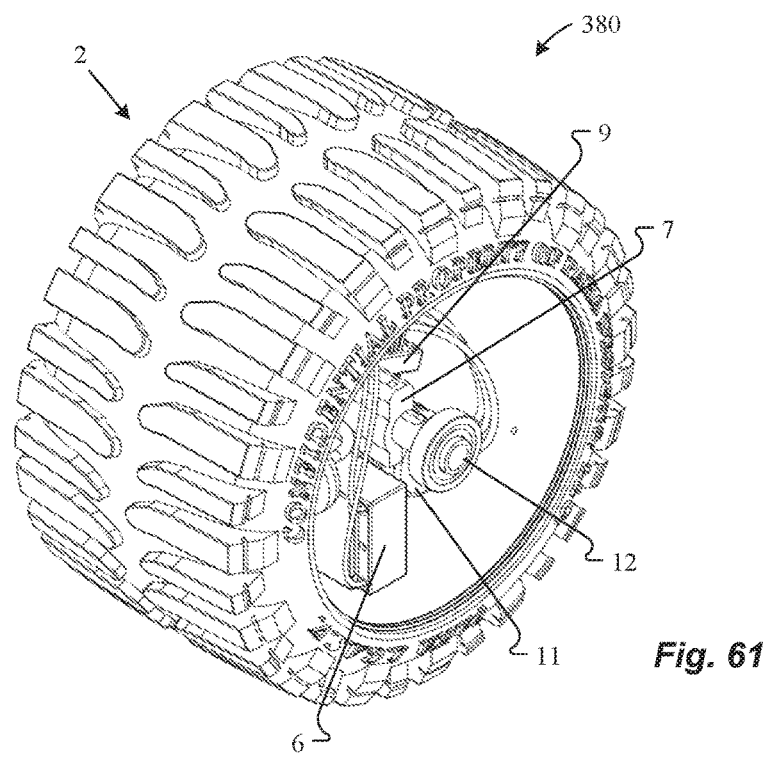
FIG. 61 is an isometric view of the embodiment of FIG. 60.

A wheel such as the wheel 2 according to embodiments of the present disclosure may comprise a cover such as the cover 39 on either side of the wheel 2 or on both sides of the wheel 2. For example, FIGS. 58-59 portray wheels that are open on the inside (e.g. the side of the wheel nearest the frame 3) but covered on the outside (in this embodiment, with a force-transmitting wheel plate 37). The wheels of the embodiment of FIGS. 58-59 are therefore beneficially able to slide over the cylindrical housing 21 of FIGS. 56-57. As another example, FIGS. 72-74 portray wheels 2 that are covered on the inside, but open on the outside, which beneficially allows persons to enter into and exit out of the interior of the wheels 2. As still another example, FIGS.

66-71 portray wheels 2 that are closed on both sides, which beneficially prevents debris and other foreign objects from entering into the interior of the wheels 2.

Referring now to FIGS. 56-59, a vehicle 370 according to some embodiments of the present disclosure may comprise an internal body 375 comprising two cylindrical housings 21 connected at or near a central portion thereof to a frame 3. The connection may be made via two pivots or joints 1 to allow the cylindrical housings 21 to pivot in at least one plane around the frame 3. One or both of the cylindrical housings 21 may contain drive- and control-related components of the vehicle 370, including a motor such as the motor 11, a motor control or electronic speed control such as the motor control/ESC 9, one or more batteries or other energy sources such as the batteries 6, a receiver such as the receiver 5 for receiving wireless signals for controlling the motor via the motor control, and so forth.

The cylindrical housings 21 comprise a drive socket 29 on each end of the cylindrical housings 21 to each of which a force-transmitting wheel plate 37 of a wheel 2 may be connected for transmitting rotational force from a motor within the internal body 375 to the wheel 2. In some embodiments, the drive sockets 29 may be provided only on one cylindrical housing 21, or one or both of the cylindrical housings 21 may have only one drive socket 29 each. Tires 14 may be mounted on the cylindrical housings 21 via a bearing that surrounds the circumference of the cylindrical housings 21 on each side of the frame 3, to allow rotation of the wheel 19 without simultaneous rotation of the cylindrical housings 21. The force-transmitting wheel plate 37 may comprise one or more features (e.g. a key or a keyed shaft extending inwardly from the wheel plate 37) that can be inserted into and/or interlock with one or more features of the drive socket 29 (e.g. a keyway or a cylindrical bore with a keyway) for reducing or eliminating slippage between the drive socket 29 and the force-transmitting plate 37.

The cylindrical housings 21 also comprise an access panel 24 through which internal components of the cylindrical housings 21 (e.g. the motor 11, the batteries 6, the motor control 9, the receiver 5) may be installed, maintained, and/or removed. Each cylindrical housing 21 may also comprise a quick-access cap 23 through which at least some interior components of the cylindrical housings 21 may be accessed. For example, electrical connections for recharging any batteries within the cylindrical housing 21 may be accessible through the quick-access cap 23. Additionally, one or more external antennas may be connected to a receiver such as the receiver 5 with a wire that passes through the aperture covered by the quick-access cap 23. A hitch 22 on each cylindrical housing may be used for connecting a trailer or other accessory to the cylindrical housing for hauling by the vehicle 370. In some embodiments, the location of the hitch 22 may be used instead for the installation of one or more sensors such as the sensors 27, lights such as the lights 28, or cameras such as the cameras 31.

In some embodiments, the cylindrical housings 21 may be waterproof, with gaskets or other seals lining the openings covered by the access panel 24 and the quick-access cap 23 and any other covered opening to prevent water from leaking therethrough. The use of sealed cylindrical housings 21 in this manner beneficially increases the buoyancy of the vehicle 370, enhancing the ability of the vehicle 370 to travel over water, particularly when equipped with scooped tires 14 as described elsewhere herein.

With reference now to FIGS. 60-65, a self-contained vehicle 380 comprises a motor 11 offset from the axle 12 and configured to drive the axle 12 via a spur gear 10. The motor 11 is powered by at least one battery 6, which also powers a motor control 9. A frame mount 7 supports the motor control 9, the battery 6, and the motor 11 on the axle 12 of the wheel 2 of the vehicle 380. A cover 39 protects the internal components of the wheel 2 from large debris, yet allows air to flow through the wheel 2 to aid in the cooling of the internal components of the wheel 2.

Figure 62:
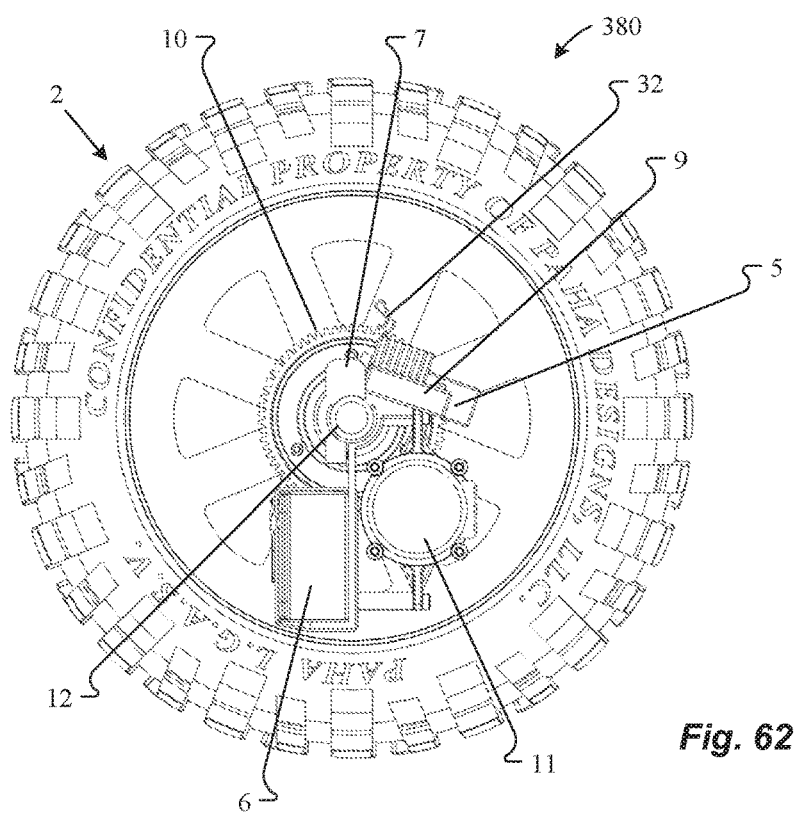
FIG. 62 is a side view of the embodiment of FIG. 60 with some components removed.
Figure 63:
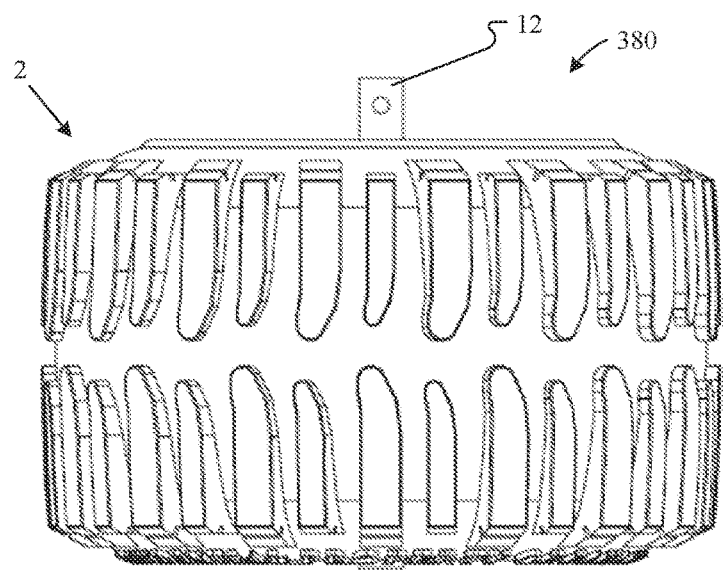
FIG. 63 is a top view of the embodiment of FIG. 60.
Figure 64:
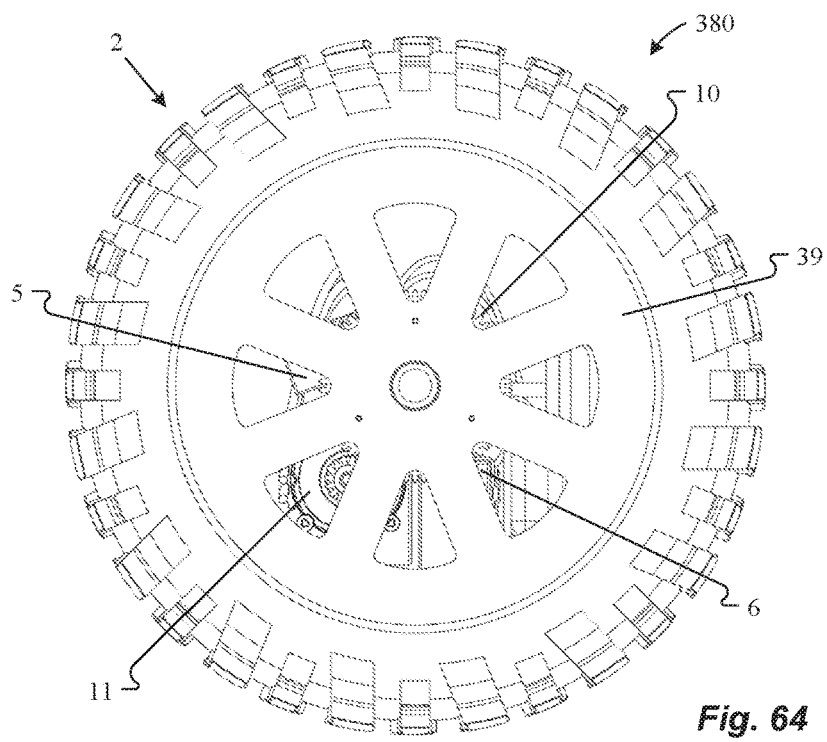
FIG. 64 is a side view of the embodiment of FIG. 60 with a cover installed.
Figure 65:
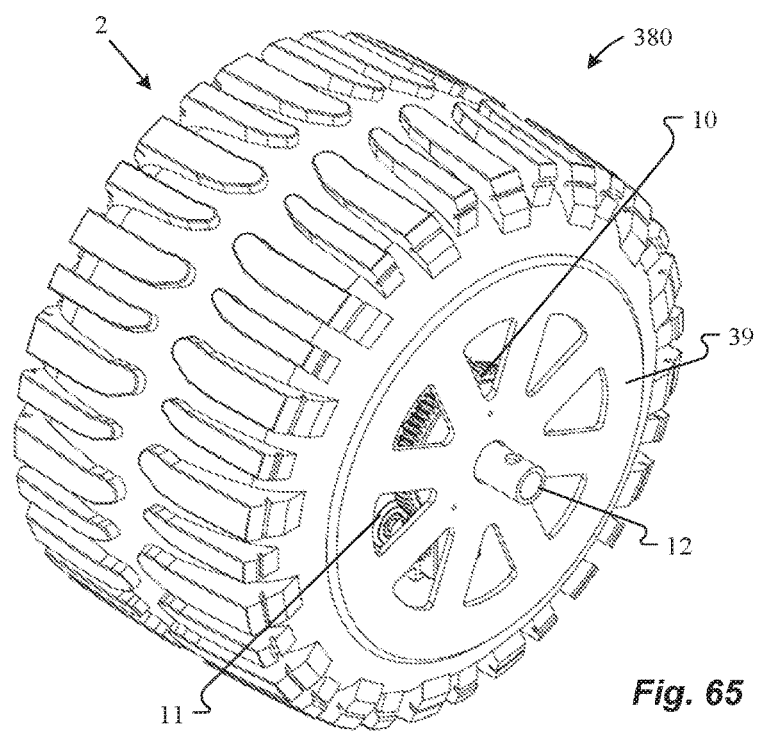
FIG. 65 is an isometric view of the embodiment of FIG. 65 with a cover installed.
Figure 66:
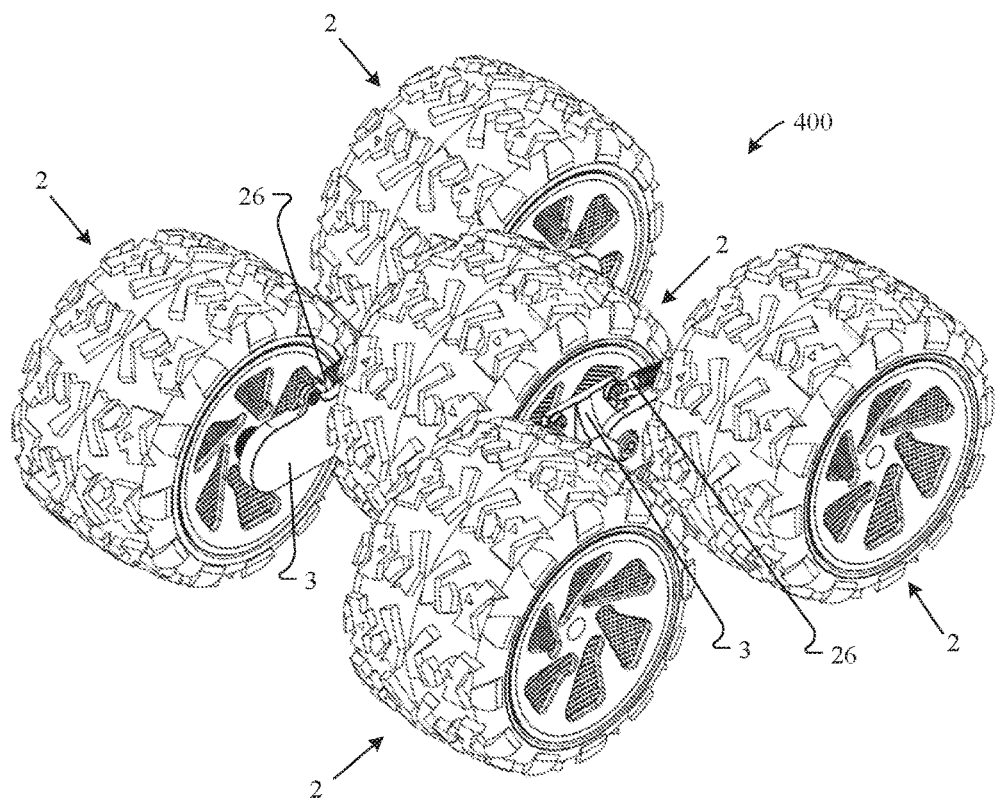
FIG. 66 is an isometric view of another embodiment of the present disclosure.
Figure 67:
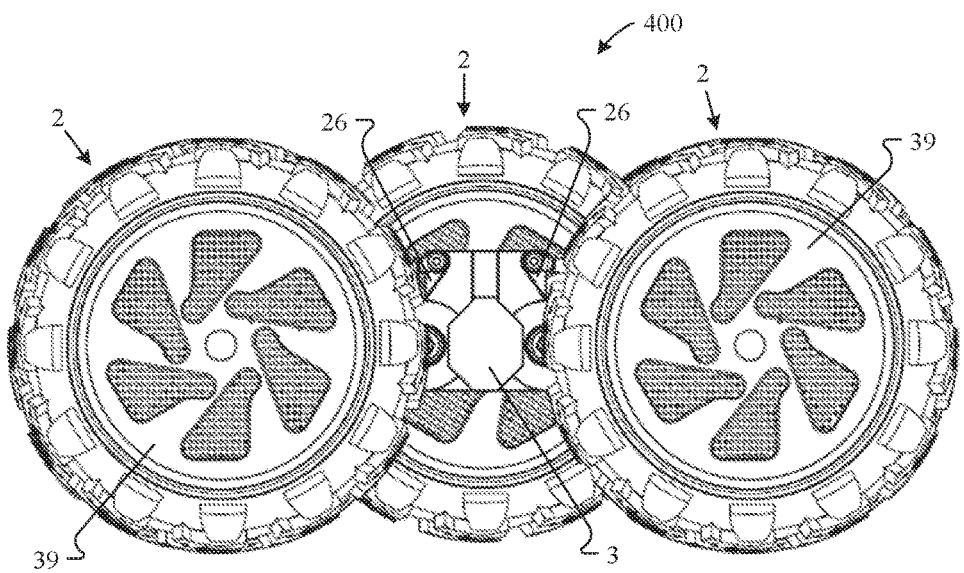
FIG. 67 is a side view of the embodiment of FIG. 66.
Figure 68:
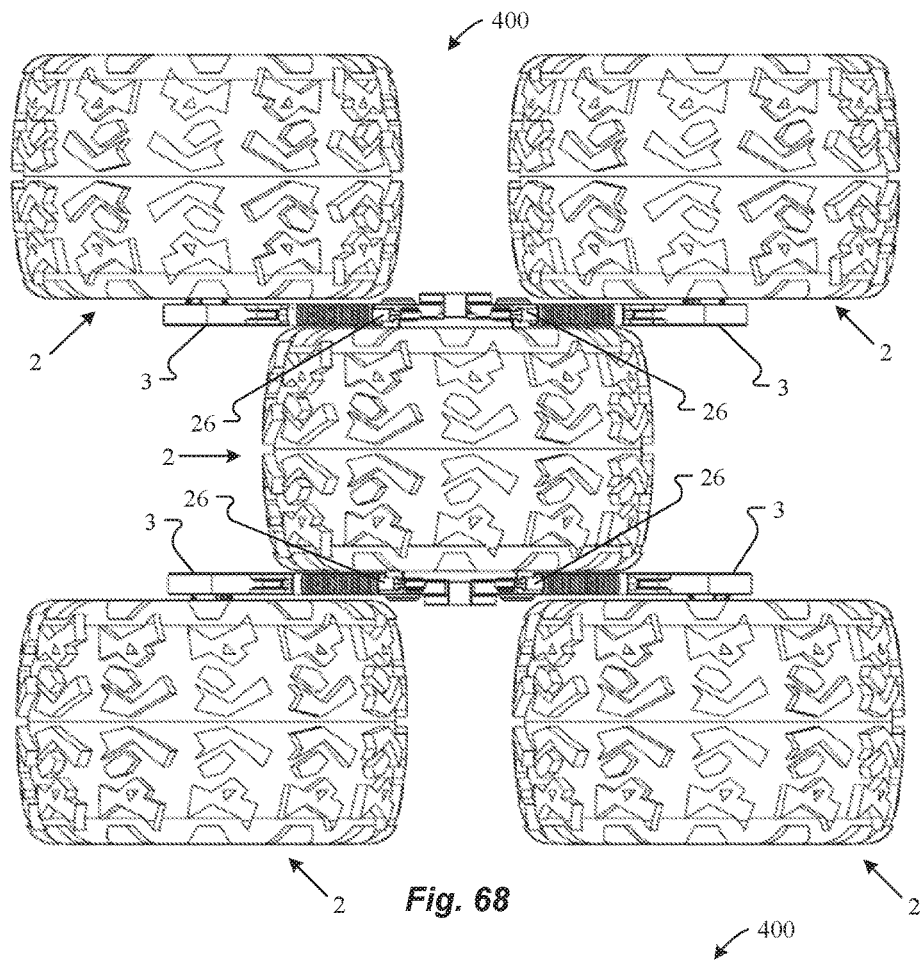
FIG. 68 is a top view of the embodiment of FIG. 66.
Figure 69:
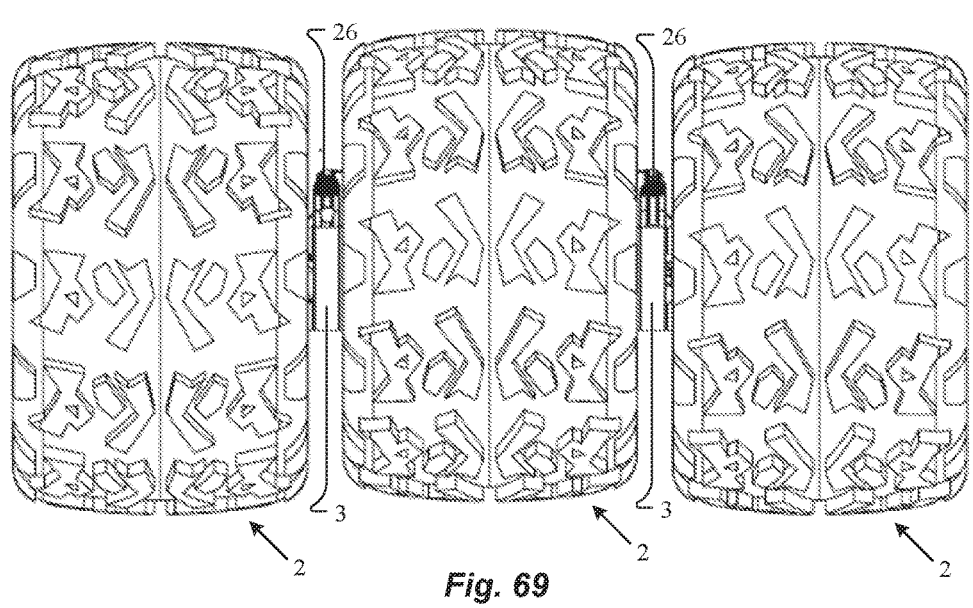
FIG. 69 is a front view of the embodiment of FIG. 66.
Figure 70:
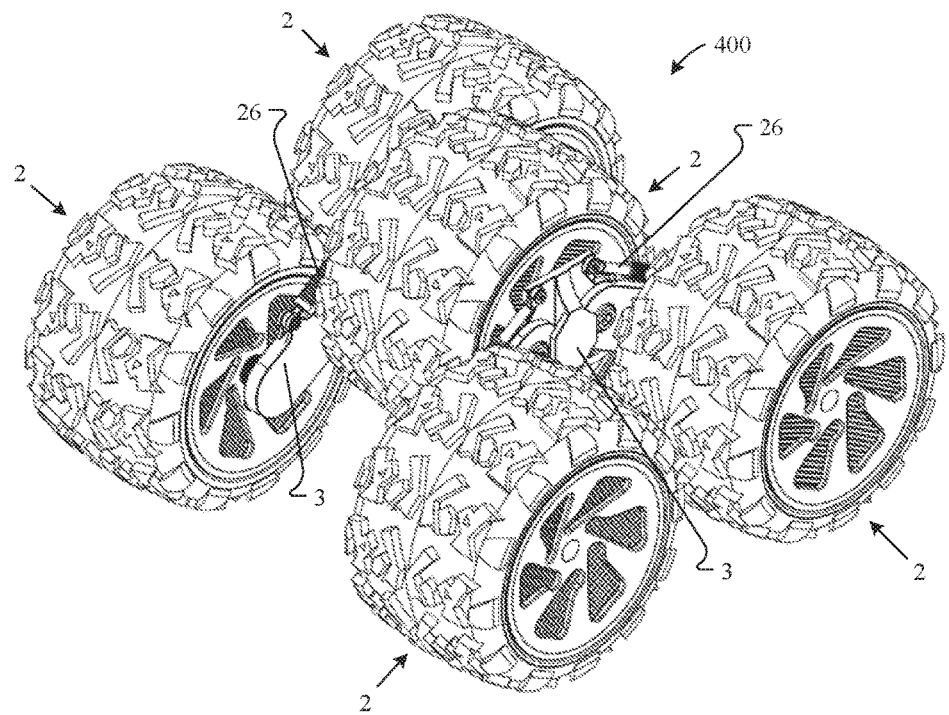
FIG. 70 is an isometric view of the embodiment of FIG. 66 with the center wheel raised.
Figure 71:
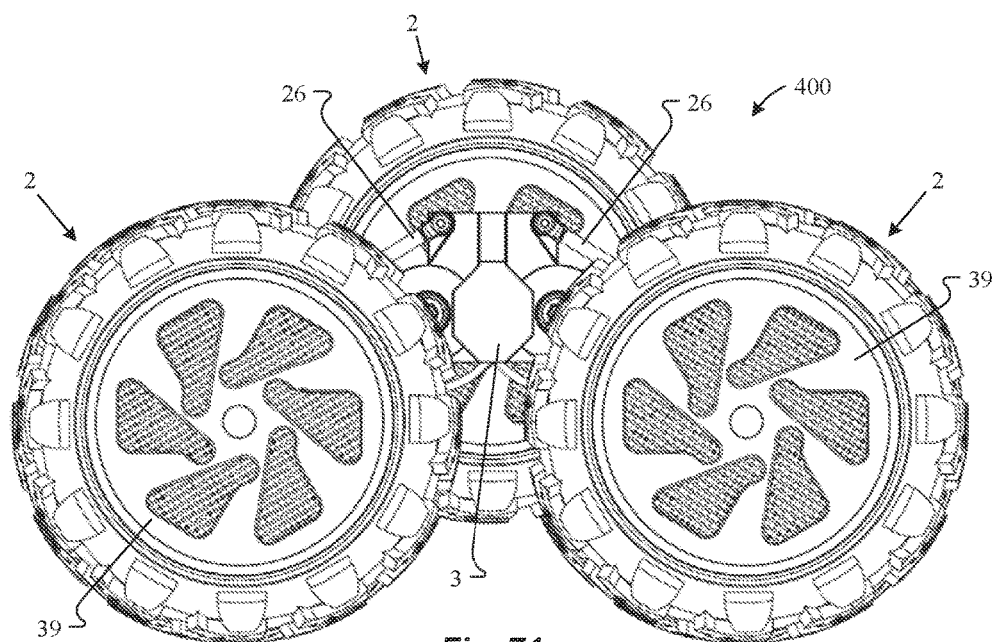
FIG. 71 is a side view of the embodiment of FIG. 66 with the center wheel raised.

FIG. 62 depicts the vehicle 380 with certain components removed, allowing for a better view of the remaining components. For example, in FIG. 62 a receiver 5 and associated antenna 32 are more readily visible. As can be seen in FIGS. 63 and 65, the axle 12 of the vehicle 380 extends beyond the plane formed by the inside edge of the wheel 2 (e.g. beyond the cover 39), and thus allows use of the vehicle 380 as a modular locomotive element that can be attached to a variety of platforms or tools to enable movement of the same.

With reference now to FIGS. 66-71, a vehicle 400 according to other embodiments of the present disclosure comprises five wheels 2, arranged so that a single central wheel 2 provides a central point of connection for two frames 3 that each support two wheels 2. The frames 3 each comprise a plurality of suspension elements 26, which may be utilized to raise or lower the central wheel 2 relative to the outside wheels 2. Each wheel 2 comprises a cover 39 on each side thereof to protect the internal components of the wheel 2. In the vehicle 400, any one or more of the wheels 2 may comprise internal drive and control components, including but not limited to a motor 11, a receiver 5, a battery 6, and a motor control 9. Inclusion of a fifth wheel in the vehicle 400 advantageously helps to prevent the vehicle 400 from becoming high-centered when traversing uneven terrain.

Figure 72:
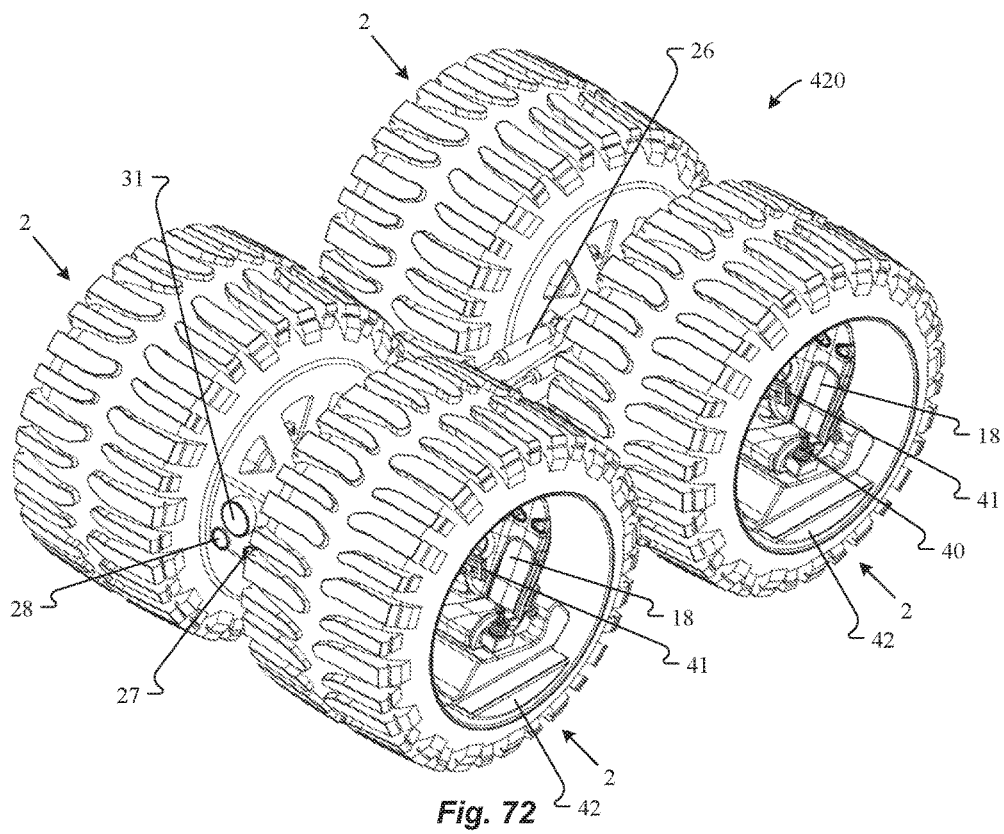
FIG. 72 is an isometric view of another embodiment of the present disclosure.
Figure 73:
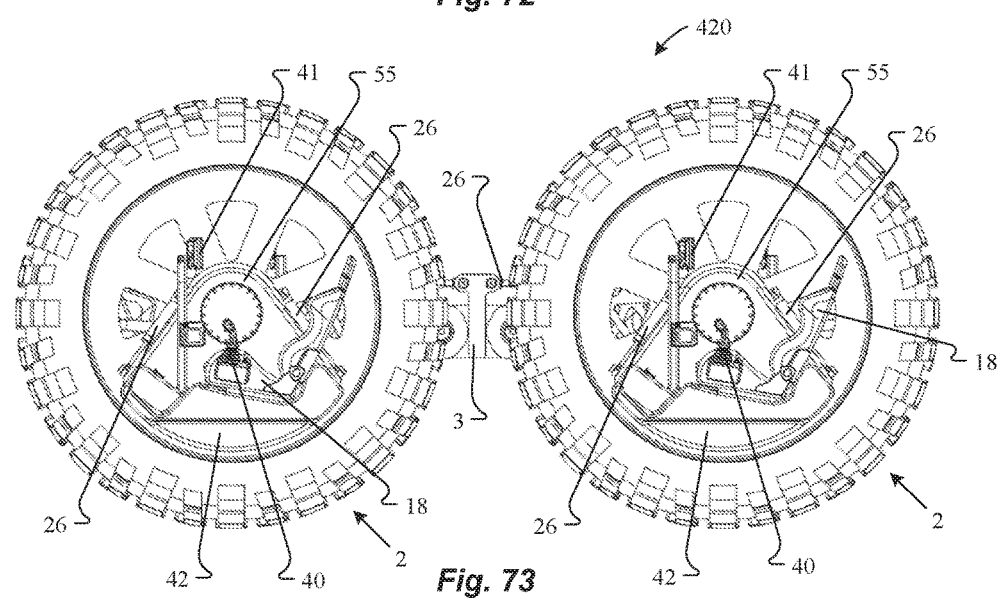
FIG. 73 is a side view of the embodiment of FIG. 72.
Figure 74:
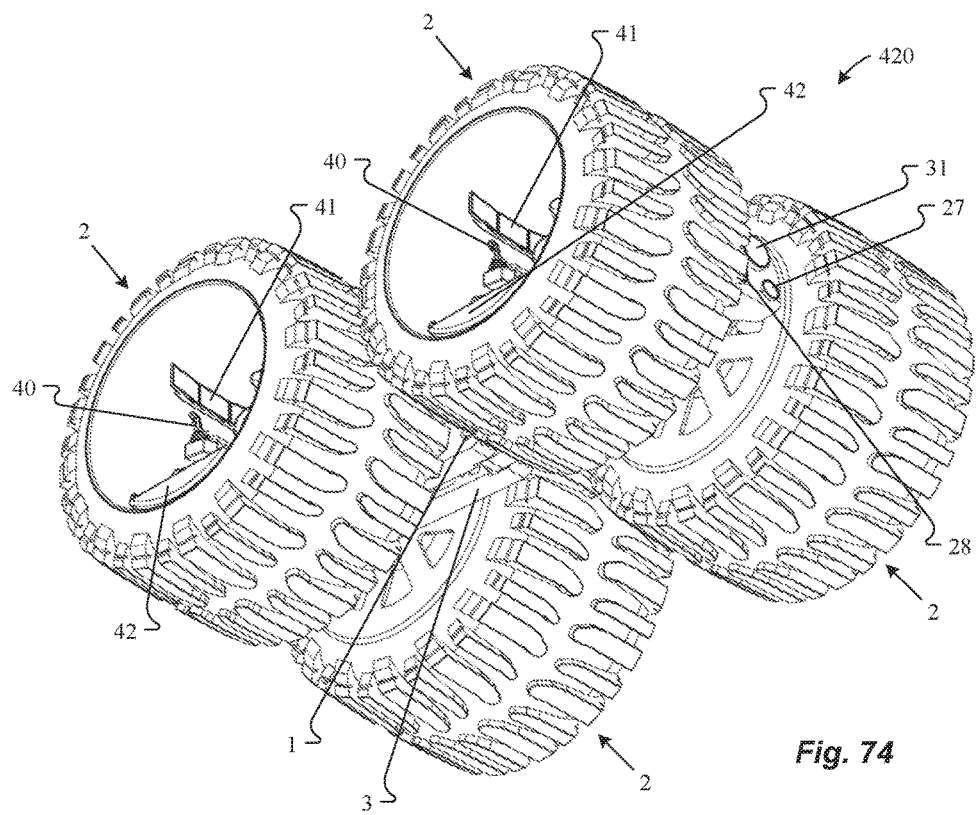
FIG. 74 is another isometric view of the embodiment of FIG. 72.

FIGS. 72-74 depict a vehicle 420 according to still another embodiment of the present disclosure. The vehicle 420 comprises four wheels 2, each mounted to a frame 3. The frame 3 may be provided with a pivot or joint 1 and with one or more suspension elements to dampen rotation at the pivot or joint 1. Each wheel 2 of the vehicle 420 comprises a seat or chair 18 mounted to an operator support 42. The operator support 42 is mounted to the wheel 2 via a bearing 55 that allows the operator support 42 and the chair 18 to remain substantially stationary as the wheel 2 rotates. A control joystick 40 mounted on or near the chair 18 allows an occupant of the chair 18 to control the vehicle 420. Given that an occupant's forward view is blocked by the wheel 2, one or more screens 41 are provided in front of the occupant, which may be used to display images captured by, or, more preferably, a video feed from, one or both of the cameras 31 mounted on the fore and aft ends of the frame 3. The screens 41 may also display data received from the sensors 27, which are mounted near the cameras. Lights 28, also mounted near the cameras 31, may be used to provide illumination when the vehicle 420 is traveling at night.

Figure 75:
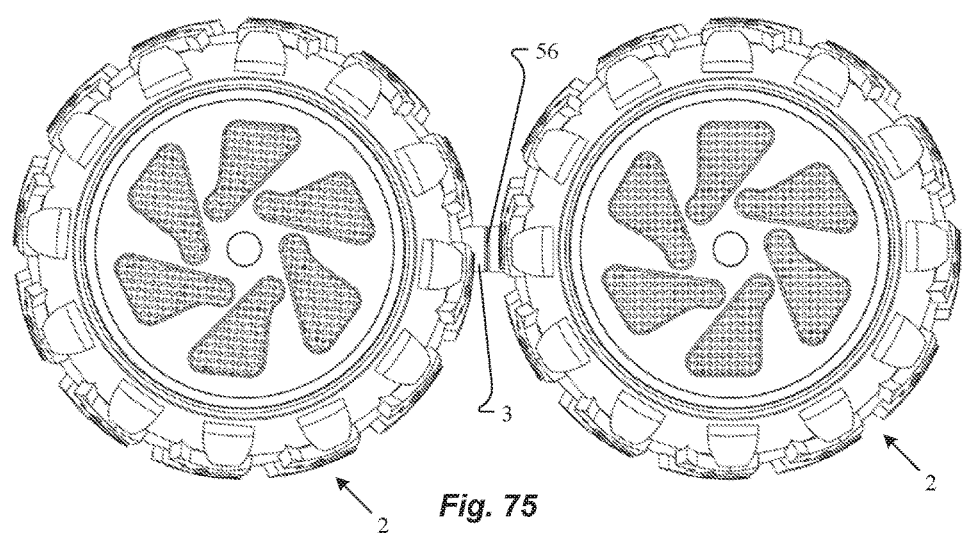
FIG. 75 is a side view of another embodiment of the present disclosure.
Figure 76:
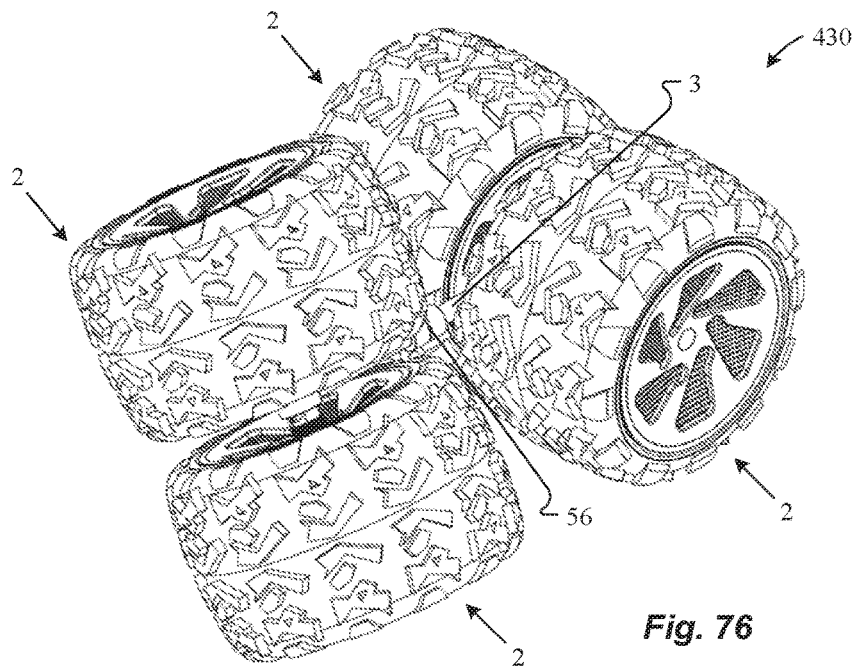
FIG. 76 is an isometric view of the embodiment of FIG. 75 shown in a twisted configuration.
Figure 77:
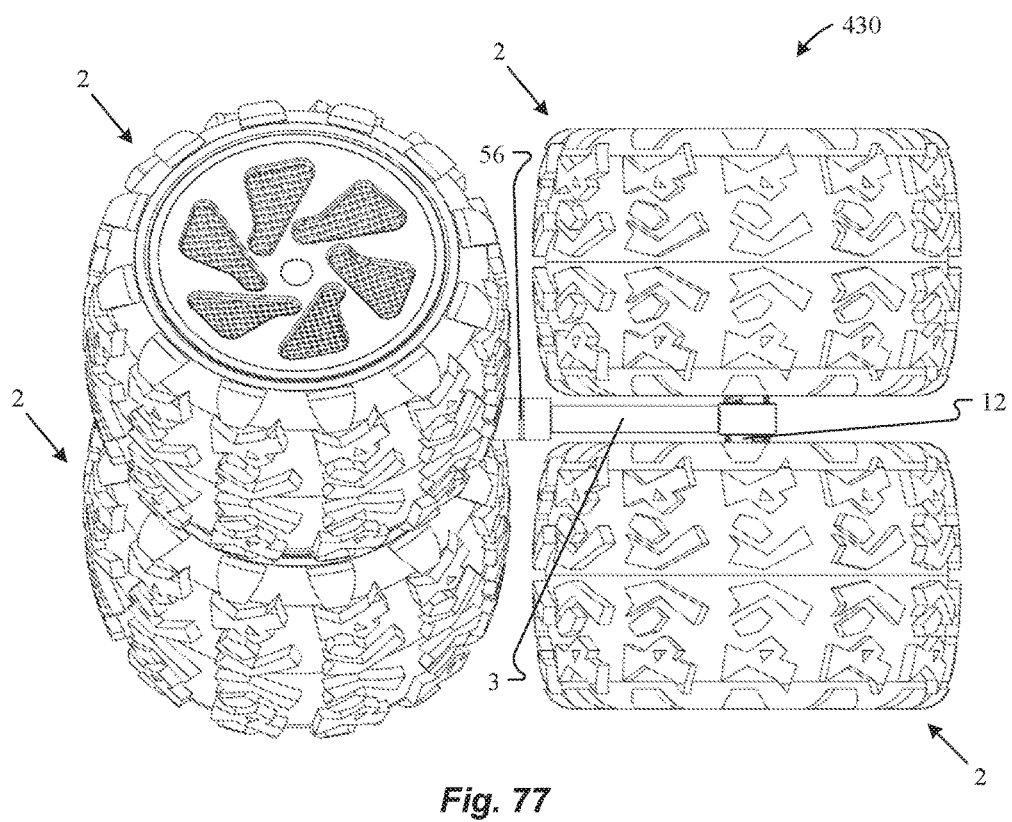
FIG. 77 is a top view of the embodiment of FIG. 75 shown in a twisted configuration.

Turning now to FIGS. 75-77, a vehicle 430 according to some embodiments of the present disclosure comprise four wheels 2 with a frame 3 that is provided with a rotary joint 56. The rotary joint 56 allows rotation of the front set of wheels 2 around a rotational axis defined by the frame 3. As a result, when the vehicle 430 travels over terrain with an increasing or decreasing slope, each set of wheels 2 can rotate as necessary so that the axles thereof are parallel to the ground over which that set of wheels 2 is traveling, thus enhancing the ability of each wheel 2 to maintain traction.

Figure 78:
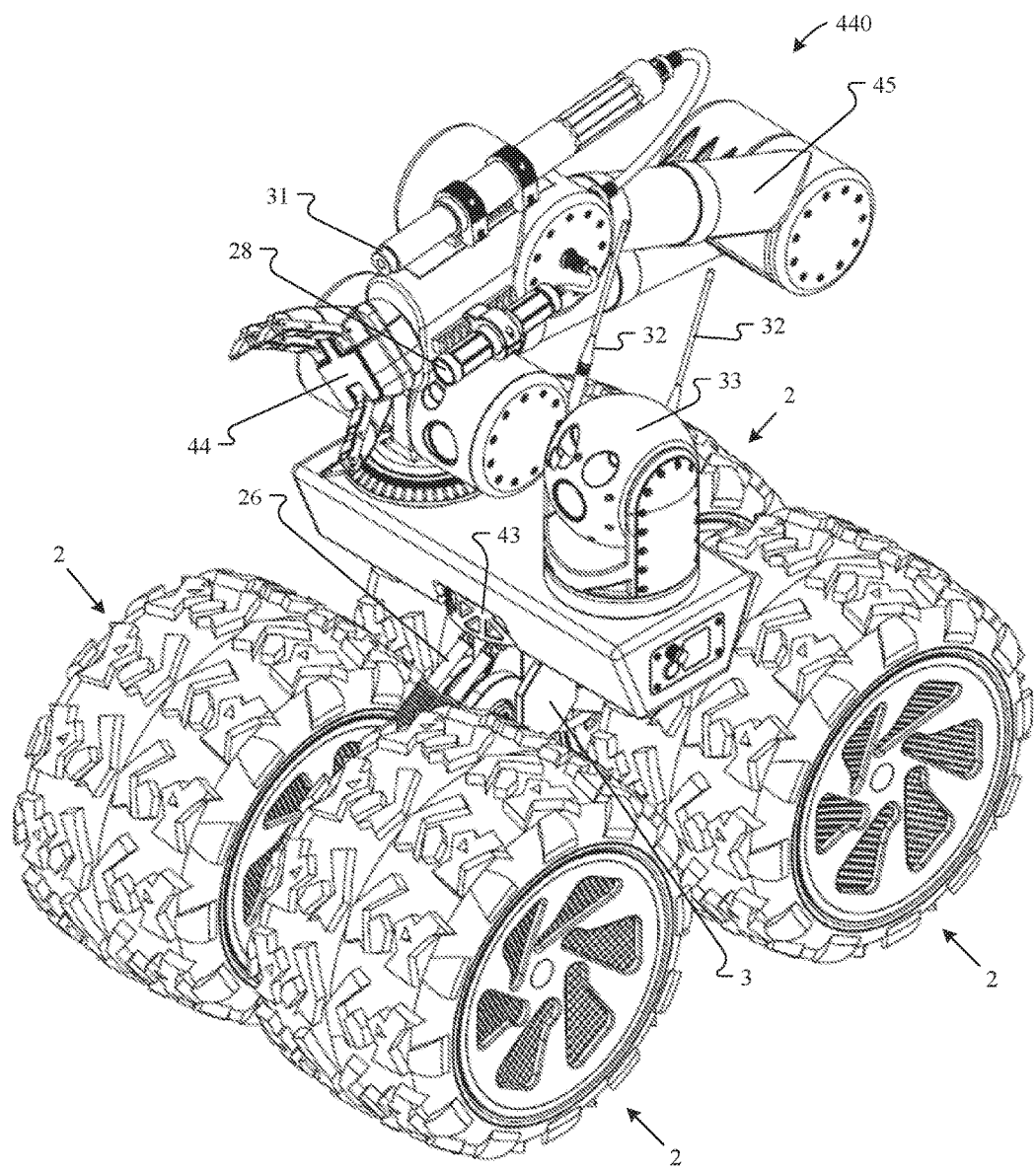
FIG. 78 is an isometric view of another embodiment of the present disclosure.

FIG. 78 depicts a robot 440 according to one embodiment of the present disclosure that comprises a robotic arm 45 mounted to a frame 3 via a rotary mount 43. Four wheels 2 are mounted to the frame 3, thus giving the robot 440 locomotive ability. One or more suspension elements 26 are provided to reduce the amount of force transmitted through the rotary mount 43. The robot 440 comprises a sensor turret 33, a camera 31, a light 28, and a plurality of antennas 32 for transmitting data captured by the sensor turret 33 and the camera 31, and for receiving control information for the sensor turret 33, the camera 31, and the robotic arm 45. The robotic arm 45 comprises a robotic hand 44, which allows the robot 440 to be used, for example, for bomb disposal or other dangerous or unpleasant tasks.

Figure 79:
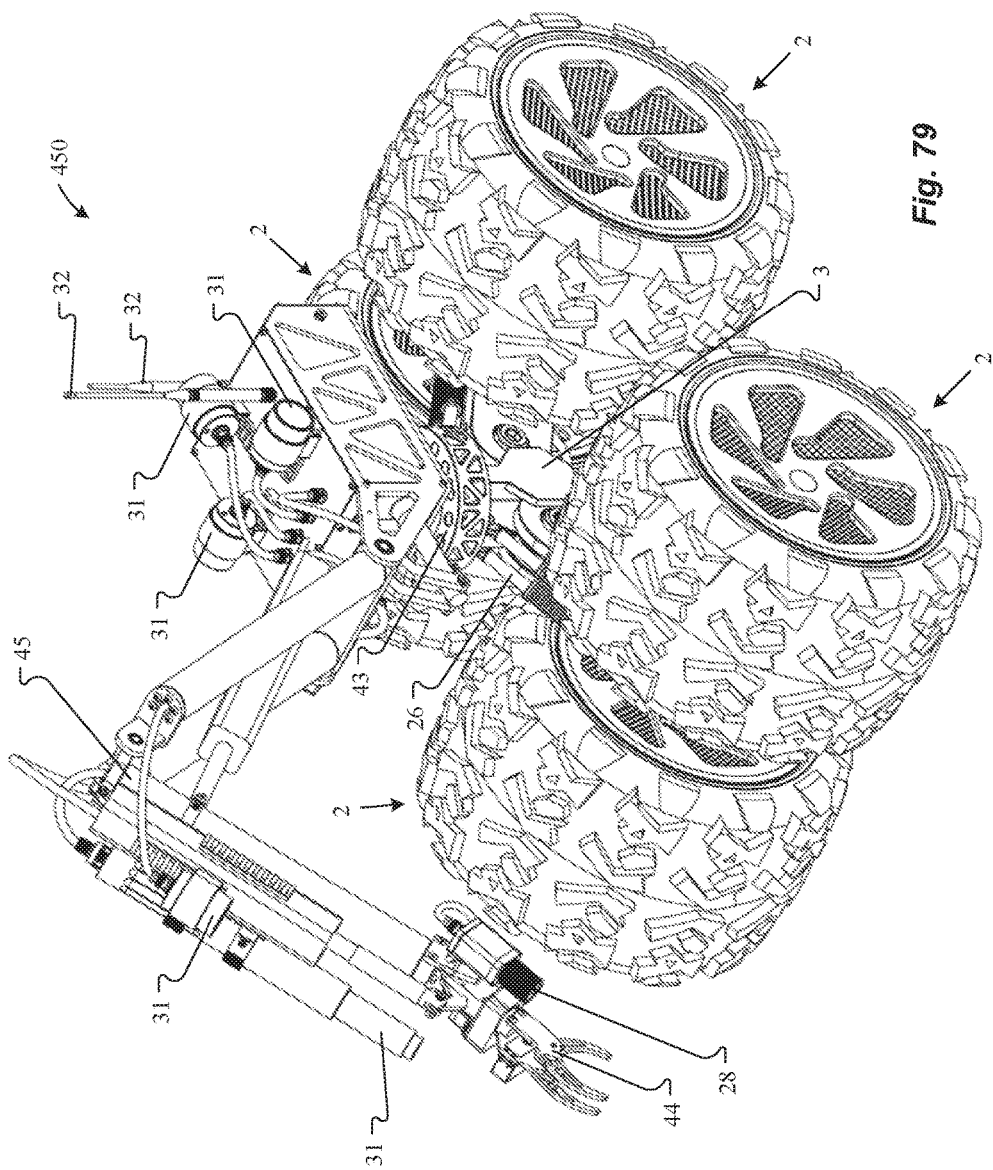
FIG. 79 is an isometric view of another embodiment of the present disclosure.

FIG. 79 depicts another robot 450, which also comprises a frame 3 supporting a rotary mount 43 and four wheels 2. As with the robot 440, the robot 450 includes one or more suspension elements 26 for reducing the amount of force transmitted through the rotary mount 43. The robot 450 comprises a plurality of cameras 31 mounted so as to give an operator of the robot 450 a view of the robot 450's surroundings as well as a view of the area in front of the robotic arm 45, and more particularly in front of the robotic hand 44, to facilitate operation thereof. In some embodiments, the robot 450 may be configured to operate autonomously, in which embodiments the cameras 31 may be used to gather information used by a processor within the robot 450 to determine a desired path of movement as well as to identify objects to be relocated, examined, or otherwise manipulated using the robotic arm 45 and robotic hand 44. A light 28 may be used to illuminate the area in front of the robotic hand 44 and thus increase the ability of the cameras 31 positioned on the robotic arm 45 to capture a properly exposed image or video feed of that area. As with the robot 440, the robot 450 comprises a plurality of antennas 32 for sending to and/or receiving data from a control station and/or a monitoring station, which may be located remotely.

Figure 80:
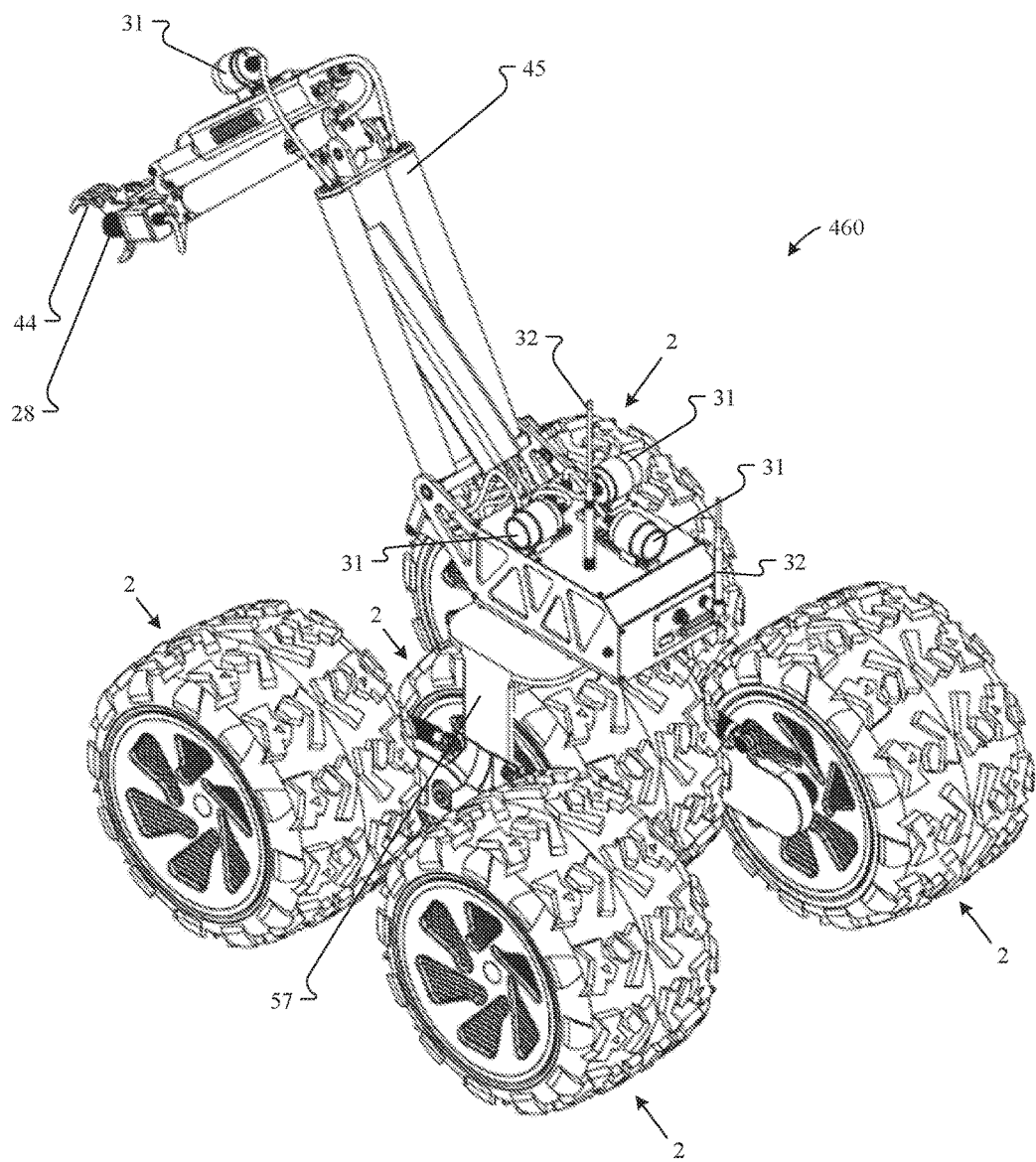
FIG. 80 is an isometric view of another embodiment of the present disclosure.

Another robot 460 according to yet another embodiment of the present disclosure is depicted in FIG. 80. The robot 460 is substantially identical to the robot 450, except that it utilizes a five-wheeled vehicle such as the vehicle 400. Consequently, the robotic arm 45 is attached to a robotic arm mount 57 that in turn attaches to each of the frames 3 on either side of the center wheel 2, rather than to a single rotary mount 43 that is mounted to a single frame 3. The use of five wheels 2 allows for a lower per-wheel distribution of weight of the robotic arm 45 and other components supported by the frames 3 of the robot 460 than with just four wheels.

Figure 81:
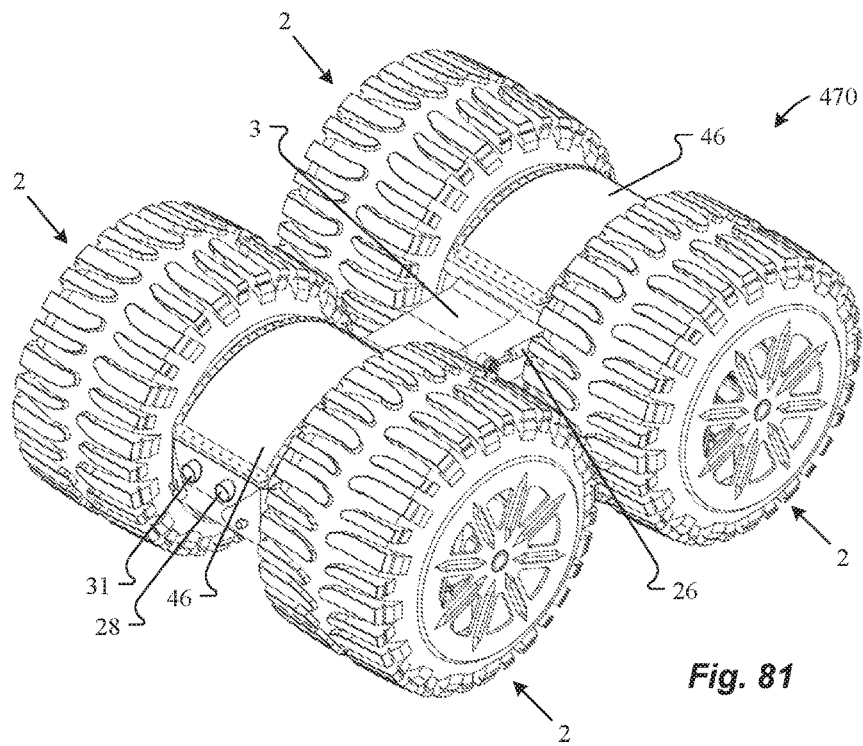
FIG. 81 is an isometric view of another embodiment of the present disclosure.

As shown in FIG. 81, a vehicle 470 is equipped with two pods 46 attached to a frame 3 provided with one or more suspension elements 26. One or both of the pods 46, which may be adapted for carrying, for example, personnel, cargo, or instrumentation, may be equipped with a camera 31 and a light 28 for use in operating the vehicle 470. Two of the four wheels 2 of the vehicle 470 are attached to each pod 46. The operator may be located remotely or in one of the pods 46.

Figure 82:
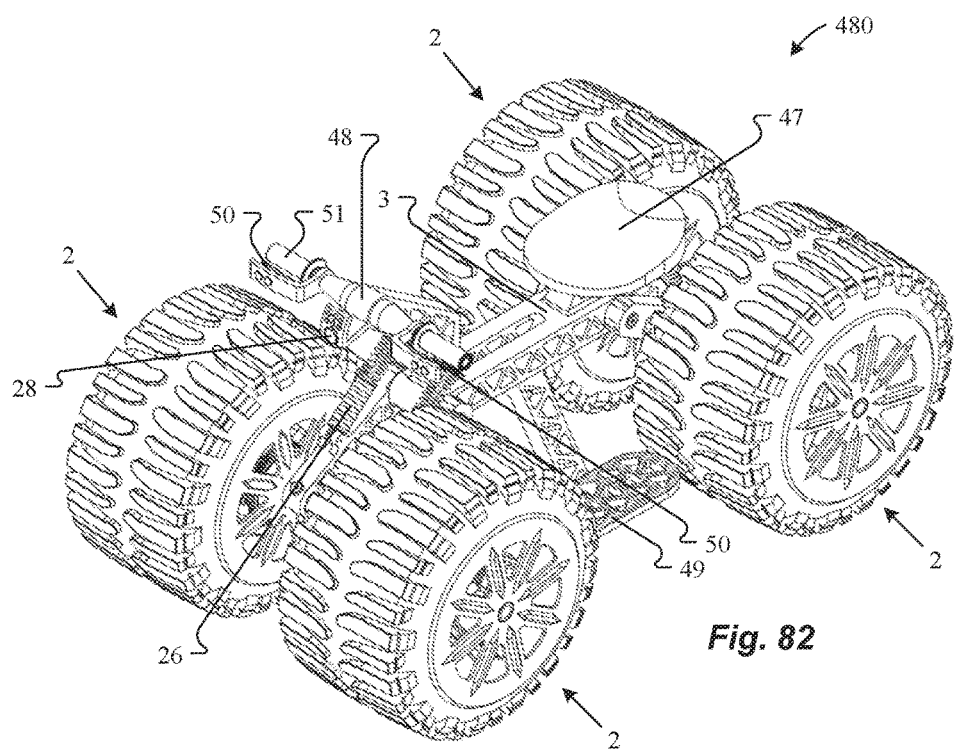
FIG. 82 is an isometric view of another embodiment of the present disclosure.

According to another embodiment of the present disclosure depicted in FIG. 82, an all-terrain type vehicle 480 comprises four wheels 2 attached to a frame 3. Affixed to the frame 3 are a seat 47, on which a vehicle operator can sit, and footrests 49 for supporting the operator's feet. Handlebar 48 may be rotatably mounted to the frame 3 and may be used to control rotation of some or all of the wheels 2 around a vertical axis or to control a variation in rotational speed of the left-side wheels 2 and the right-side wheels 2 so as to provide directional control of the vehicle 480. The handlebar 48 may be equipped with a throttle control 51 for use by the operator in controlling acceleration and speed of the vehicle 480, as well as a brake control 50 for use in slowing the vehicle. Suspension elements 26 may be provided to increase the ride comfort for the operator of the vehicle 480.

Figure 83:
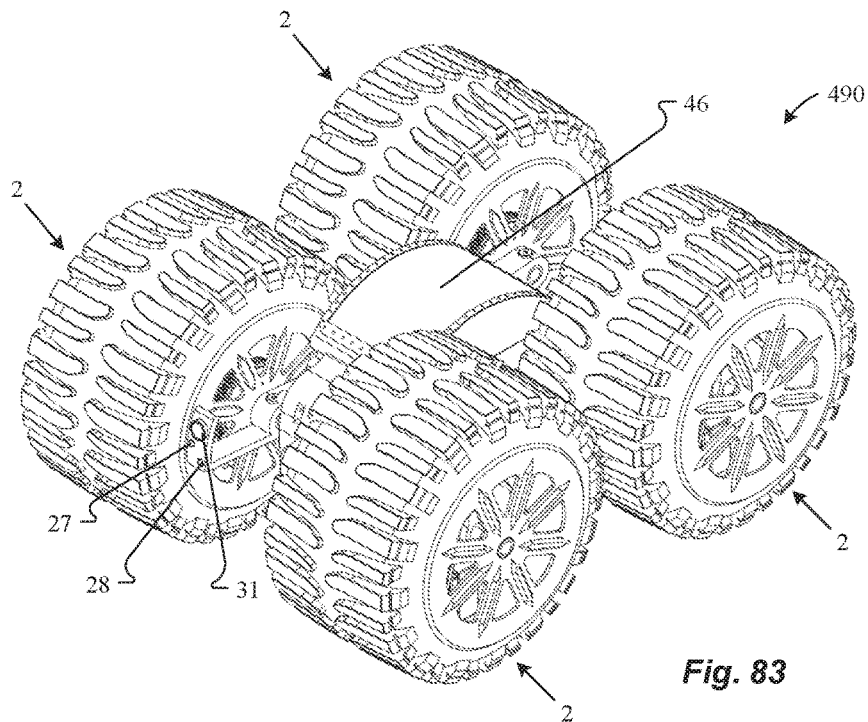
FIG. 83 is an isometric view of another embodiment of the present disclosure.

FIG. 83 depicts a vehicle 490 configured with a single pod 46. As with the vehicle 470 of FIG. 81, the vehicle 490 is equipped with a camera 31, light 28, and sensors 27, which may be used to provide data useful for operation of the vehicle 490. The vehicle 490 may be operated by an operator located within the pod 46, or by a remote operator. As another alternative, the vehicle 490, as with other embodiments of the present disclosure, may be operated autonomously.

Figure 84:
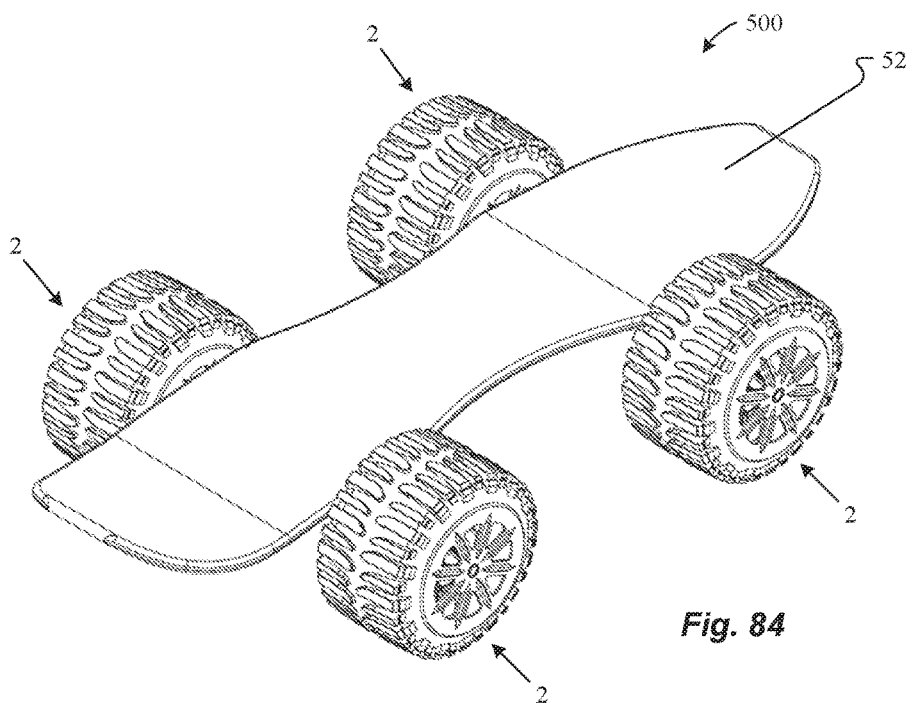
FIG. 84 is an isometric view of another embodiment of the present disclosure.

Turning now to FIG. 84, a motorized skateboard 500 may comprise a deck 52 to which four wheels 2 are mounted in place of traditional skateboard trucks. In this embodiment, the wheels 2 may be controlled remotely via a Bluetooth or other wireless connection between the wheel 2 and a smart phone or other control device held by the operator. Each wheel 2 may utilize a receiver 5 associated with an antenna 32 for establishing and maintaining such a connection, and each wheel 2 may further comprise a processor and computer-readable memory containing instructions for execution by the processor to enable the processor to receive and respond to commands from the smart phone or other control device. These or similar components may be included in any wheel 2 disclosed herein when the wheel 2 is to be controlled remotely. In some embodiments, the wheels 2 may be controlled instead using a wired controller configured to be held by the user of the skateboard. The skateboard 500 may be steering using skid-steering (e.g. speeding up or slowing down the wheels on one side of the skateboard), leaning-induced wheel rotation (e.g. as in a traditional skateboard), or controller-induced wheel rotation (e.g. using a rack and pinion, or by independent rotation of the wheels).

Figure 85:
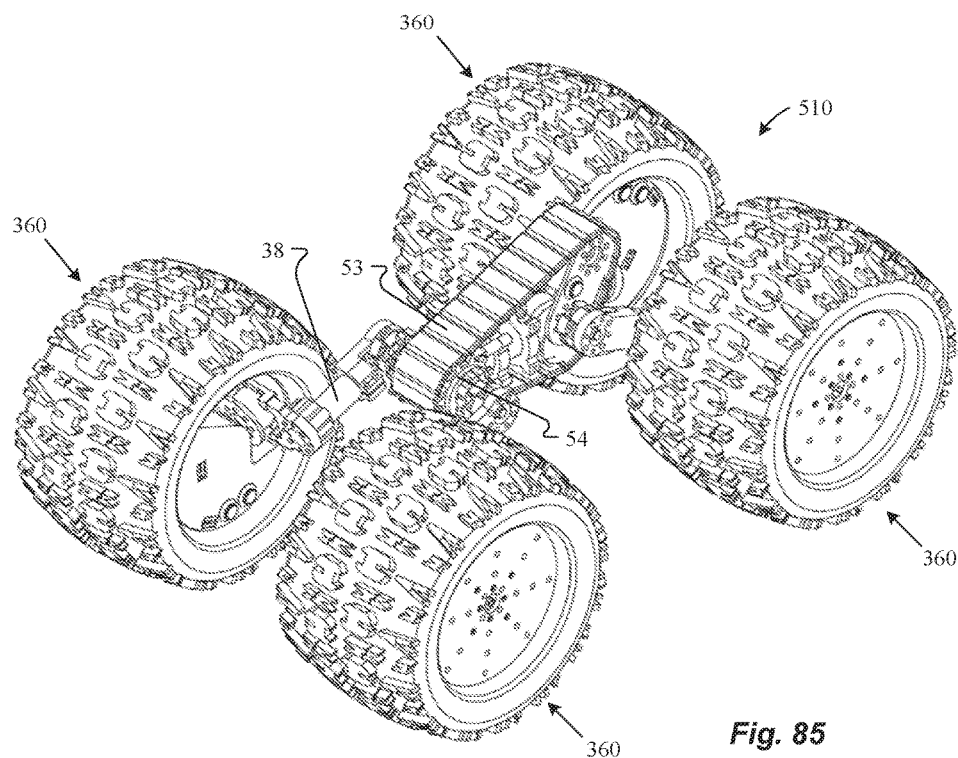
FIG. 85 is an isometric view of another embodiment of the present disclosure.
Figure 86:
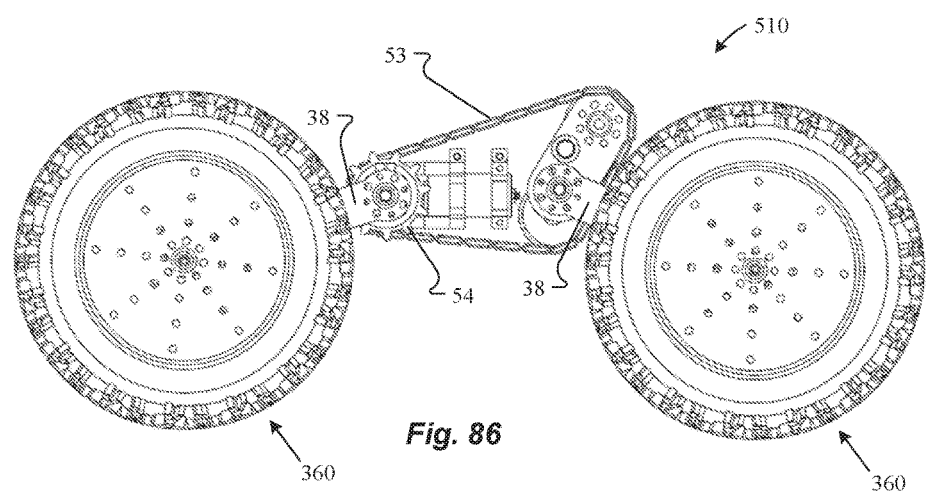
FIG. 86 is a side view of the embodiment of FIG. 85.

FIGS. 85-86 depict a tracked vehicle 510 that comprises four vehicles 360 (depicted in FIGS. 54-55). The drive train arms 38 of the front vehicles 360 and of the rear vehicles 360 are connected to a fore and aft drive sprocket 54, respectively. The drive sprockets 54 drive a continuous track 53 located in the center of the four vehicles 360. The continuous track 53 beneficially prevents the tracked vehicle 510 from bottoming out when traveling over rough or uneven terrain.

It is to be understood that any wheel 2 identified in the foregoing description of embodiments of the present disclosure may define an inner volume comprising, among other things, a motor such as the motor 11, a control unit such as the control unit 9, a receiver such as the receiver 5 for receiving wireless signals for controlling the motor via the control unit, and one or more energy sources. Additionally, in a vehicle comprising one or more wheels 2, the wheels 2 may be in wired connection with each other, and/or the wheels 2 may be in wired connection with a control station located on the vehicle (e.g. for steering the vehicle, controlling the motor(s) 11 within the wheel(s) 2, sending or receiving control signals, and the like. Such wired connections may comprise wires running through the vehicle frame.

In some embodiments, steering of multi-wheeled vehicles disclosed herein may be accomplished—in addition to the various steering methods disclosed above—by turning all of the wheels on the vehicle in a coordinated manner, or by turning some of the wheels on the vehicle in a coordinated manner, or by turning one of the wheels on the vehicle. In embodiments without an axle entering a wheel, steering may also be accomplished by independently rotating each wheel. For example, a six-wheeled vehicle could have independent steering allowing each wheel to rotate in any direction. To park in a spot that more traditional vehicles (e.g. cars) could only enter using parallel parking techniques, such a vehicle could simple stop next to the parking spot, rotate its wheels ninety degrees, and drive sideways directly into the parking spot.

Figure 87:
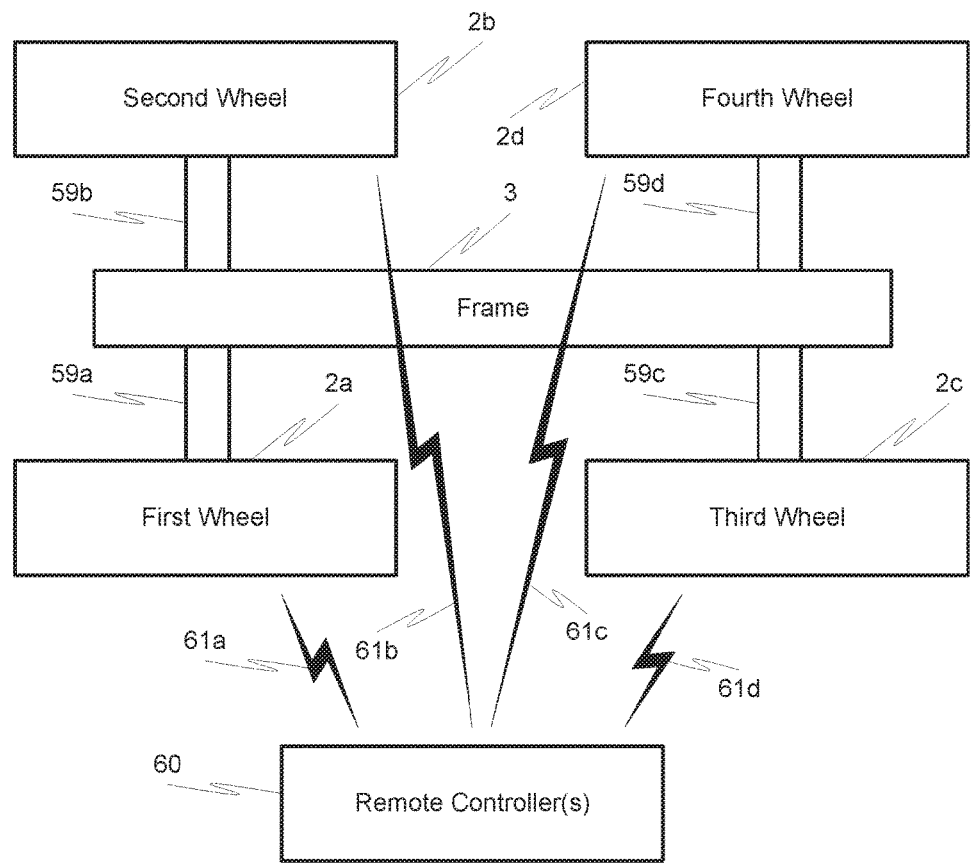
FIG. 87 is a block diagram depicting components of an embodiment of the present disclosure.
Figure 88:
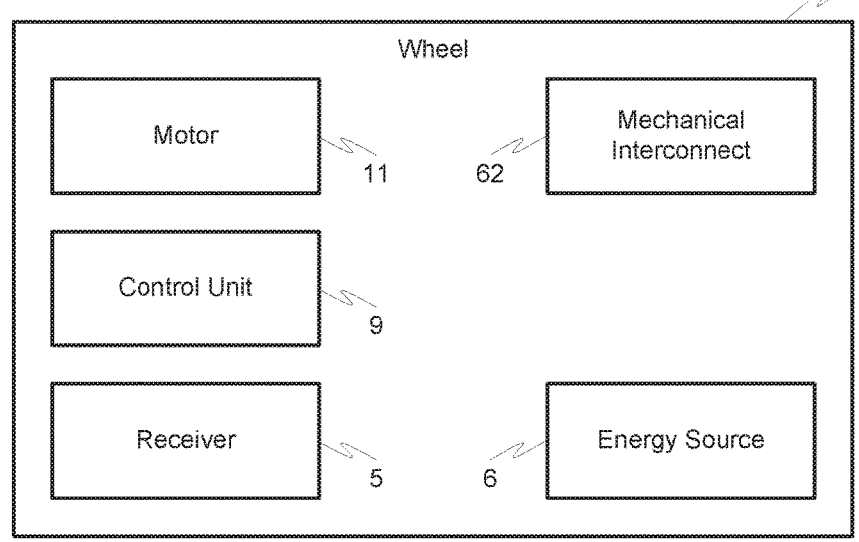
FIG. 88 is a block diagram depicting detailed wheel components for the embodiment of FIG. 87.

Additional details of various configurations of a vehicle having distributed or centralized control functions will now be described in accordance with reference to FIGS. 87-92. Referring initially to FIGS. 87 and 88, one embodiment of a vehicle is depicted in which each wheel 2a-d is depicted as receiving and being responsive to control signals 61a-d transmitted by a remote controller 60. Although four wheels 2a-d are depicted in FIG. 87, it should be appreciated that a vehicle may be equipped with a greater or lesser number of wheels 2 without departing from the scope of the present disclosure. In this illustrative embodiment, a frame 3 is depicted as being configured to mechanically support and connect the wheels 2a-d. However, because each wheel contains its own control unit 9 and is responsive to its own control signal 61a-d, respectively, the frame 3 has no need for carrying electrical communications between wheels 2a-d. Rather, the frame 3 is simply equipped with an appropriate number of mechanical couplings 59a-d that mechanically interface a wheel 2 to the frame 3. Various examples of couplings 59a-d have been depicted and described herein including both fixed couplings and movable (e.g., rotatable) couplings.

In some embodiments, the remote controller 60 may be adapted to emit separate control signals along different communication bands or sub-bands (e.g., at different frequencies, modulations, etc.). Alternatively or additionally, each separate control signal 61a-d may actually correspond to a piece of a single control signal and each control unit 9 of each wheel 2 may be configured to parse the single control signal and understand which portion of the single control signal carries the control signals for that particular wheel 2. In other words, a single control signal may carry a plurality of different control instructions for each of the wheels 2. Each wheel 2 does not necessarily have to be aware of an absolute or relative position of any other wheel. Rather, as long as precision motor control devices are used at each control unit 9 and motor 11 of each wheel 2, the separate control instructions can be processed independently by each control unit 9 of each wheel 2. This effectively obviates the needs for a centralized coordination of control instructions or a centralize controller in general. As mentioned above, each of the different control signals 61a-d may be emitted on a common carrier signal and may be modulated (e.g., frequency, amplitude, phase, etc.) onto the common carrier signal. Each wheel 2 may have an appropriate receiver 5 that receives the common carrier signal and then demodulates the common carrier signal to obtain the desired control instructions for that particular wheel 2. As long as each wheel 2 appropriately demodulates its own control instructions from the common carrier signal, each control unit 9 will respond appropriately to the instructions transmitted by the remote controller 60.

As shown in FIG. 88, each of the wheels 2 may be completely modular and operate independently with respect to the other wheels 2. In this particular example, each wheel 2 may be provided with a motor 11, a control unit 9, and a receiver 5 for receiving the control signal from the remote controller 60. Each wheel 2 may also be provided with its own mechanical interconnect 62 and one or more energy sources 6 (which may vary in both number and type from other wheels). The mechanical interconnect 62 provides the wheel 2 with a mechanism for interfacing with a coupling 59 of the frame 3. The modular nature of each wheel 2 ensures that if one of the wheels 2 fails, is about to fail, or otherwise requires maintenance, then the wheel that is in need of maintenance may be immediately replaced with a different wheel 2, thereby allowing the vehicle to remain operational while the separate wheel is maintained or repaired. Overall, this minimizes the overall downtime for the vehicle.

Figure 89:
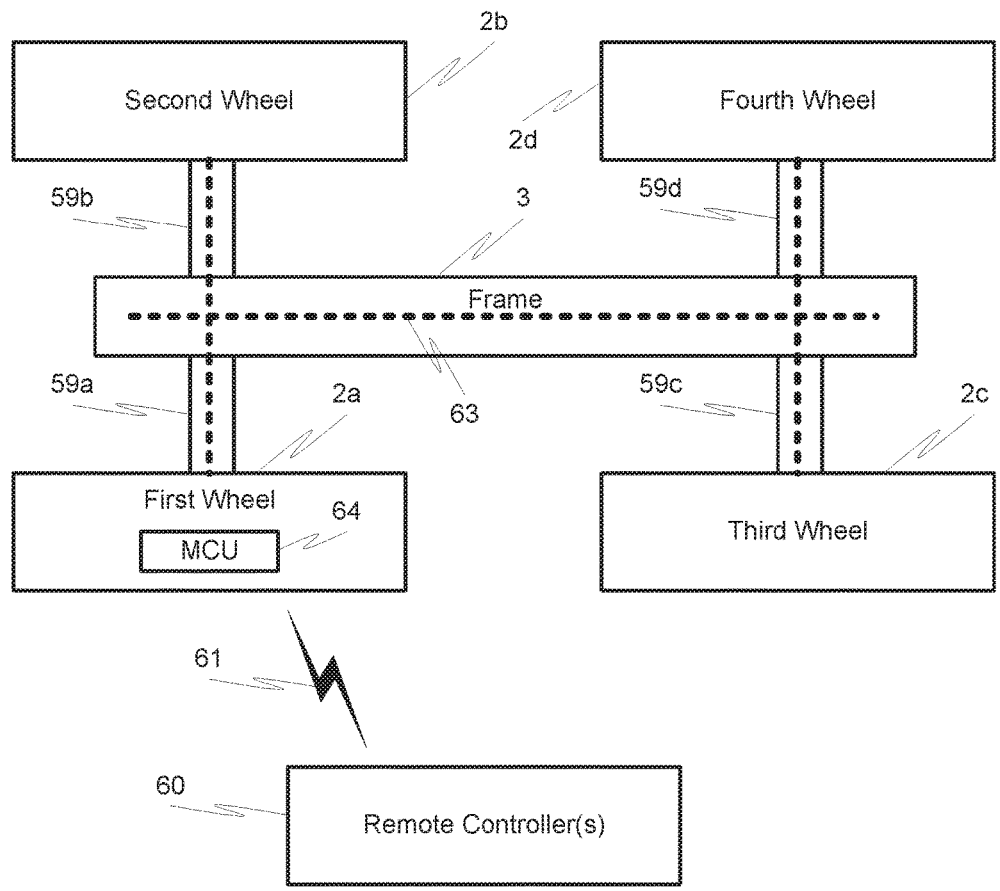
FIG. 89 is another block diagram depicting components of an embodiment of the present disclosure.
Figure 90:
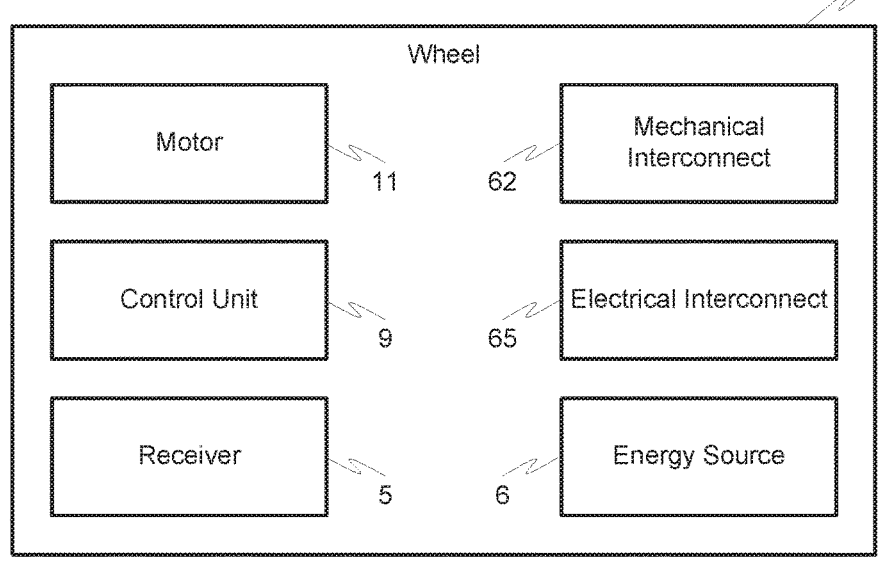
FIG. 90 is a block diagram depicting detailed wheel components for the embodiment of FIG. 89.

FIGS. 89 and 90 depict another variation of a vehicle having modular wheels. This particular variation, however, shows a vehicle to include a frame 3 having a communication bus 63 routed therethrough. The communication bus 63 may correspond to simple electrical wiring that traverses the frame (e.g., on the inside or the outside of the frame 3) and travels between each of the wheels 2a-d. As with the other vehicle depicted in FIGS. 87 and 88, it should be appreciated that the vehicle of FIGS. 89 and 90 may be provided with a greater or lesser number of wheels than is depicted.

The illustrative vehicle shows the communication bus 63 traveling from wheel to wheel 2 through both the frame 3 and each of the couplings 59. In some embodiments, one of the wheels 2 may be provided with a master control unit (MCU) 64 whereas others of the wheels 2 may not be provided with an MCU 64. Rather, the other wheels 2 may simply include a control unit 9 that is responsive to control signals received from the MCU 64. In some embodiments, the remote controller(s) 60 may transmit a control signal 61 to the MCU 64, where the control signal 61 is processed and turned into one or more individual control instructions for each of the control units 9 of the wheels 2. The MCU 64 functionality and the control unit 9 functionality of one wheel 2 may be integrated into a single controller and the other wheels not having the MCU 64 may have a less complex control unit 9. The different control instructions may be carried from one wheel to the other wheels via the communication bus 63. The communication bus 63 may include, without limitation, one or more wires, one or more communication ports (e.g., serial, parallel, combinations thereof), one or more electrical contacts, etc. More specific types of communication buses 63 may include, without limitation, a CAN bus, Ethernet, an FPD-Link, a PCIe interface, a USB port, or the like. As can be appreciated, the architecture of FIG. 89 may also be achieved without a physical communication bus 63 traversing the frame 3. For instance, a wireless communication protocol can be used to exchange control information from the MCU 64 to other control units 9. Examples of suitable wireless communication protocols include a ZigBee protocol, a Bluetooth or BLE protocol, a WiFi or 802.11x protocol, or the like.

Utilization of a wired communication protocol, however, will require each of the wheels 2 to be further equipped with an electrical interconnect 65. The electrical interconnect 65 may be integrated into part of the mechanical interconnect 62. For instance, conductive rings, quick couplings, locking ports, or the like may be used to mechanically and electrically connect each wheel 2 to the couplings 59. Any type of known electromechanical device or system may be used to achieve the combination of the mechanical interconnect 62 and the electrical interconnect 65.

Figure 91:
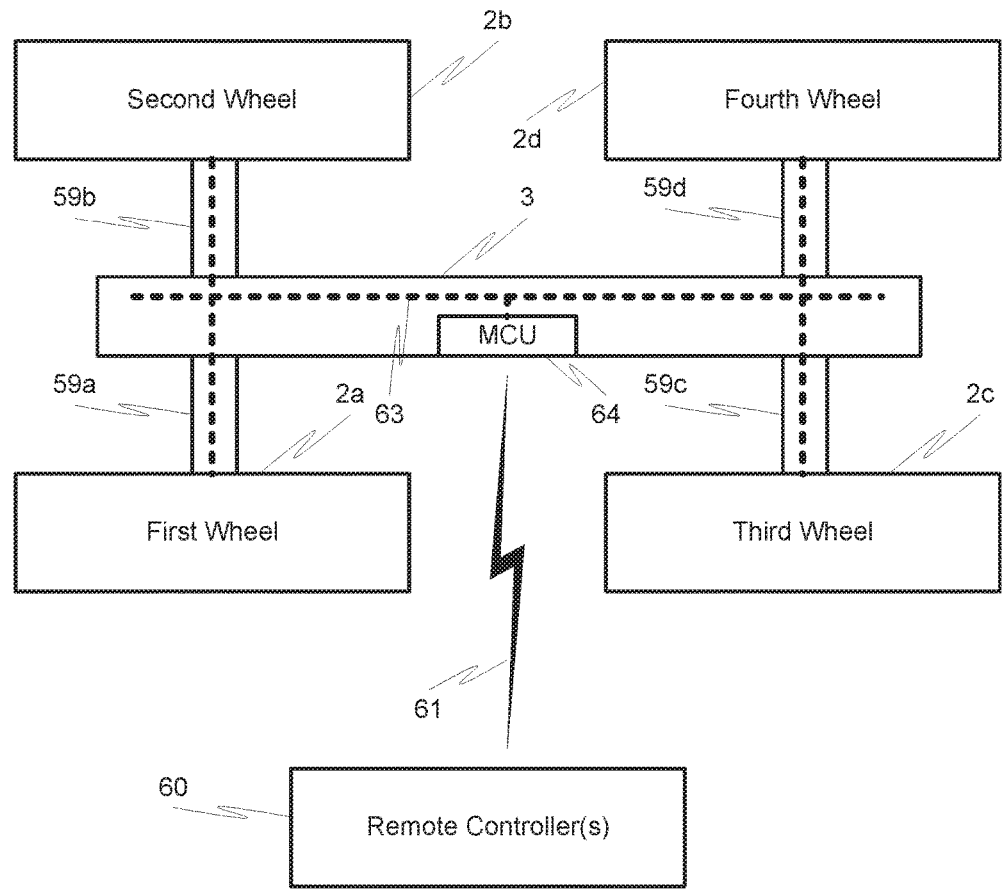
FIG. 91 is another block diagram depicting components of an embodiment of the present disclosure.
Figure 92:
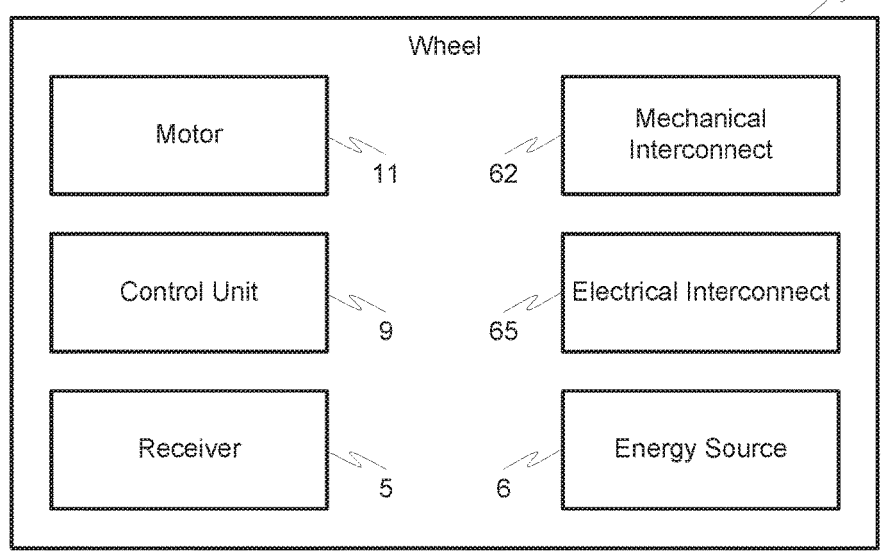
FIG. 92 is a block diagram depicting detailed wheel components for the embodiment of FIG. 91.

FIGS. 91 and 92 depict yet another example of a vehicle having an MCU 64. As compared with other variations depicted and described herein, the MCU 64 is not part of a particular wheel 2, but rather is incorporated into or mounted on the frame 3. In this particular embodiment, each of the wheels 2 is provided with its own control unit 9 that is responsive to the control instructions received over the communication bus 63 from the MCU 64. Thus, each wheel 2 is shown to include a motor 11, control unit 9, receiver 5, mechanical interconnect 62, electrical interconnect 65, and energy source 6. The advantage to this particular design is that each wheel 2 is similar to all other wheels 2 in the vehicle, which makes the replacement of each wheel easier. However, the downside to this particular design is that if the MCU 64 fails, then the entire frame 3 will need to be replaced before the vehicle can be placed back into operation. This may take a little more time than simply replacing one wheel 2 having an MCU 64 with another wheel 2 having an MCU 64.

While FIGS. 87-92 have shown various design configurations for a vehicle, a vehicle frame, and vehicle wheels, it should be appreciated that other design configurations are also contemplated. In particular, the frame 3 may simply be equipped with its own receiver 5. All other components (including control units 9, motors 11, MCUs 64, etc.) may be maintained in one or more of the wheels 2. As another non-limiting example, a receiver 5 may be provided on the frame 3 and the two front wheels 2 may be provided with control units 9. The control units 9 of the front wheels 2 may provide control signals to the motors 11 contained within the same wheels as the control units 9 as well as other wheels that do not have control units 9 contained therein. For instance, a control unit 9 in the front right wheel 2 may provide control signals to motors 11 in the front and back right wheels. Likewise, a control unit 9 in the front left wheel 2 may provide control signals to motors 11 in the front and back left wheels. Other variations and combinations of wheels and their components may also be accommodated without departing from the scope of the present disclosure.

Figure 93:
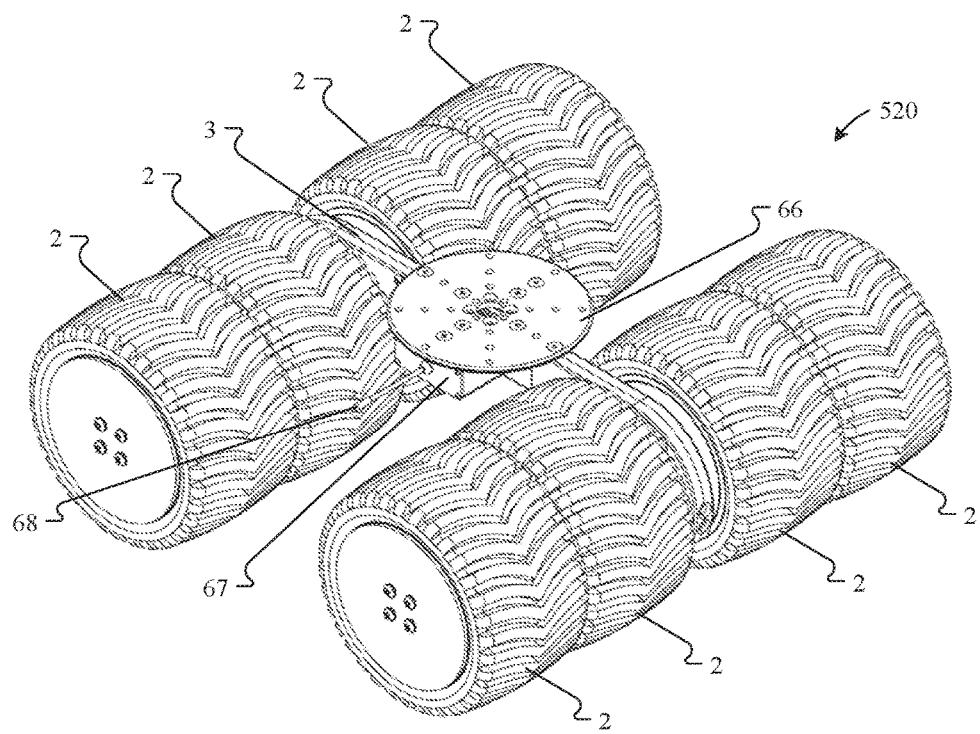
FIG. 93 is an isometric view of another embodiment of the present disclosure.

With reference now to FIGS. 93-99, additional details of another variant of vehicle 520 will be described in accordance with at least some embodiments of the present disclosure. The vehicle 520 is shown to having a plurality of wheels 2. The vehicle 520 also shows that inner wheels 2 can be connected to the frame 3 in addition to having an outer wheel also connected thereto. Alternatively or additionally, the vehicle 520 may only have four wheels, but the overall width of each wheel may be relatively larger than a normal wheel. Thus, although FIG. 93 shows a pair of wheels on each side of an axle, it should be appreciated that a single wheel may be mounted to each axle without departing from the scope of the present disclosure. The use of multiple wheels or wider-than-normal wheels can, however, help to increase the traction and grip of the vehicle when traversing various obstacles or terrain. In some embodiments, the inner wheel 2 may be equipped with the various wheel components described herein (e.g., energy source, control unit, motor, receiver, etc.) whereas the outer wheel 2 may simply be mechanically connected to the inner wheel 2. Alternatively, the outer wheel 2 may be equipped with the various wheel components described herein (e.g., energy source, control unit, motor, receiver, etc.) whereas the inner wheel 2 may simply be mechanically connected to the outer wheel 2. Alternatively, the inner and outer wheels 2 may both be equipped with some or all of the wheel components described herein and the wheels 2 may be configured to operate in coordination with one another.

Figure 94:
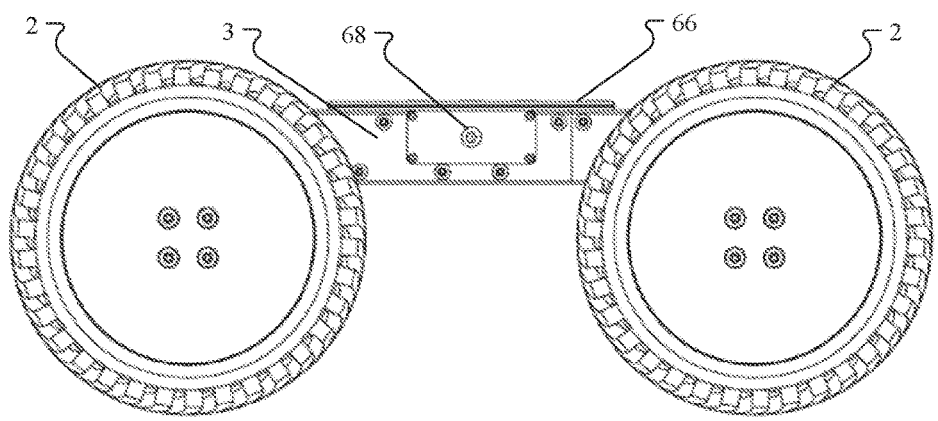
FIG. 94 is a side view of the embodiment of FIG. 93.

In addition to exhibiting the multiple wheels 2 per coupling 59, the vehicle 520 also exhibits a universal platform 66 mounted on the frame 3. The platform 66 may include a substantially planar base having one or many mounting holes that enable implements of various types to be mounted onto the platform 66. The platform 66 is basically provided as a mechanism for mechanically supporting and securing an implement to the frame 3. FIGS. 93 and 94 also show that a receiver 67 may be mounted to the frame 3 without departing from the scope of the present disclosure. The receiver 67 is shown to include a receiver antenna 68, which may enable the receiver 67 to receive control signals 61 from a controller 60. In some embodiments, the receiver 67 may correspond to a simple receiver or the receiver may include elements of an MCU 64.

Figure 95:
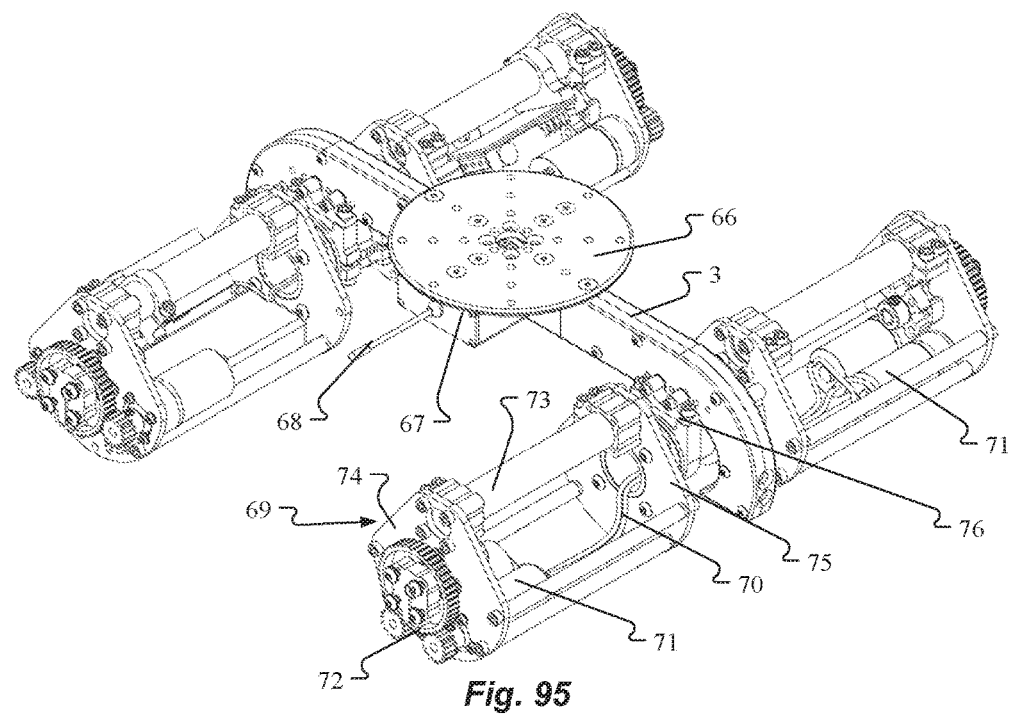
FIG. 95 is an isometric view of component parts for the embodiment of FIG. 93.
Figure 96:
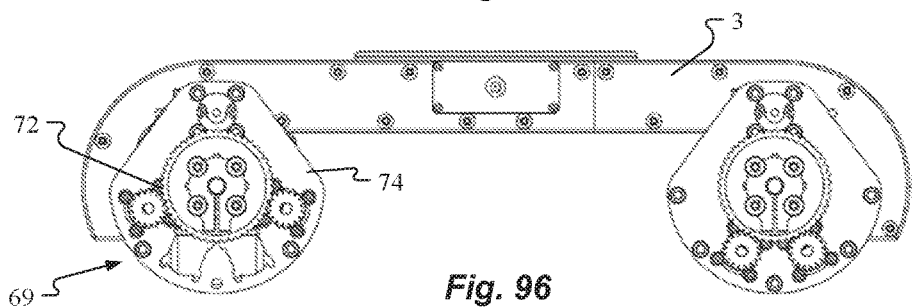
FIG. 96 is a side view of the component parts depicted in FIG. 95.
Figure 97:
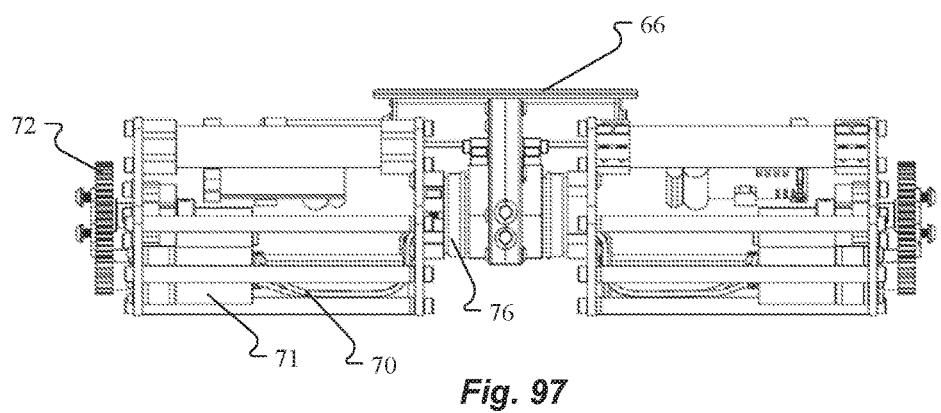
FIG. 97 is a front view of the component parts depicted in FIG. 95.

FIGS. 95-97 depict additional details of the component parts that may be included in the vehicle 520. In particular, a plurality of wheel mounts 69 are shown as being connected to the frame 3. Each wheel mount 69 may correspond to a mechanical and/or electrical interface between a wheel 2 and the frame 3. In the depicted embodiment, the wheel mount 69 are substantially secured to the frame 3 using one or more of snap fittings, screws, bolts, locking quick couplers, or the like. Each wheel mount 69 may be desired to house various components that have previously been described as being included in a wheel 2. In these embodiments, however, the wheel mounts 69 carry the majority of the components used to operate a wheel 2 and the wheels 2 are provided with an internal void that fits around the wheel mount 69. The wheel mounts 69 also contain the components used to drive (e.g., rotate) a wheel 2 in a forward and/or backward direction.

As a non-limiting example, each wheel mount 69 is shown to include a plurality of wires 70 designed to carry electrical signals (e.g., control instructions) to/from control motors 71 and/or energy sources of the wheel mount 69. The wires 70 travel along the inside of the wheel mount from an inner most part of the wheel mount 69 (e.g., from an inner plate 75 nearest to the frame 3 to an outer plate 74 furthest from the frame 3). The wires 70 may interconnect with a communication bus 63 that travels through the rest of the frame 3 via an electrical interface provided in an electro-mechanical coupling 76.

The wheel mounts 69 are also shown to include one or many drive gears 72 that are powered by the control motors 71 and/or energy sources contained within the wheel mount 69. In particular, a wheel 2 may be provided with a closed end that mounts to the wheel mount 69 and has one or more gears that interface with the gears 72. Rotation of the gears 72 may result in a corresponding rotation of the wheel 2 mounted thereto. In some embodiments, one or more of the gears 72 may share a common axis of rotation with the wheel 2, although such a configuration is not required. It should be appreciated that any type of control motor 71 and/or energy source may be used to drive the gears 72 and, in turn, the wheels 2 mounted to the gears 72. As some non-limiting examples, the control motor 71 may include a servo motor, a DC electric motor, an AC electric motor, a hydraulic motor, a stepper motor, or combinations thereof. In some embodiments, the control motor 71 may include an integrated servomotor having a motor, driver, encoder, and associated electronics integrated into a single package.

The wheel mounts 69 further show one or more spacer bars 73 that maintain a fixed connection and distance between the inner plate 75 and outer plate 74. One or a plurality of spacer bars 73 may be used to ensure the mechanical integrity and shape of the wheel mounts 69 when subjected to working conditions (e.g., vibration, torque, impacts, etc.). As with other embodiments depicted and described herein, it may be desirable to maintain some or all components of the wheel mounts 69 below the axis of rotation of the wheels 2. For instance, the control motor 71 and/or energy source may be positioned toward a bottom portion of the wheel mount 69 below the axis of rotation of the main gear 72 to which the wheel 2 is mounted. This helps to place the center of gravity of the wheel mounts 69 below the axis of rotation of the wheel 2. Other components of the wheel mount 69 such as the plates 74 and 75 may also be designed to have a center of gravity that is positioned below the axis of rotation of the wheel 2. For instance, FIG. 96 shows that the plates 74 and 75 may have a tear-dropped shape in which more of the material of the plates 74 and 75 are positioned lower as compared to the rest of the plate. This further pushes the center of mass of the plates 74 and 75 below the center of the main gear 72 (and wheel 2).

As a non-limiting example, FIGS. 96 and 97 show additional details of mounting screws or bolts that are provided on the outer face of the largest gear 72. These mounting screws or bolts may be used to connect the wheel 2 to the gear 72. As a non-limiting example, the inner volume of a wheel 2 may be empty and the outer face of the wheel 2 may be closed with a mounting plate that connects with the gear 72 via the mounting screws or bolts. As the gear 72 turns under control of the motor, the wheel 2 may also turn a corresponding angle of rotation. Thus, a precise knowledge of the rotation of the largest gear 72 can be correlated to knowledge of rotation (distance or angle) of the wheel 2. This information can be used to ensure accurate control of the vehicle 520 is maintained.

Although the gear 72 and mounting screws or bolts are shown as being provided on the outer plate 74, it should be appreciated that the wheel mount 69 and wheel 2 may be configured to have the wheel 2 mounted to the inner plate 75 and the gears 72 may also be provided on the inner plate 75 without departing from the scope of the present disclosure. In general, any type of configuration or wheel-mounting modification can be accommodated without departing from the scope of the present disclosure.

Figure 98:
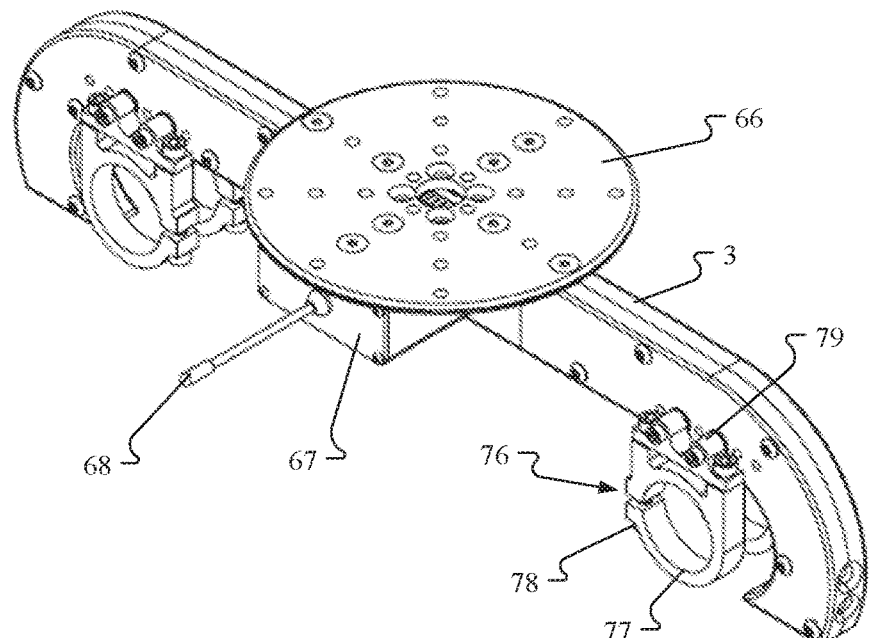
FIG. 98 is an isometric view of additional component parts for the embodiment of FIG. 93.
Figure 99:
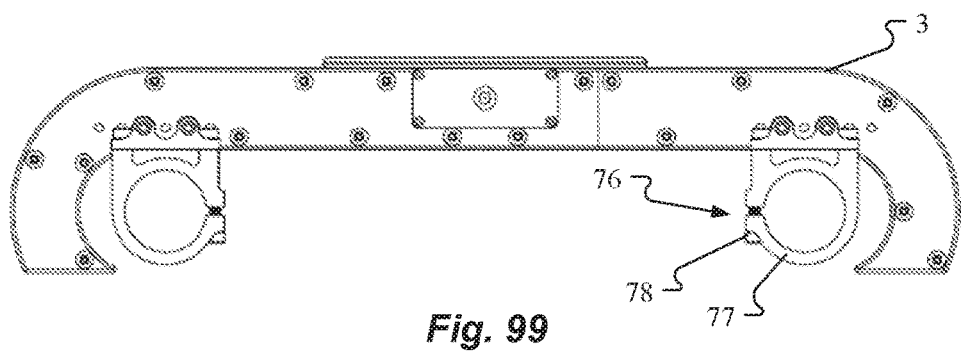
FIG. 99 is a side view of the component parts depicted in FIG. 98.

FIGS. 98-99 depict additional details of the couplings 76 in accordance with at least some embodiments of the present disclosure. The couplings 76 are shown to include an adjustable c-clamp 77 having an adjustment screw 78 and one or more setting bolts 79. The setting bolts 79 may mechanically connect the wheel mounts 69 to the frame 3. In some embodiments, some or all of the c-clamp 77 may be electrically conductive, thereby enabling the coupling 76 to also carry an electrical signal between a communication bus 63 of the frame 3 and the wires 70 of the wheel mounts 69. Alternatively or additionally, the wires 70 may simply pass through the c-clamp 77 and travel through the interior of the frame 3 without requiring a more complex electrical interface between the wheel mount 69 and the frame 3. In such an embodiment, direct wired connections may carry control information between wheels 2 and/or the receiver 67.

Figure 100:
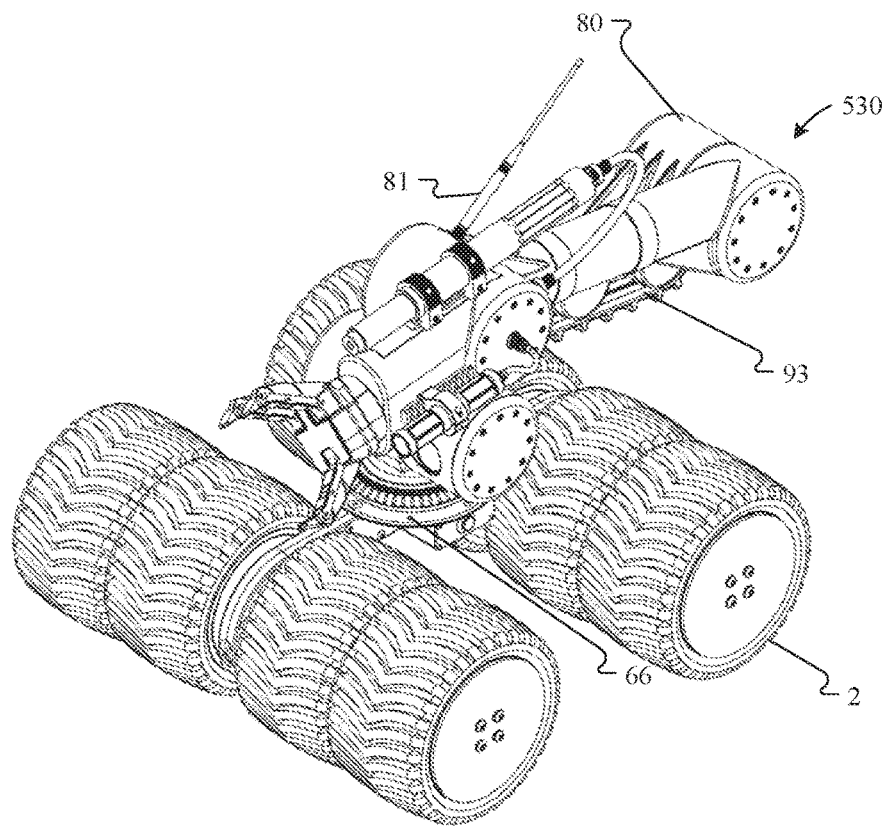
FIG. 100 is an isometric view of another embodiment of the present disclosure.
Figure 101:
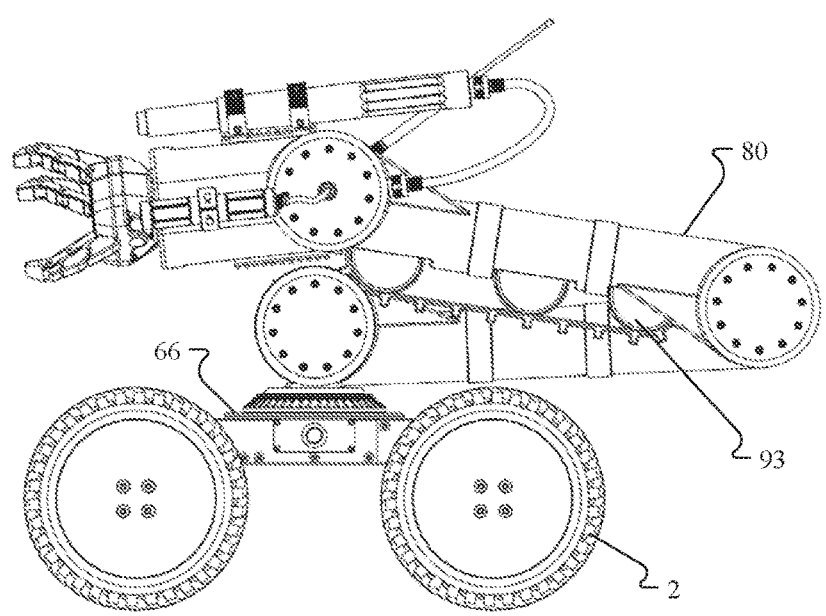
FIG. 101 is a side view of the embodiment of FIG. 100.

FIGS. 100 and 101 depict additional details of another vehicle 530 in accordance with at least some embodiments of the present disclosure. The vehicle 530 is similar to vehicle 520 except that a particular implement 80 in the form of a movable arm is mounted to the platform 66. The movable arm is but one example of an implement 80 that may be mounted to the platform 66. This particular type of implement 80 is shown to include its own receiver 81 for receiving control signals from a remote control 60. This means that the implement 80 may be independently manipulated without having to carry a control signal from the receiver 67 to the implement 80. As discussed above, any other type of implement or combination of implements may be mounted to the platform 66 without departing from the scope of the present disclosure.

The implement 80 is also shown to have a track 93 incorporated thereon. The track 93 may correspond to a movable element of the implement 80 that can be used to help the vehicle 530 climb or traverse obstacles. For instance, the implement 80 may correspond to an extendible or manipulatable arm in which case the track 93 (or a device similar thereto) can be positioned on top of an obstacle. Once positioned on top of an obstacle, the arm may be manipulated and the track 93 may be driven so as to enable the vehicle 530 to climb the obstacle. As can be appreciated, one, two, three, or more tracks or other types of moving elements such as wheels or the like may be included on the implement 80 without departing from the scope of the present disclosure.

Figure 102:
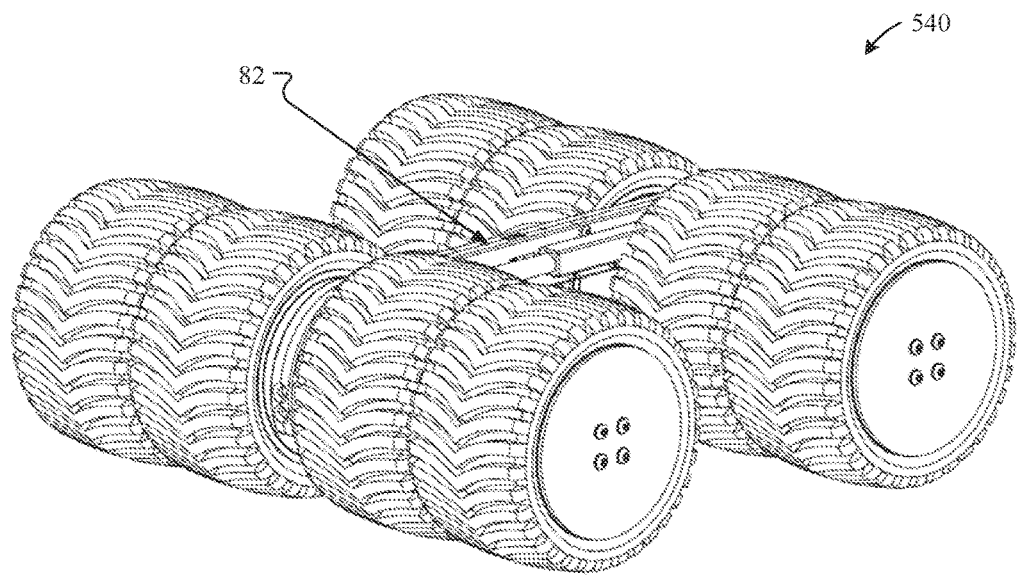
FIG. 102 is an isometric view of another embodiment of the present disclosure.
Figure 103:
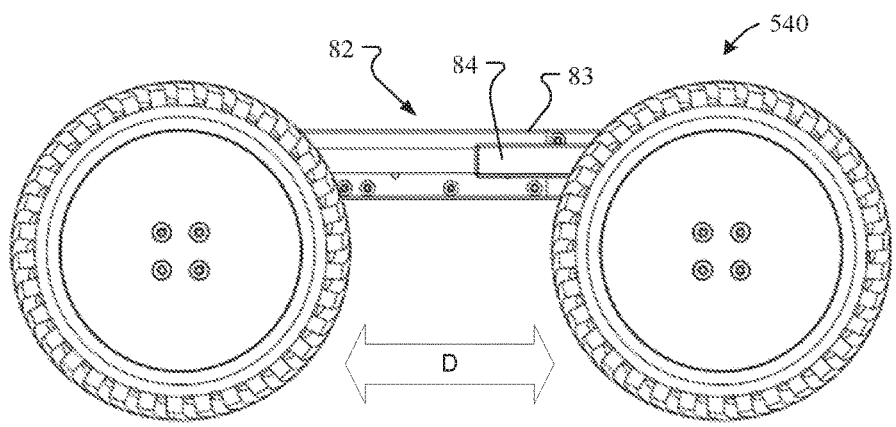
FIG. 103 is a side view of the embodiment of FIG. 102.

FIGS. 102 and 103 depict yet another variation of vehicle 540 in accordance with at least some embodiments of the present disclosure. The vehicle 540 is shown to include an adjustable frame 82 that enables the distance D between wheels 2 to be dynamically changed during operation. In some embodiments, the adjustable frame 82 includes an adjustable support 83 and a control arm 84. The control arm 84 may be provided in the form of a hydraulic or pneumatic piston whose length is changeable in response to a control signal received from a remote control 60. Alternatively or additionally, the control arm 84 may include a number of electromechanical components (worm gears, linear motors, electronic linear actuator, etc.) that enable the distance D between the wheels 2 to be adjusted.

Dynamic adjustment of the distance D during operation allows the vehicle 540 to adapt to variable terrain conditions or obstacles. For instance, the distance D may be shortened when traveling along a substantially flat path with relatively large obstacles to avoid high-centering the vehicle 540. Conversely, the distance D may be lengthened to enable the vehicle 540 to climb steps or obstacles of a height that could not otherwise be climbed if the distance D were maintained at a relatively short length.

Figure 104:
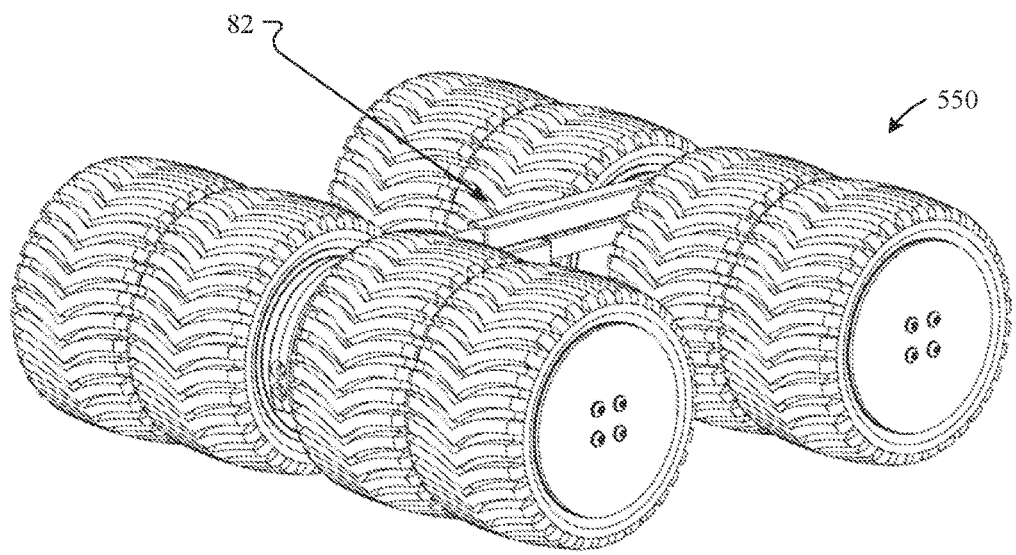
FIG. 104 is an isometric view of another embodiment of the present disclosure.
Figure 105:
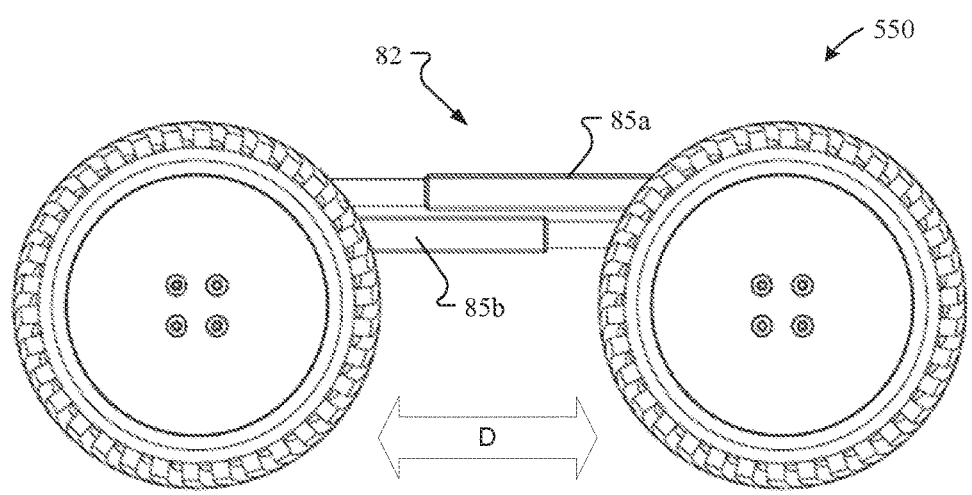
FIG. 105 is a side view of the embodiment of FIG. 104.

FIGS. 104 and 105 depict another variation of vehicle 550 that accommodates a dynamic adjustment of the distance D between wheels 2. This particular embodiment utilizes a pair of control arms 85a, 85b that also function as the frame. In this embodiment, the adjustable frame 82 does not include a passive support 83. Instead, the adjustable frame 82 is composed entirely of active and adjustable arms 85a, 85b that work together to adjust the distance D.

Although FIGS. 104 and 105 show the adjustable frame 82 to include two adjustable arms 85a, 85b, it should be appreciated that a greater or lesser number of arms may be used without departing from the scope of the present disclosure. Furthermore, the types of devices used for the adjustable arms 85a, 85b may be similar or identical to the devices used for control arm 84. For instance, pneumatic, hydraulic, and/or electromechanical components may be used to adjust the length of the adjustable arms 85a, 85b. Mechanical stops may be provided on the adjustable arms 85a, 85b to limit the overall distance D to one that is still capable of being supported by the arms 85a, 85b. Said another way, the distance D may be maintained below a particular threshold so as to avoid mechanical failure of the adjustable arms 85a and/or 85b.

Although the vehicles 540 and 550 are shown to include actuators that move linearly when adjusting the distance D, it should be appreciated that other components and types of motion can be utilized to adjust the distance D. For instance, scissor-type joints or similar pivoting hinges may be provided between arms connected to the front wheels and arms connect to the back wheels. The scissor-type joints or pivoting hinges may rotate to adjust the distance D. More specifically, the scissor-type joint may have an apex located equidistance between the front and back wheels. As the joint bends, the apex of the arms may move upward, thereby decreasing the distance D. Conversely, the joint may be straightened until the arms are substantially parallel with one another, at which point the distance D is maximized. In some embodiments, if an implement is mounted to the apex of the joint, then motion of the joint may also facilitate the upward and/or downward movement of the implement. This may be useful in scenarios where, for example, a camera or the like is mounted to or near the apex. As the apex is raised, the camera may also be raised with the apex.

Figure 106:
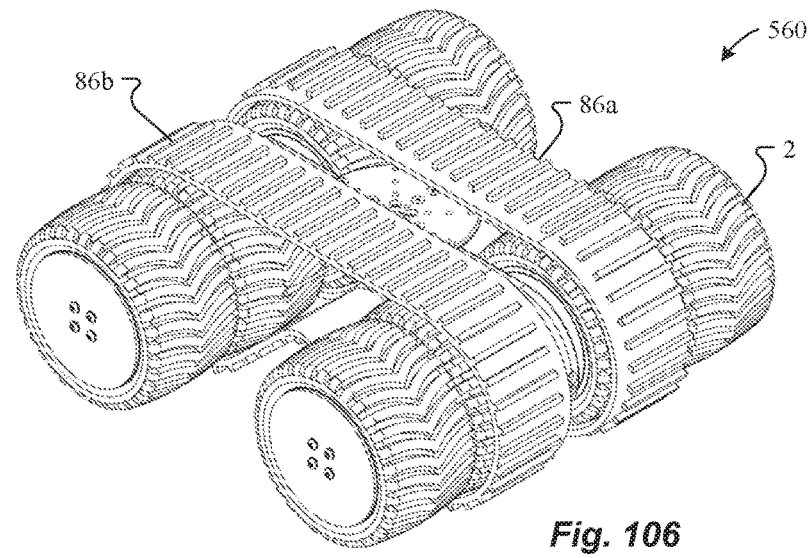
FIG. 106 is a top isometric view of another embodiment of the present disclosure.
Figure 107:
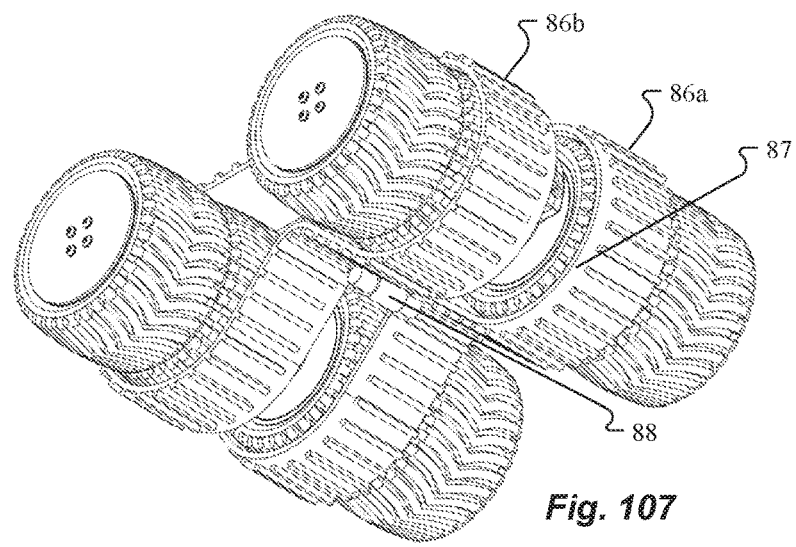
FIG. 107 is a bottom isometric view of the embodiment of FIG. 106.
Figure 108:
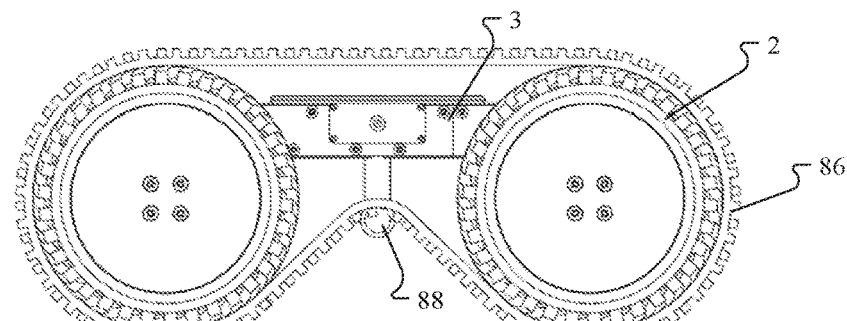
FIG. 108 is a side view of the embodiment of FIG. 106.
Figure 109:
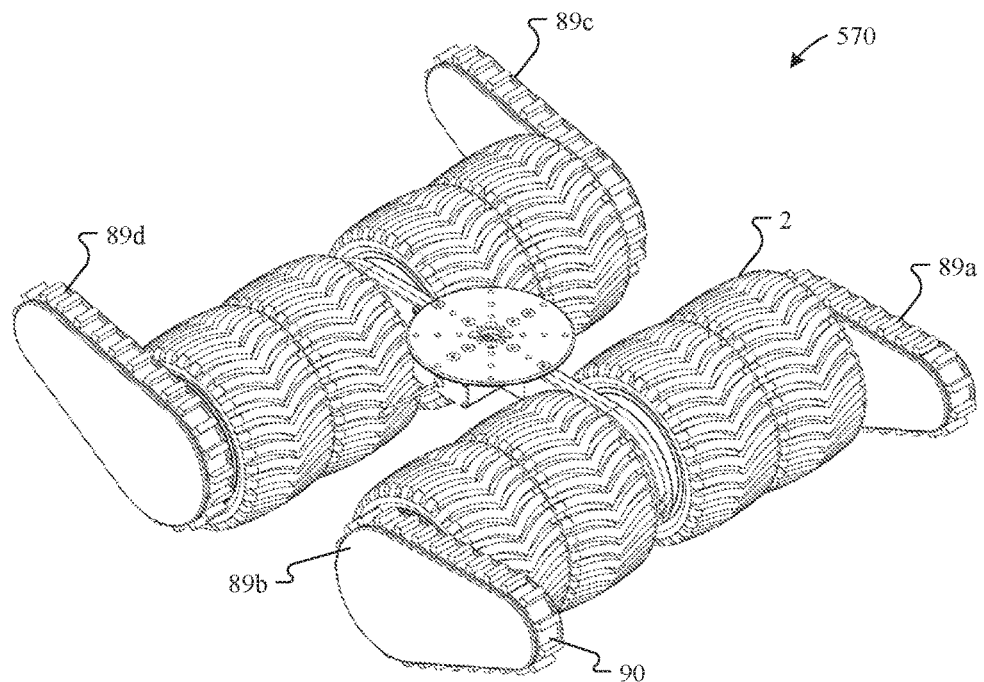
FIG. 109 is an isometric view of another embodiment of the present disclosure.
Figure 110:
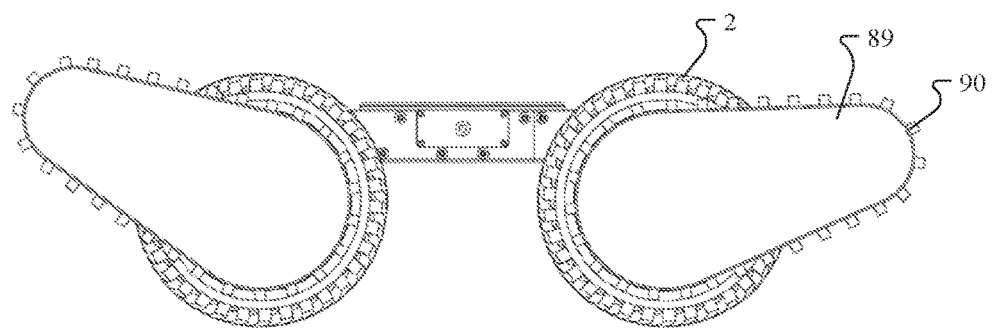
FIG. 110 is a side view of the embodiment of FIG. 109.

With reference now to FIGS. 106-108, yet another example of a vehicle 560 will be described in accordance with at least some embodiments of the present disclosure. The vehicle 560 is shown to include one or two tracks 86*a*, 86*b* that circumnavigate the wheels 2 of the vehicle 2. The vehicle 560 is otherwise similar to vehicle 520 except for the tracks 86*a*, 86*b* and a track arm 88 that pulls the tracks into a void space between the wheels 2. The tracks 86*a*, 86*b* can assist the vehicle 560 when climbing obstacles such as stairs, rocks, and other debris. Specifically, the tracks 86*a*, 86*b* include a treaded portion and a non-treaded portion 87 along their entire length. The treads of the treaded portion enable each track to maintain a grip of any object over which the vehicle 560 is climbing.

The non-treaded portion 87 of the tracks 86*a*, 86*b* enable the tracks 86*a*, 86*b* to interface with a track arm 88. The track arm 88 is used to pull the tracks 86*a*, 86*b* up and between the wheels 2, rather than allows the tracks 86*a*, 86*b* to travel directly between the wheels 2. In some embodiments, the track arm 88 may be dynamically adjustable. Said another way, the track arm 88 may be mounted to the frame 3 with a telescoping or adjustable arm that enables the track arm 88 to be moved upward or downward with respect to the frame 3. This creates a space for a step or other obstacle to fit between the wheels 2 rather than being pushed away from the wheels. In other words, the tracks 86*a*, 86*b* can maintain a grip on objects that come between the wheels 2. This allows the vehicle 560 to avoid flipping over objects because the front wheels 2 are allowed to traverse on top of the object. At the same time, the tracks 86*a*, 86*b* can gain traction on the object and enable the vehicle 560 to climb across the object with little to no trouble.

It should be appreciated that the vehicle 560 may be fully tracked and without wheels. In other words, the tracks 86 may wrap around direct pulleys or the like and the vehicle 560 may only move under operation of the tracks 86.

FIGS. 109-118 depict addition variants of vehicles 570, 580 that have additional elements further enhancing obstacle (e.g., stair, rock, and/or debris) climbing. In accordance with at least some embodiments, a vehicle 570 may be provided with one or more climbing flippers 89*a*, 89*b*, 89*c*, 89*d* that extend the traction area and wheel base of the vehicle 570. Although the vehicle 570 is shown to include four climbing flippers, it should be appreciated that a vehicle may include one, two, three, four, . . . , ten or more climbing flippers without departing from the scope of the present disclosure. Each of the flippers 89 may be provided with climbing tracks 90 that can flip around the same axis of rotation as the wheels 2.

Figure 113:
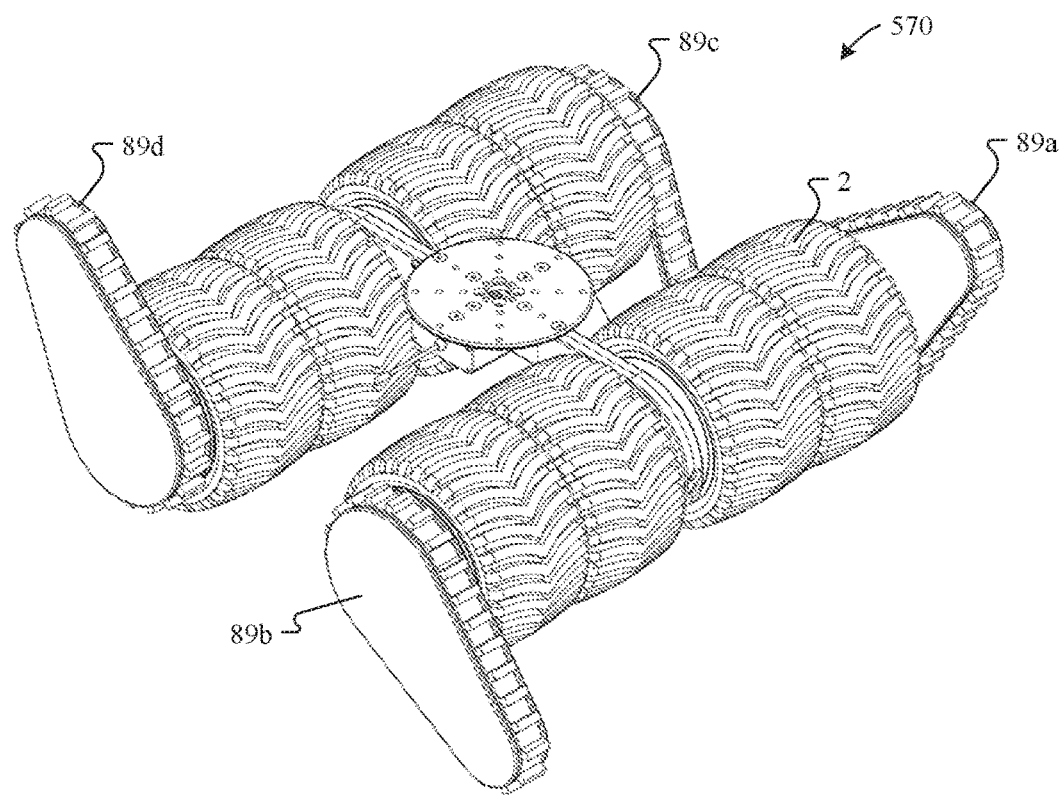
FIG. 113 is an isometric view of another embodiment of the present disclosure.
Figure 114:
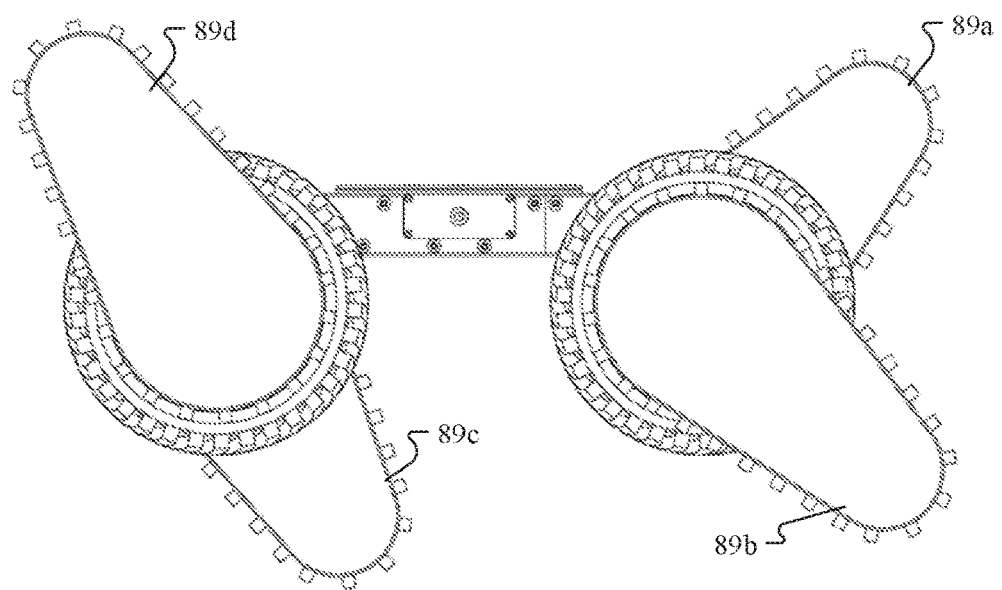
FIG. 114 is a side view of the embodiment of FIG. 113.

The climbing flippers 89 may be manipulated independent of one another and independent of the wheels 2 to which they are mounted (see e.g., FIGS. 113 and 114). For instance, a wheel 2 may be allowed to rotate about the gear 72 to which it is mounted and the rotation of the wheel 2 may not necessarily impart rotation to the flipper 89 mounted thereto. Thus, it is not necessary that the flipper 89 and wheel 2 share the same axis of rotation, although such a configuration is possible. The tracks 90 on the flippers 89 may also be driven independently of the wheels 2 and/or the movement of the flippers 89. This independent operation of the flippers 89 may be facilitated by dedicated flipper control motors and control units. These control motors and/or control units may be provided internally to the flippers 89. Alternatively or additionally, the control motor and/or control unit for a flipper 89 may be provided within the wheel mount 69.

In some embodiments, when the vehicle 570 encounters an object or obstacle, the flippers 89 may be raised up to allow the front wheels 2 to contact the obstacle. Then, as the wheels 2 attempt to gain traction with the front face of the obstacle, the flipper(s) 89 of the front wheels 2 may be rotated to contact a top or upper surface of the same obstacle. Once contacted with the top or upper surface of the same obstacle, the tracks 90 may be set into motion and the grip of the tracks 90 on the top of the obstacle may enable the obstacle to assist the wheels 2 with climbing the front face of the obstacle. Once the wheels 2 are on top of the obstacle, the climbing flippers 89 may be rotated out of the way to enable the vehicle 570 to climb on top of the obstacle without further obstructing the vehicles' ability to continue moving forward. It should be appreciated that the flippers 89 may be provided on any variation of vehicle depicted and described herein.

Figure 111:
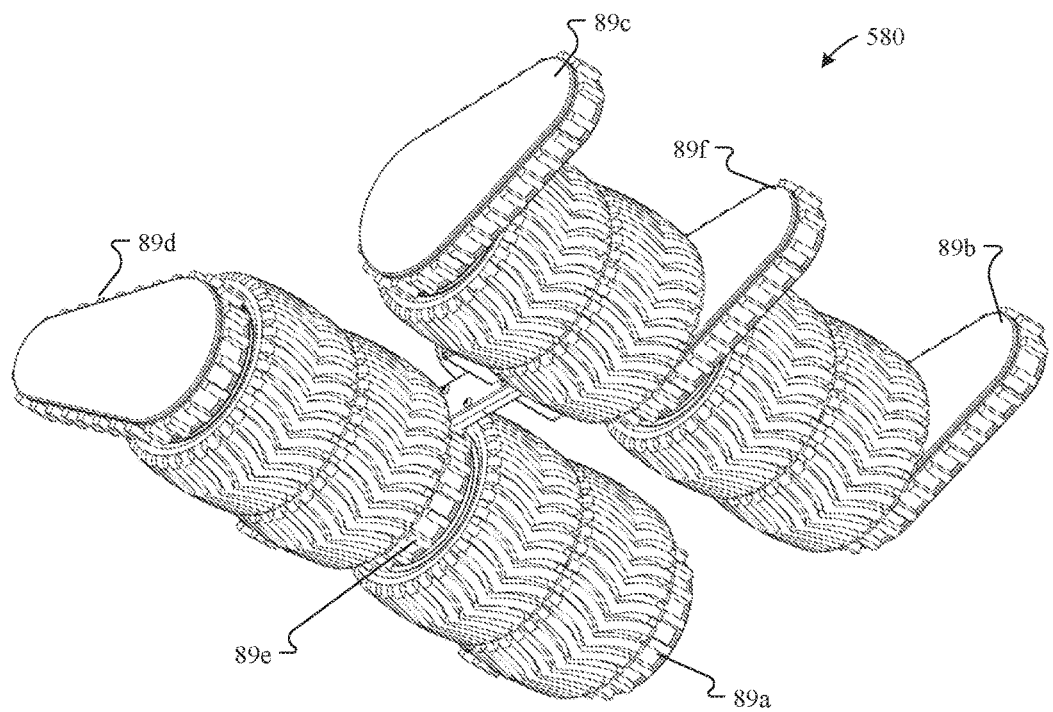
FIG. 111 is an isometric view of another embodiment of the present disclosure.
Figure 112:
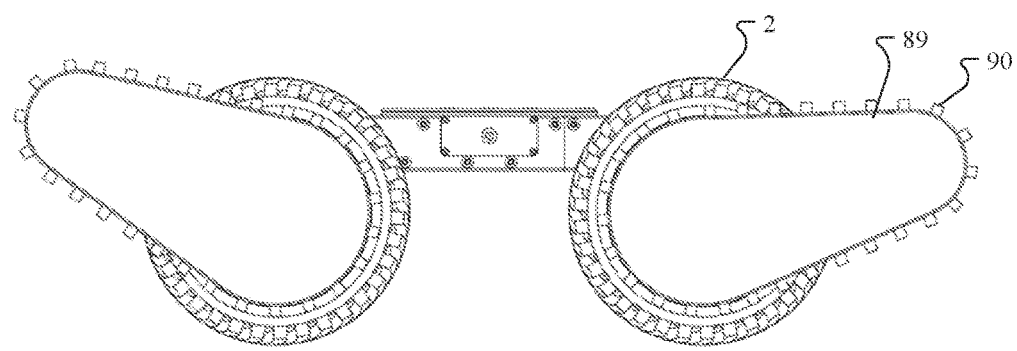
FIG. 112 is a side view of the embodiment of FIG. 111.

FIGS. 111 and 112 depict an embodiment of a vehicle 580 having more than four flippers 89. In particular, vehicle 580 is shown to include six flippers 89. Four of the flippers are mounted on the outside of the outer wheels while two additional flippers 89*e*, 89*f* are provided in alignment with the frame 3 of the vehicle 580. These additional flippers 89*e*, 89*f* may be used to contact and pull the vehicle 580 on top of the center of an obstacle whereas the outer flippers enable contacting of an obstacle at the vehicle's sides. Depending upon the nature and shape of the object, one, two, or all three of the flippers 89 may be manipulate to pull the vehicle 580 on top of a particular object.

Figure 115:
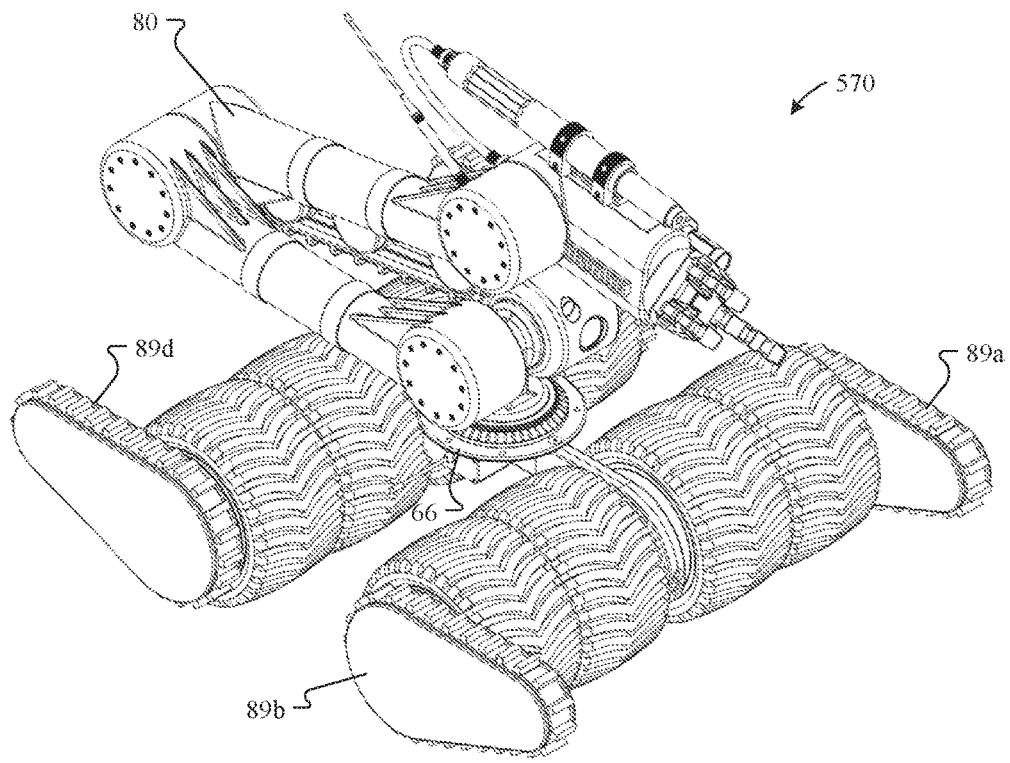
FIG. 115 is an isometric view of another embodiment of the present disclosure.
Figure 116:
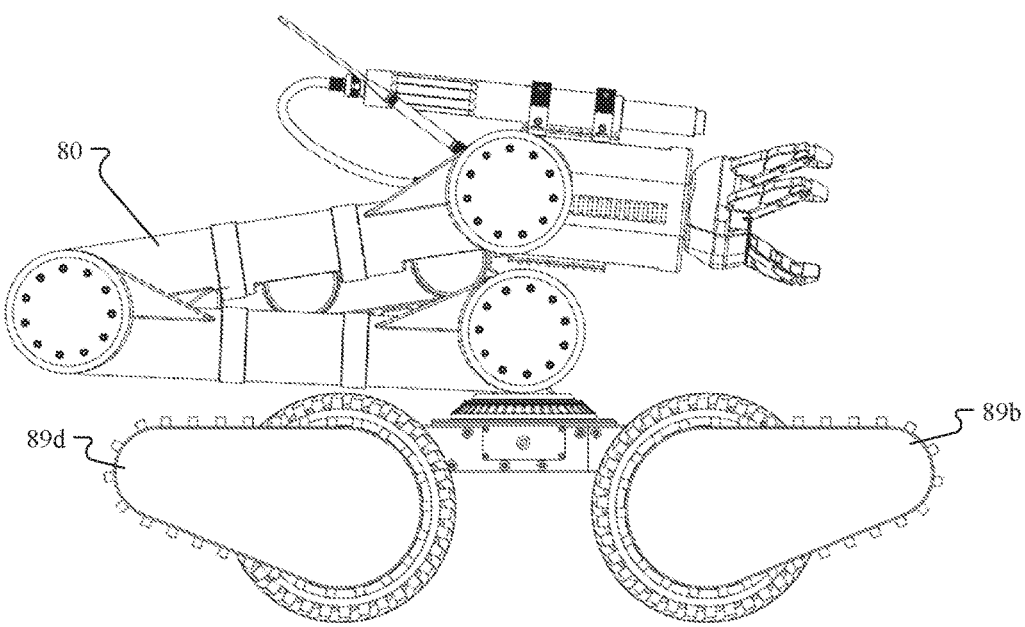
FIG. 116 is a side view of the embodiment of FIG. 115.

As can be seen in FIGS. 115 and 116, the vehicle 570 may also be provided with the universal platform 66 that accommodates one or multiple implements 80. The implement(s) 80 may be used in conjunction with the flippers 89 to assist the vehicle with traversing and/or moving over various obstacles. Similar to vehicle 530, vehicle 570 is also shown to include a track 93 on its implement 80. This additional track on the adjustable arm provides the vehicle 570 with yet another way to reach up onto an obstacle or object and pull the vehicle 570 on top of or over the object with the track 93. An advantage of having the track 93 provided on the implement 80 is that the track 93 can be moved in any number of directions with the arm and reach places that cannot be reached with the wheels 2 or flippers 89.

Figure 117:
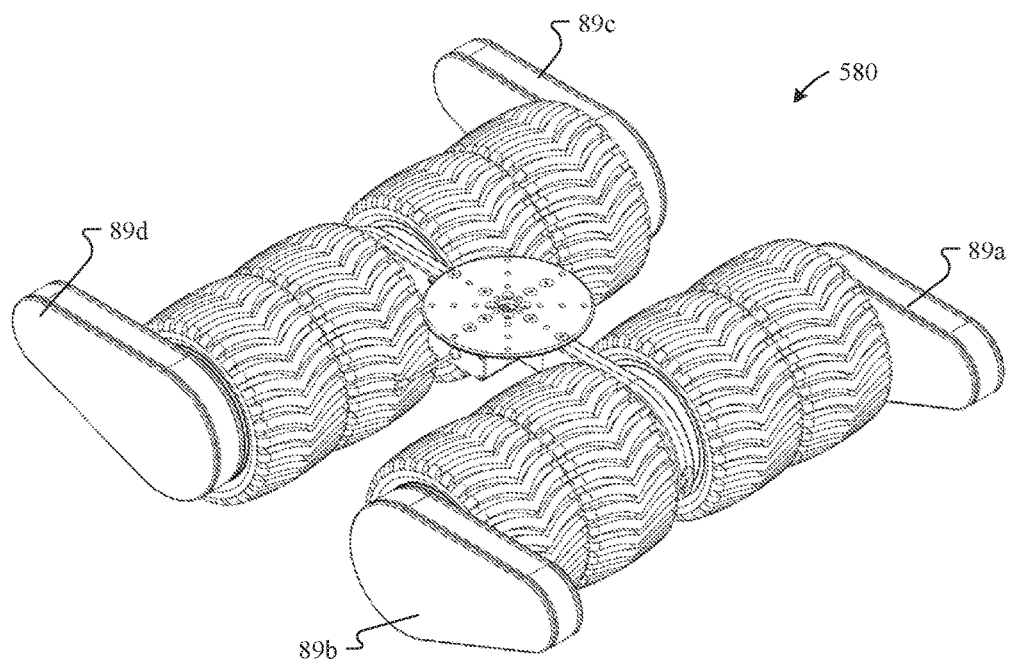
FIG. 117 is an isometric view of another embodiment of the present disclosure.
Figure 118:
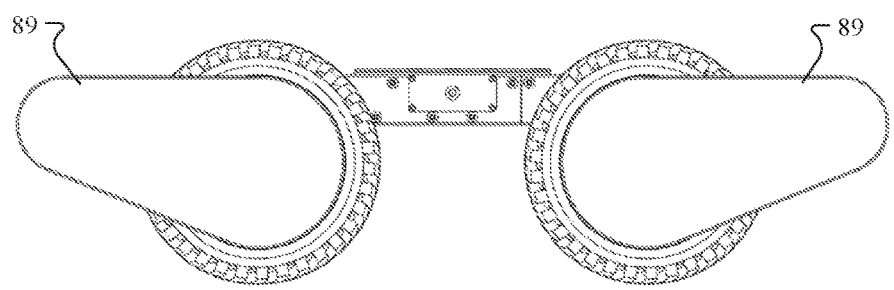
FIG. 118 is a side view of the embodiment of FIG. 117.
Figure 119:
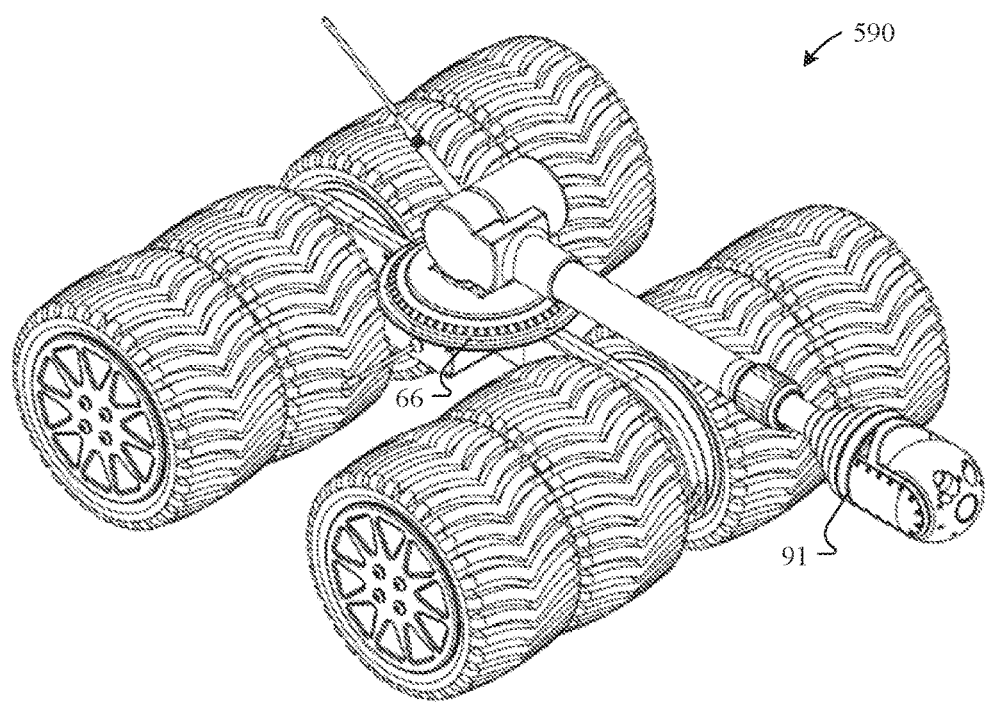
FIG. 119 is an isometric view of another embodiment of the present disclosure.
Figure 120:
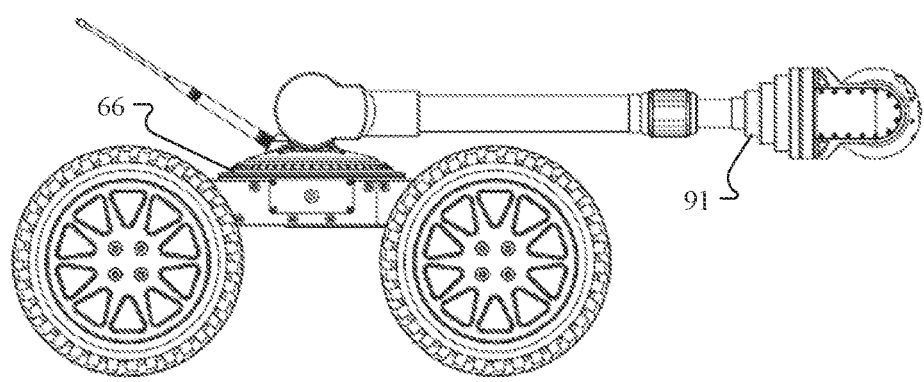
FIG. 120 is a side view of the embodiment of FIG. 119.
Figure 121:
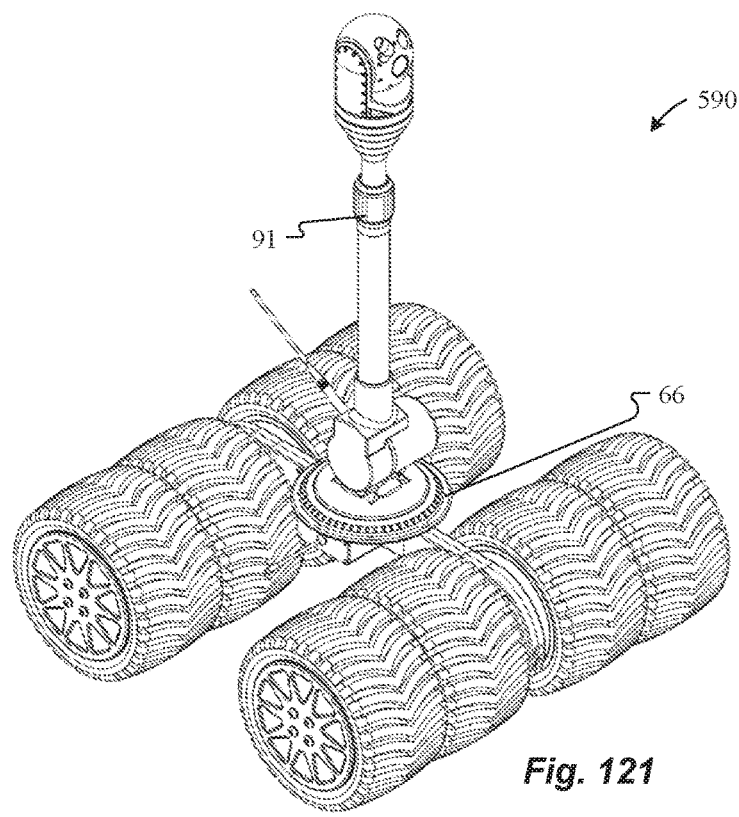
FIG. 121 is an isometric view of a manipulated version of the embodiment of FIG. 119.
Figure 122:
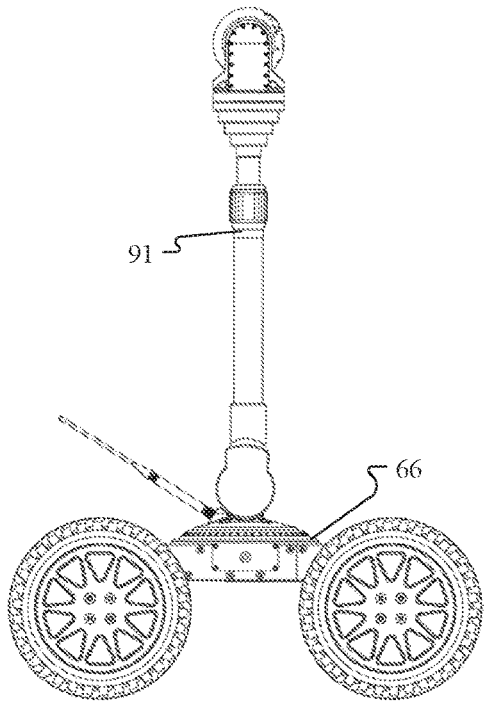
FIG. 122 is a side view of the embodiment of FIG. 121.

FIGS. 117 and 118 depict an example of a vehicle 580 in which the flippers 89 are not provided with tracks 90. Rather, the flippers 89 may only be rotatable about the center of the wheel's 2 rotation. No other moving parts may be provided on the flippers 89. Such a configuration will limit the functionality of the flippers 89, but also limit the possibility of failure and, therefore, the need to replace flippers. The use of simplified flippers 89 as shown in FIGS. 117 and 118 can still be useful to pull a vehicle 580 up and over a front face of an obstacle. Operating in the same way as other flippers described herein, the flippers 89 may be rotated about the wheel's 2 axis of rotation to contact the top surface or some other surface than the front surface of an obstacle. The flippers 89 may then be further manipulated to pull the vehicle 580 on top of the obstacle.

With reference now to FIGS. 119-122, additional details of another vehicle 590 will be described in accordance with at least some embodiments of the present disclosure. The vehicle 590 is shown to have a different implement 91 mounted on the universal platform 66 of the frame 3. In this embodiment, the implement 91 corresponds to a telescoping and adjustable arm that has a camera or the like mounted on its distal end. The implement 91 may be independently controlled by control signals issued from a remote control. In some embodiments, the arm can be raised, lowered, extended, shortened, rotated, and otherwise moved to enable a camera mounted on the distal end of the arm to capture images of desired objects or persons. In some embodiments, the implement 91 may be provided with internal gyroscopic components, accelerometers, and control motors that enable an auto-stabilization feature to be implemented. In particular, the accelerometers and gyroscopes (or other sensors) in the implement 91 and/or mounted to the frame 3 may measure a relative movement of the frame 3 with respect to a fixed plane or point in space. As the frame 3 moves relative to the fixed plane or point in space, then control motors can be used to adjust a position of the implement 91 to continue pointing at a fixed point in space and/or to maintain a stable position relative to a fixed plane. A feedback control loop may be used to ensure that the implement 91 is steadily controlled with respect to the fixed point or reference plane until such stabilization is no longer desired.

Figure 123:
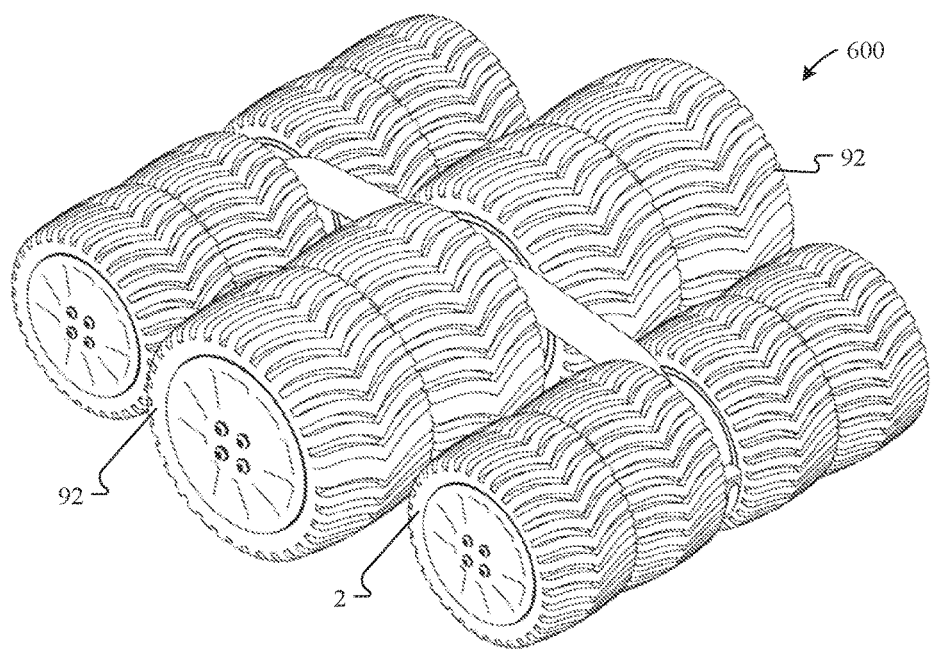
FIG. 123 is an isometric view of another embodiment of the present disclosure.
Figure 124:
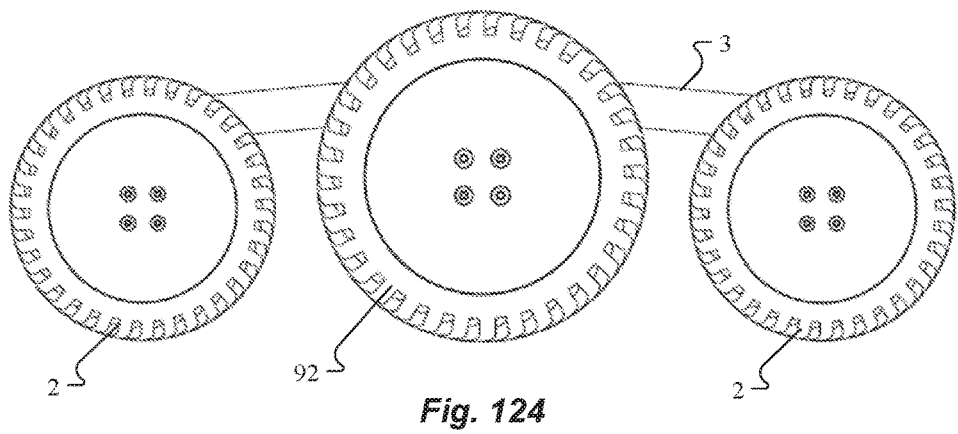
FIG. 124 is a side view of the embodiment of FIG. 123.

With reference now to FIGS. 123 and 124 another example of a vehicle 600 will be described in accordance with at least some embodiments of the present disclosure. The vehicle 600 is shown to include twelve wheels 2. Eight of the wheels 2 are provided at the front and back of the vehicle 600 whereas the other four wheels are provided as center wheels 92. The center wheels 92 are shown to have a larger diameter than the outer wheels 2. In some embodiments, the center wheels 92 are connected to the outer wheels 2 via a flexible and/or pivotable frame 3. The frame 3 is provided with the capability of flexing or pivoting about the center wheels 92. This means that when an obstacle is encountered by one of the outer wheels 2, the outer wheels 2 can begin climbing up the face of the obstacle and the frame 3 can pivot, thereby allowing the center wheels 92 to get closer to the obstacle. As mentioned above, the depiction of a vehicle with multiple wheels per axle is only for illustrative purposes. It should be appreciated that the vehicle 600 may actually only have six wheels (e.g., one wheel per axle). These wheels 2 may be wider than normal wheels (e.g., the approximate width of two wheels) or they may be the approximate width of a normal wheel. Of course, each axle could accommodate multiple wheels as depicted without departing from the scope of the present disclosure.

In some embodiments, all of the wheels may be enabled to travel on a common plane (e.g., a flat ground surface) and the top of the center wheels 92 may be positioned higher than the top of the outer wheels. However, as the outer wheels 2 encounter an obstacle, the top of the outer wheels 2 may rise above the top of the center wheels 92, thereby enabling the outer wheels 2 to move on top of an obstacle (e.g., a stair). Once on top of the obstacle, the outer wheels 2 can pull the vehicle 600 over the obstacle while the center wheels 92 push onto the face of the obstacle. It should be appreciated that any number of wheels can be used in this three rotational axis configuration. It should also be appreciated that each rotational axis does not necessarily need to have four wheels rotating there about. Instead, a single wheel, two wheels, or more may be provided about each axis of rotation. Furthermore, while the embodiment of FIGS. 123 and 124 shows the center wheels 92 as being larger than the outer wheels 2, it should be appreciated that such a configuration is not required. Indeed, the outer wheels 2 may be larger in diameter than the center wheels 92 or all wheels may be the same size. Further still, the frame 3 does not necessarily have to be flexible and/or pivotable to facilitate the desired functionality of vehicle 600.

In some embodiments, the wheels 2 and/or wheels 92 may be controlled by the same motor controller or by different motor controllers. As a non-limiting example, the left side of the vehicle 600 (or any other vehicle described herein) may have wheels driven by a first (e.g., left) controller and the right side of the vehicle 600 may have wheels driven by a second (e.g., right) controller. The right and left controllers may each receive the same control signal from a remote control 60. In some embodiments, the right and left controllers may have appropriate logic that enables the controllers to understand how the associated left and right sides of the vehicle should be controlled so as to be responsive to the control signal. For instance, the control signal may have components for the right and left sides. Alternatively or additionally, the right and left controllers may respond to the same control signal. In some embodiments, the right motor controller may be mounted backward as compared to the left motor controller (or vice versa). This reverse mounting of the motor controllers may allow the left side to operate on a common control signal even though the motor controllers are mounted on different sides of the vehicle. As a non-limiting example, left wheels can be used to skid steer and right to skid steer. Each wheel can receive the identical signal from the remote controller (and not differentiate), which is just a simple throttle response. Once synchronized and adjusted appropriately, these wheels can operate on the same control signal. Alternatively or additionally, it may be possible to have the motor controller with a reverse setting and respond in reverse to the same signal (e.g., right works backwards with respect to left)

Specific details were given in the description to provide a thorough understanding of the embodiments. However, it will be understood by one of ordinary skill in the art that the embodiments may be practiced without these specific details. Additionally, the Figures do not depict well-known features that may be needed to create a working vehicle so as not to obscure the embodiments in unnecessary detail.

What is claimed is:

1. A vehicle comprising:
    a frame;
    a first wheel mount connected with the frame, the first wheel mount comprising:
        a first control unit;
        a first motor that is responsive to signals received from the first control unit; and
        a first set of gears that transfer rotational motion from the first motor to a first wheel mounted on the first wheel mount, wherein the first control unit and/or first motor are mounted below an axis of rotation of the first wheel; and
    a second wheel mount connected with the frame, the second wheel mount comprising:
        a second control unit;
        a second motor that is responsive to signals received from the second control unit; and
        a second set of gears that transfer rotational motion from the second motor to a second wheel mounted on the second wheel mount, wherein the second control unit and/or second motor are mounted below an axis of rotation of the second wheel, and wherein the axis of rotation of the second wheel is not coaxial with the axis of rotation of the first wheel.

2. The vehicle of claim 1, wherein a center of gravity of the first wheel mount is positioned below the axis of rotation of the first wheel.

3. The vehicle of claim 2, wherein a center of gravity of the second wheel mount is positioned below the axis of rotation of the second wheel.

4. The vehicle of claim 1, wherein the first wheel mount further comprises electrical wiring that passes through an internal volume of the first wheel mount and carries a control signal to or from the first control unit.

5. The vehicle of claim 4, wherein the frame further comprises a communication bus that carries the control signal between the first wheel mount and the second wheel mount.

6. The vehicle of claim 1, wherein the first wheel mount further comprises at least one energy source mounted below the axis of rotation of the first wheel and wherein the second wheel mount further comprises at least one energy source mounted below the axis of rotation of the second wheel.

7. The vehicle of claim 1, wherein the first wheel mount further comprises an outer plate on which the first set of gears are mounted and an inner plate that is proximal to the frame and wherein the first control unit and first motor are mounted between the outer plate and the inner plate.

8. The vehicle of claim 7, wherein the first wheel is mounted to the first set of gears via one or more of a screw and bolt.

9. The vehicle of claim 1, further comprising:
a third wheel mount connected with the frame, the third wheel mount comprising:
a third control unit;
a third motor that is responsive to signals received from the third control unit; and
a third set of gears that transfer rotational motion from the third motor to a third wheel mounted on the third wheel mount, wherein the third control unit and/or third motor are mounted below an axis of rotation of the third wheel; and
a fourth wheel mount connected with the frame, the fourth wheel mount comprising:
a fourth control unit;
a fourth motor that is responsive to signals received from the fourth control unit; and
a fourth set of gears that transfer rotational motion from the fourth motor to a fourth wheel mounted on the fourth wheel mount, wherein the fourth control unit and/or fourth motor are mounted below an axis of rotation of the fourth wheel.

10. The vehicle of claim 9, wherein at least one of the first control unit, the second control unit, the third control unit, and the fourth control unit includes a master control unit that receives a control signal from a remote control and communicates control information to others of the control units that do not include the master control unit.

11. The vehicle of claim 9, wherein the first control unit, the second control unit, the third control unit, and the fourth control unit operate independently of one another and without knowledge of each other's operation.

12. The vehicle of claim 11, wherein each of the first wheel mount, the second wheel mount, the third wheel mount, and the fourth wheel mount each include a receiver that receives a control signal or portion thereof and provides the control signal or portion thereof to the corresponding control unit mounted within the wheel mount.

13. A modular wheel assembly for a vehicle, comprising:
a frame configured with an internal space positioned between an inner plane and an outer plane;
a control unit mounted to the frame, wherein the control unit is either a master control unit (MCU) that provides control signals to other control units of the vehicle or a slave control unit that is responsive to an MCU located outside the internal space;
a wheel; and
a motor that is responsive to signals received from the control unit, the motor in force-transmitting communication with the wheel so as to rotate the wheel;
wherein the control unit and/or motor are mounted within the frame below an axis of rotation of the wheel.

14. The modular wheel assembly of claim 13, wherein a center of gravity of the frame is positioned below the axis of rotation of the wheel.

15. The modular wheel assembly of claim 13, further comprising an inner plate defining at least a portion of the inner plane and an outer plate defining at least a portion of the outer plane, wherein the inner plate and the outer plate each comprise a shape that positions a center of gravity of the inner plate and the outer plate below the axis of rotation of the wheel.

16. The modular wheel assembly of claim 13, further comprising:
a set of gears connecting the motor and the wheel, the set of gears comprising mounting screws or bolts that attach the wheel to the set of gears, wherein the mounting screws or bolts enable the wheel to be replaced with a different wheel without removing other components mounted in the frame.

17. The modular wheel assembly of claim 13, further comprising one or more wires that pass through the internal space and connect with the control unit.

18. The modular wheel assembly of claim 13, further comprising an energy source mounted in the internal space and at a position below the axis of rotation of the wheel.

19. A vehicle, comprising:
a frame;
a platform mounted on the frame configured to receive one or more implements;
a first wheel rotatable with respect to the frame about a first axis of rotation, the first wheel comprising an inner volume that includes the following:
a first control unit;
a first motor that is responsive to signals received from the first control unit;
a first energy source; and
a first set of gears that transfer rotational motion from the first motor to the first wheel; and
a second wheel rotatable with respect to the frame about a second axis of rotation that is offset relative to the first axis of rotation, the second wheel comprising an inner volume that includes the following:
a second control unit;
a second motor that is responsive to signals received from the second control unit;
a second energy source; and
a second set of gears that transfer rotational motion from the second motor to the second wheel.

20. The vehicle of claim 19, wherein the frame comprises an adjustable arm that enables a distance between the first wheel and the second wheel to be dynamically adjusted.

21. The vehicle of claim 19, further comprising at least one track that wraps around the first wheel and the second wheel, wherein the at least one track is further held between the first wheel and second wheel by a track arm.

22. The vehicle of claim 21, wherein the track arm interfaces with the at least one track at a non-treaded portion of the at least one track.

23. The vehicle of claim 21, wherein the track arm retains the at least one track at a position that enables an obstacle to be positioned between the first wheel and the second wheel.

24. The vehicle of claim 19, further comprising one or more climbing flippers that are adjustable independent of the first wheel and/or second wheel.

25. The vehicle of claim 24, wherein the one or more climbing flippers further include a track that rotates around the one or more climbing flippers.

26. The vehicle of claim 19, wherein the first wheel further comprises a first receiver in electrical communication with the first control unit, wherein the first receiver is provided in the inner volume of the first wheel, wherein the second wheel further comprises a second receiver in electrical communication with the second control unit, and wherein the second receiver is provided in the inner volume of the second wheel.

27. The vehicle of claim 19, further comprising an arm mounted to the frame, wherein the arm includes a track that is capable of being manipulated with the arm and placed on an object when the arm is placed on the object, thereby enabling the vehicle to climb the object with assistance from the track provided on the arm.

* * * * *